US010218755B2

(12) United States Patent
Degrange

(10) Patent No.: US 10,218,755 B2
(45) Date of Patent: Feb. 26, 2019

(54) EXTENDED SELECTION AND ALIGNMENT OF VIDEO SEGMENTS FOR ADAPTIVE STREAMING

(71) Applicant: Roku, Inc., Saratoga, CA (US)

(72) Inventor: Francis Degrange, Saratoga, CA (US)

(73) Assignee: Roku, Inc., Los Gatos, CA (US)

( * ) Notice: Subject to any disclaimer, the term of this patent is extended or adjusted under 35 U.S.C. 154(b) by 370 days.

(21) Appl. No.: 15/010,916

(22) Filed: Jan. 29, 2016

(65) Prior Publication Data

US 2017/0223074 A1   Aug. 3, 2017

(51) Int. Cl.
*H04N 21/234* (2011.01)
*H04L 29/06* (2006.01)
*G06F 13/40* (2006.01)
*G06F 13/16* (2006.01)
*H04N 21/236* (2011.01)
*H04N 21/845* (2011.01)

(Continued)

(52) U.S. Cl.
CPC ...... *H04L 65/4069* (2013.01); *G06F 13/1673* (2013.01); *G06F 13/4068* (2013.01); *H04N 21/23406* (2013.01); *H04N 21/23424* (2013.01); *H04N 21/23439* (2013.01); *H04N 21/23605* (2013.01); *H04N 21/8455* (2013.01); *H04N 21/8456* (2013.01); *H04N 21/8547* (2013.01)

(58) Field of Classification Search
CPC ............ H04L 65/4069; G06F 13/1673; G06F 13/4068; H04N 21/23406; H04N 21/23424; H04N 21/23605; H04N 21/64769; H04N 21/8455; H04N 21/23439
See application file for complete search history.

(56) References Cited

U.S. PATENT DOCUMENTS 9,716,883 B2  7/2017  Rodriguez et al.
2002/0061067 A1  5/2002  Lyons et al.
(Continued)

OTHER PUBLICATIONS

Non-Final Office Action dated Jun. 29, 2017 in U.S. Appl. No. 15/010,857, 18 pages.
(Continued)

*Primary Examiner* — Hunter B Lonsberry
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for extended selection and alignment of video segments for adaptive streaming. An embodiment operates by receiving variant segments, the variant segments including a first and a second variant segment having a first bitrate, and third and fourth variant segments having a second bitrate, for decoding and playback, generating a first, second, and third packetized elementary stream (PES) collections based on the first, second, and third variant segments. The embodiment further operate by storing the generated first, second, and third PES collections in a processing buffer, and determining, based on a maximum tolerance offset, a first and a second out-of-tolerance splicing locations and associated first and second out-of-tolerance offsets between the first PES collection and the second PES collection and between the first PES collection and the third PES collection.

20 Claims, 25 Drawing Sheets

(51) Int. Cl.
*H04N 21/2343* (2011.01)
*H04N 21/8547* (2011.01)

(56) References Cited

U.S. PATENT DOCUMENTS

| | | |
|---|---|---|
| 2003/0185235 A1 | 10/2003 | Tomobe et al. |
| 2003/0206596 A1 | 11/2003 | Carver et al. |
| 2004/0015999 A1 | 1/2004 | Carlucci et al. |
| 2005/0207569 A1 | 9/2005 | Zhang et al. |
| 2007/0024764 A1 | 2/2007 | Chung |
| 2007/0101379 A1 | 5/2007 | Pereira |
| 2007/0195892 A1 | 8/2007 | Choi et al. |
| 2009/0003432 A1 | 1/2009 | Liu et al. |
| 2009/0148056 A1 | 6/2009 | Rodriguez et al. |
| 2010/0119164 A1 | 5/2010 | Singhal et al. |
| 2010/0189131 A1 | 7/2010 | Branam et al. |
| 2010/0328527 A1 | 12/2010 | Brandsma et al. |
| 2011/0096846 A1 | 4/2011 | Chari et al. |
| 2012/0331106 A1 | 12/2012 | Ramamurthy et al. |
| 2013/0074141 A1 | 3/2013 | Hwang et al. |
| 2014/0056426 A1 | 2/2014 | Ducharme |
| 2014/0130110 A1 | 5/2014 | Gilson |
| 2015/0085132 A1 | 3/2015 | Bekiares et al. |
| 2016/0044343 A1 | 2/2016 | Bost et al. |
| 2016/0119679 A1 | 4/2016 | Randall et al. |
| 2016/0234528 A1 | 8/2016 | Narasimhan |
| 2017/0223081 A1* | 8/2017 | Degrange ............ H04L 65/4092 |
| 2017/0223424 A1* | 8/2017 | Degrange ........ H04N 21/23439 |

OTHER PUBLICATIONS

Non-Final Office Action dated Oct. 2, 2017 in U.S. Appl. No. 15/010,788, 21 pages.

* cited by examiner

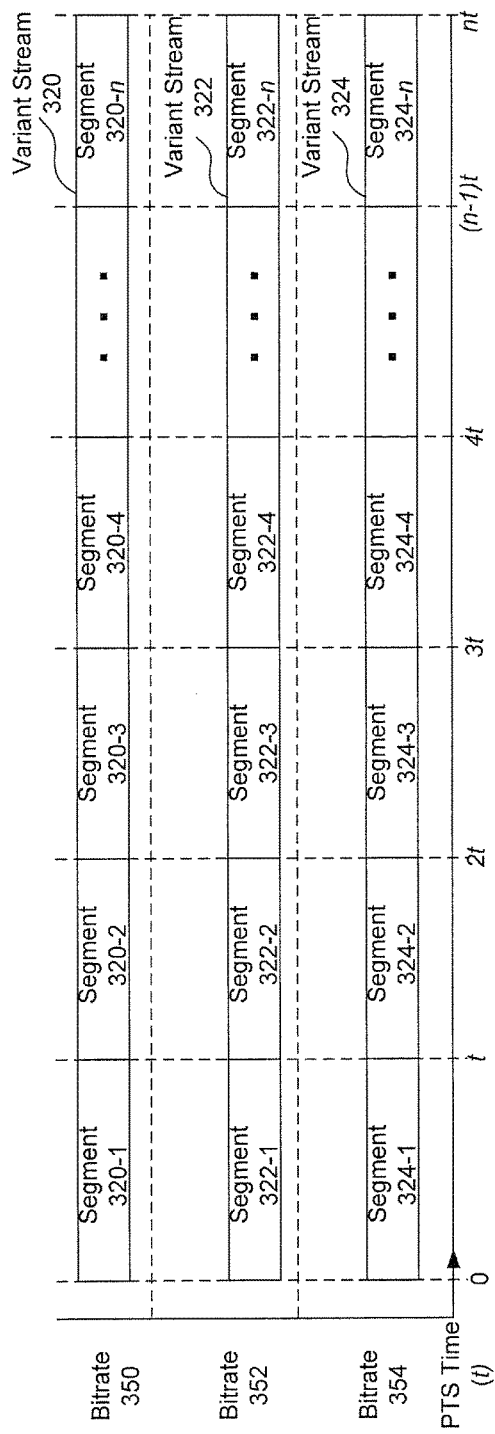
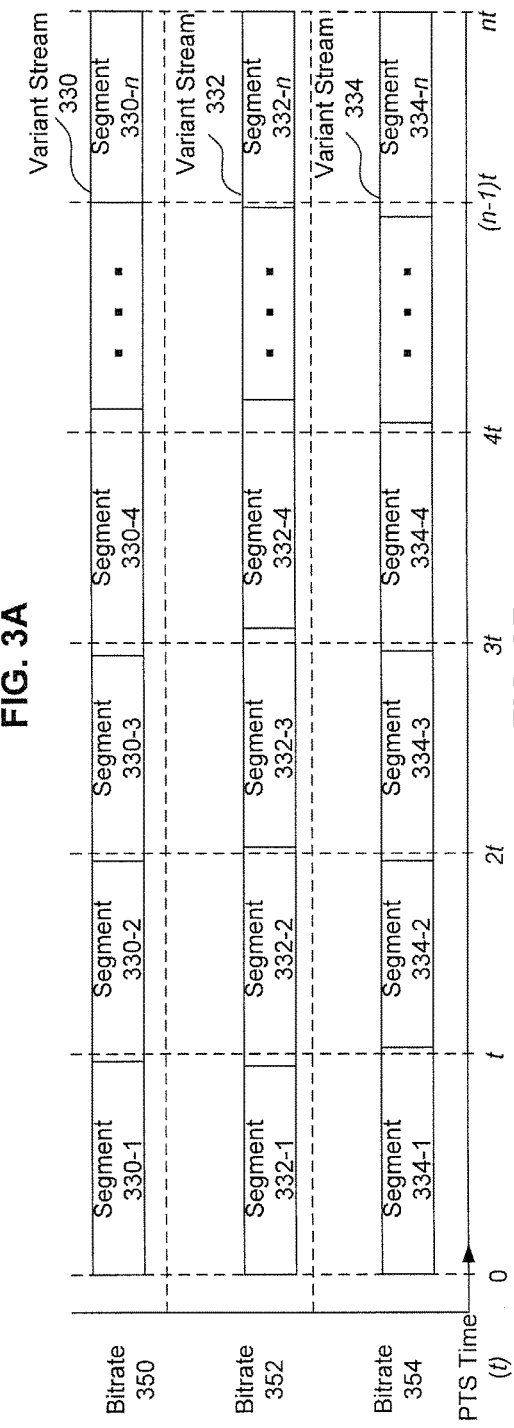
FIG. 3A
FIG. 3B

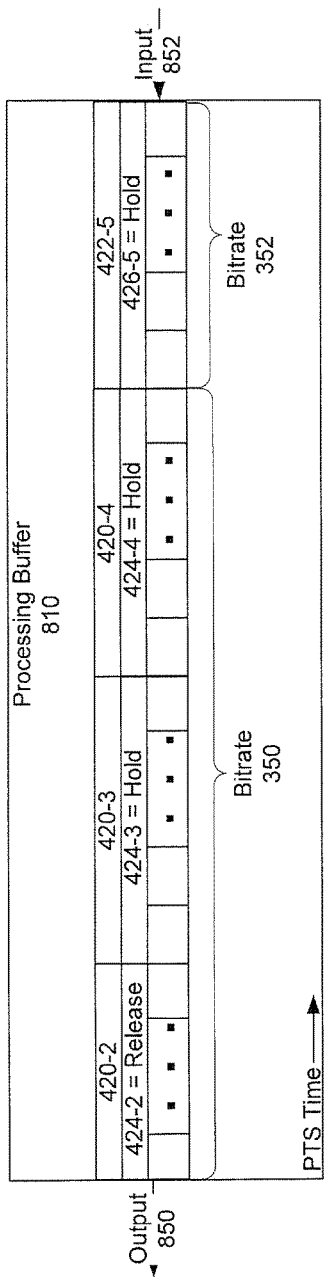
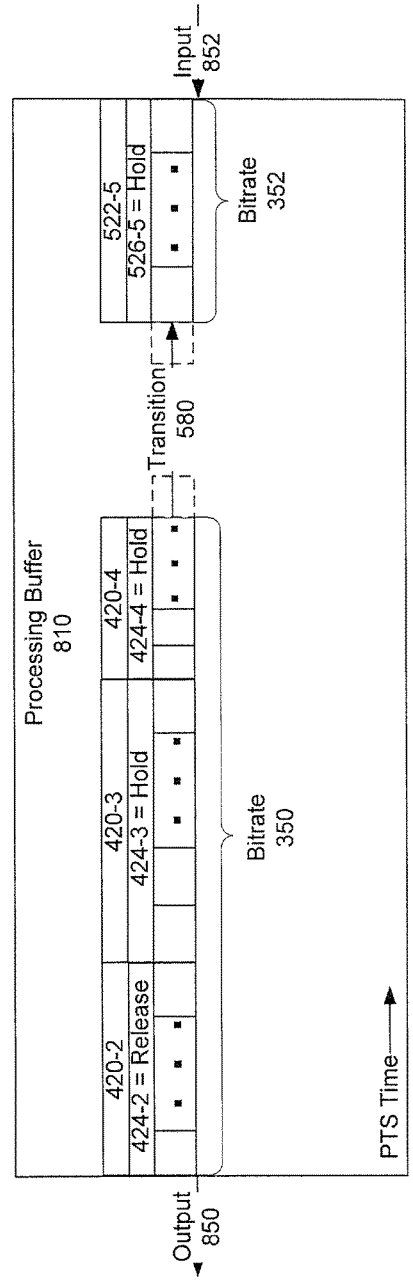
FIG. 8A
FIG. 8B

EXTENDED SELECTION AND ALIGNMENT OF VIDEO SEGMENTS FOR ADAPTIVE STREAMING

CROSS REFERENCE TO RELATED APPLICATIONS

This application is related to U.S. Non-Provisional patent application Ser. No. 15/010,788 titled "SELECTION OF VIDEO SEGMENTS FOR ADAPTIVE STREAMING." This application is also related to U.S. Non-Provisional patent application Ser. No. 15/010,857 titled "SELECTION AND ALIGNMENT OF VIDEO SEGMENTS FOR ADAPTIVE STREAMING." The above referenced applications are filed on the same day with the same inventor as this application and are herein incorporated by reference in their entireties. This application is also related to U.S. Non-Provisional Patent Application No. 16/155,617, filed Oct. 9, 2018 titled "SELECTION OF VIDEO SEGMENTS FOR ADAPTIVE STREAMING," and U.S. Non-Provisional Patent Application No. 16/036,043, filed Jul. 16, 2018 titled "SELECTION AND ALIGNMENT OF VIDEO SEGMENTS FOR ADAPTIVE STREAMING." The above referenced applications were also filed with the same inventor as this application.

BACKGROUND

Field

This disclosure is generally directed to extended selection and alignment of video segments. More particularly, this disclosure relates to extended selection and alignment of video segments for adaptive streaming.

Background

Consumer electronics such as, for example, high definition audio and/or video playback devices, may generally enable a user or consumer to watch or listen to their favorite content, such as, for example, music, movies, TV series, audio books, and/or the like by receiving or streaming the content for play back on their devices. To provide consumers with an enjoyable streaming experience for given network conditions, these devices typically receive streaming content from the associated supporting backend systems in various bitrates.

SUMMARY

Provided herein are system, apparatus, article of manufacture, method and/or computer program product embodiments, and/or combinations and sub-combinations thereof, for extended selection and alignment of video segments for adaptive streaming.

An embodiment includes a computer implemented method for extended selection and alignment of video segments for adaptive streaming. The method may operate by receiving one or more variant segments, the one or more variant segments including a first and second variant segments having a first bitrate, and a third and fourth variant segments having a second bitrate, for decoding and playback and generating a first, second, and third packetized elementary stream (PES) collections based on the first, second, and third variant segments. The method may further operate by storing the generated first, second, and third PES collections in a processing buffer and determining, based on a maximum tolerance offset, a first and a second out-of-tolerance splicing locations and associated first and second out-of-tolerance offsets between the first PES collection and the second PES collection and between the first PES collection and the third PES collection.

Another embodiment includes a system for extended selection and alignment of video segments for adaptive streaming. The system may include at least one processor and a memory coupled to the at least one processor and configured to receive one or more variant segments, the one or more variant segments including a first and second variant segments having a first bitrate, and a third and fourth variant segments having a second bitrate, for decoding and playback and generate a first, second, and third packetized elementary stream (PES) collections based on the first, second, and third variant segments. The at least one processor may be further configured to store the generated first, second, and third PES collections in a processing buffer and determine, based on a maximum tolerance offset, a first and a second out-of-tolerance splicing locations and associated first and second out-of-tolerance offsets between the first PES collection and the second PES collection and between the first PES collection and the third PES collection.

A further embodiment includes a tangible computer-readable device having instructions stored thereon that, when executed by at least one computing device, causes the at least one computing device to perform operations. The operations may include receiving one or more variant segments, the one or more variant segments including a first and second variant segments having a first bitrate, and a third and fourth variant segments having a second bitrate, for decoding and playback and generating a first, second, and third packetized elementary stream (PES) collections based on the first, second, and third variant segments. The operations may further include storing the generated first, second, and third PES collections in a processing buffer and determining, based on a maximum tolerance offset, a first and a second out-of-tolerance splicing locations and associated first and second out-of-tolerance offsets between the first PES collection and the second PES collection and between the first PES collection and the third PES collection.

BRIEF DESCRIPTION OF THE FIGURES

The accompanying drawings are incorporated herein and form a part of the specification.

FIGS. 3A-3B illustrate a plurality of example variant streams having a plurality of variant segments according to an example embodiment.

FIGS. 8A-8G illustrate a set of interactions for realigning a processing buffer according to according to an example embodiment.

Figure 1:
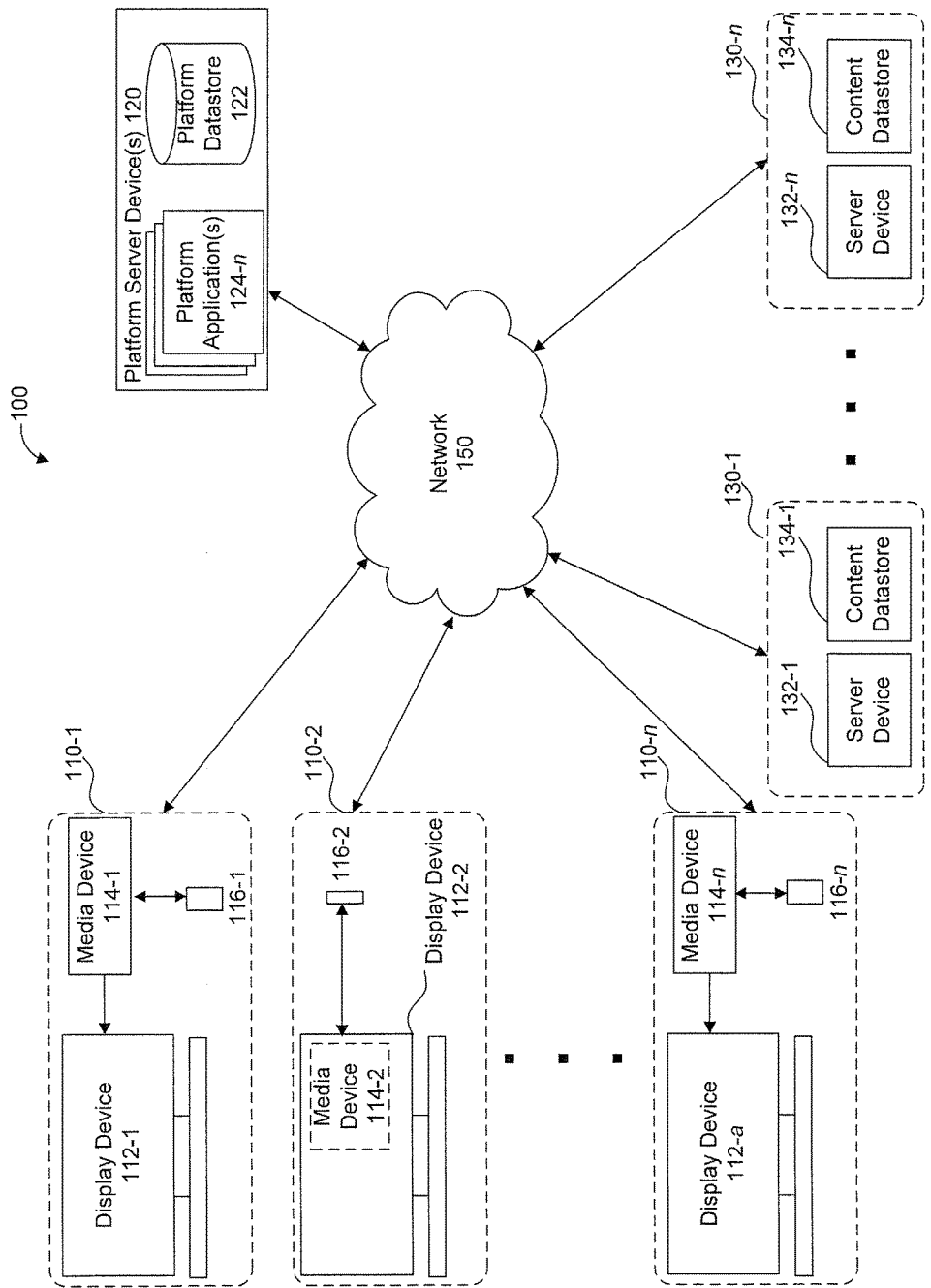
FIG. 1 illustrates a block diagram of an adaptive streaming system configured according to an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "m" and "n" and other similar designators are intended to be variables representing any positive integer. Thus, for example, if an implementation sets a value for n=4, then a complete set of elements 114-n may include elements 114-1, 114-2, 114-3, and 114-4. Furthermore, unless explicitly stated otherwise, a complete set of elements may vary for a given feature, embodiment, and/or implementation even though the same designator may be used between various features, embodiments, and/or implementations.

DETAILED DESCRIPTION

FIG. 1 illustrates a block diagram of an adaptive streaming system 100, according to an embodiment. In particular, the adaptive streaming system 100 may include one or more interface systems 110-n, platform server devices 120, and one or more content source systems 130-n. In an embodiment, the interface systems 110-n may include, without limitation, display devices 112-n (e.g. a monitor, television, a projector, etc.), media devices 114-n (e.g. streaming devices, multimedia devices, audio/video playback devices, etc.), and/or control devices 116-n.

In an embodiment, the media devices 114-n may be integrated with, operatively coupled to, and/or connected to their respective display devices 112-n, control devices 116-n, and/or network 150. The media devices 150 may be configured to communicate with their respective display devices 112-n and network 150. In various embodiments, the network 150 may include, without limitation, a computer and/or telecommunications network which may enable coupled and/or interconnected systems and/or devices to communicate information between and among each other. In various embodiments, the network 150 may include, without limitation, intranet, extranet, Internet, and/or any other local, regional, global telecommunications network.

In an embodiment, the platform server device(s) 120 may include, without limitation, one or more platform applications 124-n and a platform datastore 122. The platform datastore 122 may be generally arranged to store platform information and for management of content, media devices, content source systems, users or consumers. The platform application(s) 124-n may be generally arranged to provide various services to the one or more media devices 114-n. The various services may include, without limitation, authentication services, search services, user interface services, content services, command services, datastore services, and/or the like.

In an embodiment, the platform server device(s) 120 may be configured to receive command information from media devices 114-n and may process the command information via the one or more platform applications 124-n. In an embodiment, the media devices 114-n may be configured to aurally and/or graphically present user interfaces and/or content on respective or corresponding display devices 112-n including any acoustic transducers (e.g., speakers, etc.) operatively coupled to the display devices 112-n.

For example, the media device 114-1 may be configured to acoustically, graphically, and/or visually present content on the display device 112-1 sourced from media device 114-1, the platform server device(s) 120, and/or the one or more content source systems 130-n.

In addition to or alternative to the above example, the media device 114-1 may be configured to provide the one or more user interface (UI) views and/or UI elements and associated acoustic information to display device 112-1 for acoustical, graphical, and/or visual presentation, where the UI views, UI elements, and/or associated acoustic information may be generated by the platform server device(s) 120, the one or more content source systems 130-n, and/or the media device 114-1.

In an embodiment, the control devices 116-n may be configured to communicate user input information with the respective media devices 114-n and may optionally include a touch screen display (not shown) and/or audio input and/or output (I/O) circuitry. For example, the control device 116-1 may be configured to use one or more wired and/or wireless communication protocols and/or standards, which may include, without limitation, infrared (IR) protocols and/or standards, radio frequency (RF) protocols and/or standards, and/or Bluetooth protocol and/or standard to communicate with the media device 114-1. In an embodiment, the control device 116-1 may be further configured to enable a consumer or user of a media device (e.g., media device 114-1) to navigate and/or make user selections from the UI views presented on a display device (e.g., display device 112-1).

Additionally or alternatively, the control device 116-1 itself may be configured to present at least a portion of the UI views on a touch screen display (not shown) connected and/or integrated with the control device 116-1 to enable a consumer or user of media device 114-1 to navigate, select, or otherwise interact with various content as previously discussed. Examples of control devices 116-n may include, without limitation, remote controls and/or mobile devices.

In an embodiment, the content stored within the content datastores 134-n may include music, video, multimedia, still pictures, text, graphics, gaming applications, and/or the like. In another embodiment, the particular content which is stored within the content datastores 134-n may be requested, streamed, and/or provided to the media devices 114-n through the network 150 utilizing one or more media streaming communications protocols.

In accordance with some implementations of the one or more media streaming communications protocols, content requested, streamed, and/or provided from the content datastore 134-n may be represented or encoded as one or more sets of variant streams, where each particular content may be represented by a set of variant streams. Each variant stream in the set of variant streams may be encoded at a specific bitrate utilizing one or more audio and/or video coding standards. Additionally, each variant stream may also be separated or divided into a sequence or series of one or more variant segments, where each variant segment may be of a specific variant segment length (e.g., 3 seconds of audio/video, 5 seconds of audio/video, 7 seconds of audio/video, 10 seconds of audio/video, etc.).

The one or more media streaming communications protocols may include, without limitation, Hypertext Transfer Protocol (HTTP) Live Streaming (HLS), Adaptive HTTP Streaming (AHS), Moving Picture Experts Group-Dynamic Adaptive Streaming over HTTP (MPEG-DASH) and/or the like. The one or more audio coding standards may include, without limitation, MPEG-2 Audio Layer III (MP3), Advanced Audio Coding (AAC), High Efficiency AAC (HE-AAC), Arc Consistency Algorithm #3 (AC-3), and/or the like. The one or more video coding standards may include, without limitation, MPEG-2 defined by the International Telecommunication Union (ITU) as H.222/H.262, MPEG-4 Part 10 Advanced Video Coding (MPEG-4 AVC) defined by ITU Telecommunications Standardization Sector (ITU-T) as H.264, MPEG-H Part 2 High Efficiency Video Coding (HEVC) defined by ITU-T as H.265, and/or the like.

In order to stream or provide one or more optimal variant stream to the media devices 114-n for the particular content, the content source systems 130-n may further provide content description information associated with the particular content and consistent with one or more media streaming communications protocols. For example, the content description information may be represented as a HTTP Live Streaming Playlist consistent with the HLS communications protocol. The content description information may also be represented as Media Presentation Description (MPD) consistent with the MPEG-DASH protocol. The examples are not limited in this context.

Each content description information may be associated with a particular content and may include, without limitation, a variant streams collection including a list of available variant streams. Each content description information may further include, without limitation, a set of variant segments collections where each variant segments collection of the set of set of variant segments collections may be associated with a variant stream and includes a collection of variant segments for the associated variant stream.

Each content description information may further include, without limitation, bitrate information and playback resolution information associated with each of the available variant streams and/or variant segment, and playback duration information associated with each variant segment. The bitrate information may be representative of the maximum bitrate (in Kilobits per second (Kbps) or Megabits per second (Mbps) including any overhead) required by the variant segment and/or variant stream for proper playback. The playback resolution information may be representative of the maximum output video resolution for proper playback.

Each content description information may further include, without limitation, segment location information associated with each variant segment and may identify a network address and/or path of a variant segment stored within the content datastores 134-n. It may be appreciated that once the media devices 114-n receives the associated content description information, the media devices 114-n may request a particular variant segment of a particular variant stream for a particular content for playback based on the available bandwidth associated with the respective media devices 114-n.

In one embodiment, content description information and the corresponding content may be stored by the content source systems 130-n. In another embodiment, content description information may be maintained within the platform server device(s) 120 and stored in the platform datastore 122 while the corresponding content (e.g., variant segments associated with the content, etc.) are managed locally by the content source systems 130-n. In yet another embodiment, at least a portion of the content description information including the content location information for one or more variant segments may be embedded within the UI elements representative of selectable and/or viewable content displayed via the media devices 114-n and/or display devices 112-n, such that interaction with those UI elements through the media devices 114-n allows the selectable and/or viewable content located within the content source systems 130-n to be accessible to the media devices 114-n.

By way of example, the media device 114-1 may communicate with platform server device(s) 120 to request specific content for aural and/or graphical presentation on display device 112-1. If the requested content is audio/video content, the platform server device(s) 120 may request the specific content from the one or more respective content source systems 130-n (e.g., content source system 130-1, etc.) via network 150 and receive at least a portion of the specific content and the content description information associated with the specific content. The platform server device(s) 120 may then transmit or stream the content description information and at least a portion of the specific content (e.g., a variant segment of a specific variant stream) having a specific bitrate to the media device 114-1 via network 150.

In addition to or alternative to the above example, the platform server device(s) 120 may provide content description information to the media device 114-1, and the media device 114-1 may subsequently directly request the specific content from the one or more respective content source systems 130-n (e.g., content source system 226-1, etc.) based on the content location information of the received content description information. The media device 114-1 may further receive at least a portion of the specific content, e.g., a variant segment of a specific variant stream having a specific bitrate, transmitted or streamed by the one or more respective content source systems 130-n via network 150.

Continuing with the above example(s), the specific content may be streamed or transmitted from the platform server device(s) 120 or the one or more respective content source systems 130-n utilizing HLS communications protocol. The specific content may be further represented by a set of variant streams, where at least a portion of a variant stream of the set of variant streams may be transmitted or streamed to the media device 114-1 via network 150. The transmitted or streamed variant stream may be further encoded at a specific bitrate utilizing MPEG-4 AVC/H.264 (e.g., 2000 Kbits/sec. H.264 encoding, etc.) and/or AAC encoding standard (e.g., 128 Kbits/sec. AAC encoding, etc.) and divided into a sequence of variant segments, where each variant segment may include approximately 3 seconds of encoded audio information and encoded video information multiplexed together.

Figure 2:
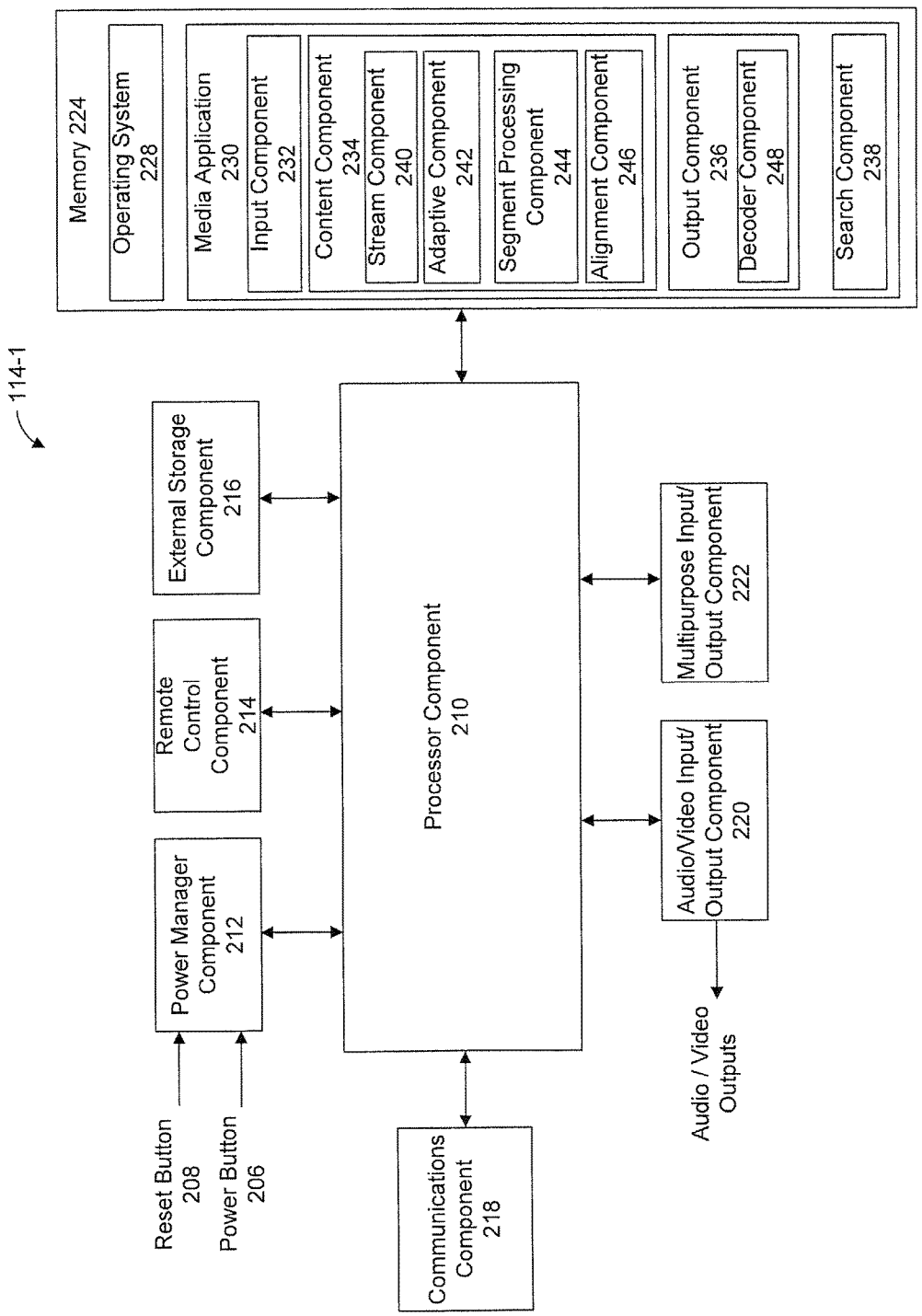
FIG. 2 illustrates a block diagram of an embodiment of a media device in an example embodiment.

FIG. 2 illustrates a block diagram of an embodiment of a media device in an example embodiment. It may be appreciated that while FIG. 2 illustrates an embodiment for the media device 114-1, other media devices 114-n (e.g., media device 114-1, 114-2, etc.) may be configured substantially similar to the embodiment illustrated in FIG. 2 for media device 114-1.

In an embodiment, the media device 114-1 may be configured to communicate with their respective display devices 112-n and platform server device(s) 120-n and content source systems 130-*n* via network 150 in order to provide requested content for auditory graphical, and/or visual presentation on their respective display devices 112-*n*. The media device 114-1 may include, but is not limited to, memory 224, processor component 210, communications component 218, audio/video (A/V) input/output (I/O) component 220, multipurpose input/output (I/O) component 222, power manager component 212, remote control component 214, external storage component 216, each of the components and memory 224 may be operatively connected and/or coupled to each other.

In an embodiment, the processor component 210 may be generally arranged to execute instruction information including one or more instructions. In an embodiment, the processor component 210 may be a low power processor component or system-on-chip (SoC) processor component which may comprise, among other elements, processor circuit, which may include, but is not limited to, at least one set of electronic circuits arranged to execute one or more instructions. Examples of processor components 210 may include, but are not limited to, Qualcomm® Snapdragon®, Nvidia® Tegra®, Intel® Atom®, Samsung® Exynos, Apple® A7®, Apple® A8®, or any other type of mobile processor(s) arranged to execute the instruction information including the one or more instructions stored in memory 224.

In an embodiment, the memory 224 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., universal serial bus (USB) memory, solid state drives (SSD), etc.), and/or any other type of storage media configured for storing information.

In an embodiment, the communications component 218 may be generally arranged to enable the media device 114-1 to communicate, directly and/or indirectly, with platform server device(s) 120, and/or content source systems 130-*n*. The communications component 218 may include, among other elements, a radio frequency circuit configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the communications component 218 may be further include network interface circuit encoding and/or decoding information and receiving and/or transmitting the encoded information as electrical and/or optical signals consistent with one or more wired and/or optical network standards (e.g., Ethernet, Fibre Channel, etc.).

In an embodiment, the power manager component 212 may be generally arranged to manage the media device 114-1 in one or more power states and transitioning between the one or more power states. The one or more power states may include, without limitation, reset state, sleep state, power on state, and/or power off state. The power management component 212 may further be may also be operatively coupled to a power button 206 to transition the media device 114-1 between powered on state, sleep state, and/or power off state. The power management component 212 may also be operatively coupled to a reset button 208 to transition the media device 114-1 to a reset state which may be followed by the power on state.

In an embodiment, the remote control component 214 may be generally arranged to receive user input information from control device 116-1. The remote control component 214 may be configured to use one or more wireless communication protocols and/or standards, which may include, without limitation, infrared (IR) protocols and/or standards, radio frequency (RF) protocols and/or standards, and/or Bluetooth protocol and/or standard to communicate with the control device 116-1.

In an embodiment, the external storage component 216 may be generally arranged to store information in volatile and/or nonvolatile memory as previously discussed with respect to memory 224. Additionally or alternatively, the external storage component 216 may be further operatively coupled to external storage components (not shown) such as, for example, USB memory, SSD, hard disk drives (HDD), secure digital (SD) nonvolatile memory, and the like. The stored information may include, without limitation, information received from platform server device(s) 120, content source systems 130-*n*, one or more components and/or operating systems stored in memory 224, information generated by the one or more components and/or operating systems stored in memory 224, content, and/or the like.

In an embodiment, the A/V I/O component 220 may be generally arranged to communicate audio and/or video information operatively coupled to one or more components and/or devices. For example, the A/V I/O component 220 may be configured to output audio information and/or video information to display device 112-1 for acoustic, auditory, graphical, and/or visual presentation on the display device 112-1. The display device 112-1 may be operatively coupled and/or connected to the A/V IO component 220 via one or more audio and/or video interfaces.

In an embodiment, the one or more audio and/or video interfaces may include, without limitation, high definition multimedia interface (HDMI), display port (DP), Red-Green-Blue (RGB) component video, Separate Video (S-video), Digital Visual Interface (DVI), Video Graphics Array (VGA), Mobile High-Definition Link (MHL), composite video, analog audio, and/or Sony®/Philips® Digital interface (S/PDIF) digital audio, USB, Apple® Thunderbolt®, and/or the like.

In an embodiment, the multipurpose I/O component 222 may be generally arranged to communicate with one or more external devices via one or more interfaces. The one or more interfaces may include, without limitation, USB, Apple® Thunderbolt®, and/or the like. The one or more external devices (not shown) may include, without limitation, keyboards, mice, cameras, microphone, and the like.

In an embodiment, the memory 224 may include instruction information arranged for execution by the processor component 210. In that embodiment, the instruction information may be representative of at least one operating system 228, one or more applications, which may include, but is not limited to, media application 230.

In an embodiment, the operating system 228 may include, without limitation, embedded operating systems (e.g., Apple®, iOS®, Google® Android®, HP® WebOS®, Microsoft® Windows Embedded®, Microsoft® Windows®, Linux, Roku OS, etc.) general arranged to manage hardware resources (e.g., one or more components of the media device 114-1) and/or software resources (e.g., one or more applications of the media device 114-1).

In an embodiment the media application 230 may be generally arranged to enable a user or consumer to authenticate to the platform server device(s) 120. After authentication, the media application 230 may further enable a user or consumer to manage their user profile, and search, select, and/or playback of content received the platform server device(s) 120 and/or one or more content source systems 130-n. The media application 230 may include, without limitation, an input component 232, a content component 234, an output component 236, and/or a search component 238.

In an embodiment, the input component 232 may be generally arranged to interface with remote control component 214 and/or multipurpose I/O component 222 to receive user or consumer and/or process one or more commands including navigation commands and/or selection commands which may represent selection of content, search for content, and/or an ongoing interaction with an application executing on the platform server device(s) 120.

In an embodiment, the content component 234 may include a stream component 240, an adaptive component 242, a segment processing component 244, and an alignment component 246. The stream component 240 may be generally arranged to receive, buffer, process, store, and/or stream one or more variant segments associated with a user or consumer selected content from the platform server device(s) 120 and/or one or more content source systems 130-n. The stream component 240 may also be generally arranged to hold one or more variant segments received, buffered, stored, and/or streamed for processing.

In an embodiment, the adaptive component 242 may be generally arranged to request variant segments from one bitrate stream to variant segments of another bitrate stream depending upon changing network conditions. Moreover the adaptive component 242 may be arranged to monitor available network bandwidth for receiving the one or more variant segments from the platform server device(s) 120 and/or one or more content source systems 130-n. The adaptive component 242 may also be arranged to request one or more variant segments for playback based at least partially on the available network bandwidth and content description information (e.g., bitrate information associated with each of the available variant streams and/or variant segment, etc.) for a given playback resolution (e.g., playback resolution information associated with each of the available variant streams and/or variant segment, etc.).

In an embodiment, the adaptive component 242 may request one or more variant segments of a variant stream having a bitrate that is closest but does not exceed the available network bandwidth for the given playback resolution. Thus, the adaptive component 242 may ensure that an user or a consumer selected content may be requested, received, and/or played back using the best available playback quality in most network conditions for a given playback resolution.

In an embodiment, the segment processing component 244 may be generally arranged to analyze and extract one or more packetized elementary stream (PES) packets and associated presentation timestamps (PTS) from each and every received variant segment for all PES packet types (e.g., audio packet type, video packet type, etc.). The segment processing component 244 may be further arranged to generate and store or buffer an associated PES collection for each and every received variant segment into a processing buffer (e.g., processing buffer 810 further discussed and illustrated with respect to FIGS. 8A-8G). The generated and buffered PES collections in the processing buffer may be initially held for processing by the segment processing component 244 for possible segment processing (e.g., splicing, alignment, etc.), when a bitrate switch occurs. The segment processing component 244 may further release the generated and buffered PES collections and provide the released generated and buffered PES collections to the output component 236 for de-multiplexing, decoding, and/or playback.

Depending on a particular implementation of segment processing component 244 and/or availability of variant segments for one or more variant streams, the segment processing component 244 may be configured to operate in low latency segment processing configuration or in extended selection segment processing configuration. In implementations where the variant streams for one or more variant stream may not be readily available, the segment processing component 244 may be automatically or manually configured to operate in low latency segment processing configuration. In implementations when the variant streams for one or more variant stream may be readily available, the segment processing component 244 may be configured to operate in extended selection segment processing configuration.

In low latency segment processing configuration, the segment processing component 244 may be configured to buffer and/or hold a limited number of generated PES collections before a previously buffered and/or held PES collection is released and provided to the output component 236. Thus, the segment processing component 244 is generally arranged to buffer and/or hold two PES collections in the processing buffer and release one of the two PES collections based on their ordering in the processing buffer (e.g., ordering is further discussed with respect to FIGS. 8A-8G). Generally, the segment processing component 244 may be configured to release one of the PES collections that has the earlier segment start time between the two buffered and/or held PES collections, when the two PES collections are fully buffered and/or held in the processing buffer and any required segment processing (e.g., splicing, alignment, etc.), in response to a bitrate switch has been performed. Additionally, in some instances, the segment processing component 244 may be arranged to buffer and/or hold one additional PES collection for a total of three PES collections. In such instances, the segment processing component 244 may also release one or more of the buffered and/or held PES collections.

For example, in implementations when: (1) the variant streams are associated with a live broadcast; (2) low latency or delay is desired; and/or (3) only a limited number variant segments for one or more variant stream is available to be requested and received for a given time, the segment processing component 244 may be generally configured to buffer and/or hold at least two PES collections or portions of the at least two PES collections.

Thus, continuing with the above example, the segment processing component 244 may be configured to continuously: (1) buffer and/or hold at least two PES collections generated based on requested and received variant segments; (2) perform appropriate segment processing (e.g., splicing, alignment, etc.) on the buffered and/or held PES collections based at least partially on whether a bitrate switch has occurred; and (3) release one or more of the PES collection (or portion thereof) based on ordering of the PES collections in the processing buffer, where steps (1), (2), and (3) may be repeated until all variant segments are requested and received or the process is otherwise interrupted.

In extended selection segment processing configuration, the segment processing component 244 may be automatically or manually configured to buffer and/or hold additional generated PES collections before the buffered and/or held generated PES collections are released and provided to the output component 236. Thus, the segment processing component 244 is generally arranged to buffer and/or hold three PES collections in the processing buffer and release one of the three PES collections based on their ordering in the processing buffer (e.g., ordering is further discussed with respect to FIGS. 8A-8G). Generally, the segment processing component 244 may be configured to release one of the PES collections that has the earlier segment start time between the three buffered and/or held PES collections, when the three PES collections are fully buffered and/or held in the processing buffer and any required segment processing (e.g., splicing, alignment, etc.) in response to a bitrate switch has been performed. Additionally, in some instances, the segment processing component 244 may be arranged to buffer and/or hold up to two additional PES collections (e.g., example embodiments discussed and illustrated with respect to FIGS. 6, and 7). In such instances, the segment processing component 244 may also release one or more of the buffered and/or held PES collections.

For example, in implementations when: (1) one or more variant streams are associated with a pre-recorded content; (2) most if not all variant segments for one or more variant streams are available to be requested and received; and/or (3) low latency or delay is not a priority, the segment processing component 244 may be generally configured to buffer and/or hold at least three generated PES collections or portions of the at least three PES collections.

Continuing with the above example, the segment processing component 244 may be configured to continuously: (1) buffer and/or hold at least three PES collections generated based on requested and received variant segments; (2) perform appropriate segment processing (e.g., splicing, alignment, etc.) on the buffered and/or held PES collections based at least partially on whether a bitrate switch has occurred; (3) release one or more buffered and/or held PES collections (or portion thereof) based on ordering of the PES collections in the processing buffer, where steps (1), (2), and (3) may be repeated until all variant segments are requested and received or the process is otherwise interrupted.

In an embodiment, the segment processing component 244 may also be generally arranged to ensure that when the adaptive component 242 requests a variant segment having a new bitrate different than previously received variant segments due to, for example, a change in network conditions, at least one previously received variant segment may be substantially aligned with one or more newly received variant segments having the new bitrate.

To ensure that requested variant segments are capable of being substantially aligned with previously received variant segments, the segment processing component 244 may be configured to determine a splicing location between two or more generated PES collections having different bitrates corresponding to two or more variant segments having different bitrates. Once a splicing location has been determined, the segment processing component 244 may also be configured remove PES collection elements from the PES collections corresponding to those two or more variant segments based at least partially on the splicing location.

In an embodiment, the alignment component 246 may be configured to align the two or more PES collections having corresponding variant segments and different bitrates based at least partially on the splicing location in a processing buffer. The alignment component 246 may be configured to align the PES collections by reordering and/or removing one or more PES collections having corresponding variant segments based on the splicing location in the processing buffer.

In an embodiment, the output component 236 may include a decoder component 248, where the decoder component 248 may be generally arranged to de-multiplex and/or decode the PES collections generated or extracted from received variant segments. The decoder output component 236 may generate audio and/or video information based on the de-multiplexed and/or decoded PES collections having corresponding variant segments that are received, buffered, stored, and/or streamed from platform server device(s) 120 and/or one or more content source systems 130-n.

Additionally or alternatively, the output component 236 may also be generally arranged to generate audio and/or video information based on de-multiplexed and/or decoded PES collections having corresponding variant segments that are stored in memory 224 and/or memory operatively coupled to the external storage component 216. The output component 236 may also be further arranged to generate the audio and/or video information based on customized UI information representative of one or more UI views (not shown) including one or more UI elements received from platform server device(s) 120 and/or generated by one or more components of memory 224 and/or operating system 228.

In an embodiment, the output component 236 may be arranged to provide the generated audio and/or video information to a display device (e.g., display device 112-1) operatively coupled to the A/V I/O component 220 in order to aurally and/or graphically present at least a portion of the generated audio and/or video information on the display device (e.g., display device 112-1).

In an embodiment, the search component 238 may be generally arranged to communicate with the platform server device(s) 120. In an embodiment, the search component 238 may be configured to receive one or more search queries from the user or consumer via the input component 232, where each search query may include, without limitation, one or more search terms and/or phrases. The search component 238 may be further configured to transmit the one or more search queries to the platform application(s) 124-n, where the platform application(s) 124-n may perform a search based on the received one or more search queries. The search component 238 may be further configured to receive one or more search results from the platform application(s) 124-n, in response to the transmission of the one or more search queries.

FIGS. 3A-3B illustrate a plurality of example variant streams having a plurality of variant segments according to an example embodiment.

As illustrated in FIG. 3A, content (e.g., a movies, videos, real-time broadcasts, etc.) received or streamed from the platform server device(s) 120 and/or one or more content source systems 130-n may be represented as one or more variant streams (e.g., variant streams 320, 322, and 324). The one or more variant streams may be associated with one or more bitrates, e.g., bitrates 350 (e.g., 5 Megabits per second, etc.), 352 (e.g., 2.5 Megabits per second, etc.), and 354 (e.g., 1 Megabits per second, etc.), respectively, so that each of the one or more variant streams (e.g., variant streams 320, 322, and 324) may have different network bandwidth requirements for a smooth and uninterrupted playback by a media device (e.g., media device 114-1, etc.).

Also illustrated in FIG. 3A, each variant stream may be divided into one or more variant segments, e.g., variant segments 320-*n*, 322-*n*, and 324-*n*. Each variant segment (e.g., variant segment 320-1 . . . 320-*n*, 322-1 . . . 322-*n*, and 324-1 . . . 324-*n*) may also be generally associated with the same playback duration (e.g., playback duration of t), with some exceptions (e.g., the last variant segment of a variant stream where the last variant segment's playback duration is less than t, etc.). Because each variant segment generally shares the same playback duration (e.g., playback duration of t), each variant segment of a variant stream (e.g., variant segment 320-1 of variant stream 320, etc.) may be temporally aligned with the next variant segment of a different variant stream (e.g., variant segment 322-2 of variant stream 322 or variant segment 324-2 of variant stream 324, etc.).

Similar to FIG. 3A, in an embodiment of FIG. 3B, the streamed or received content may also be represented as one or more variant streams (e.g., variant streams 320, 322, and 324). The one or more variant streams may also be associated with one or more bitrates (e.g., bitrates 350, 352, and 354, respectively), so that each of the one or more variant streams (e.g., variant streams 320, 322, and 324) may have different network bandwidth requirements for a smooth and seamless playback by a media device (e.g., media device 114-1, etc.). Unlike FIG. 3A, one or more variant segments of FIG. 3B may not share the same playback duration of t and consequently, variant segments of one variant stream (e.g., variant segment 330-1 of variant stream 330, etc.) may not be temporally aligned with the next variant segment of a different variant stream (e.g., variant segment 332-2 of variant stream 332 or variant segment 334-2 of variant stream 334, etc.).

Figure 4A:
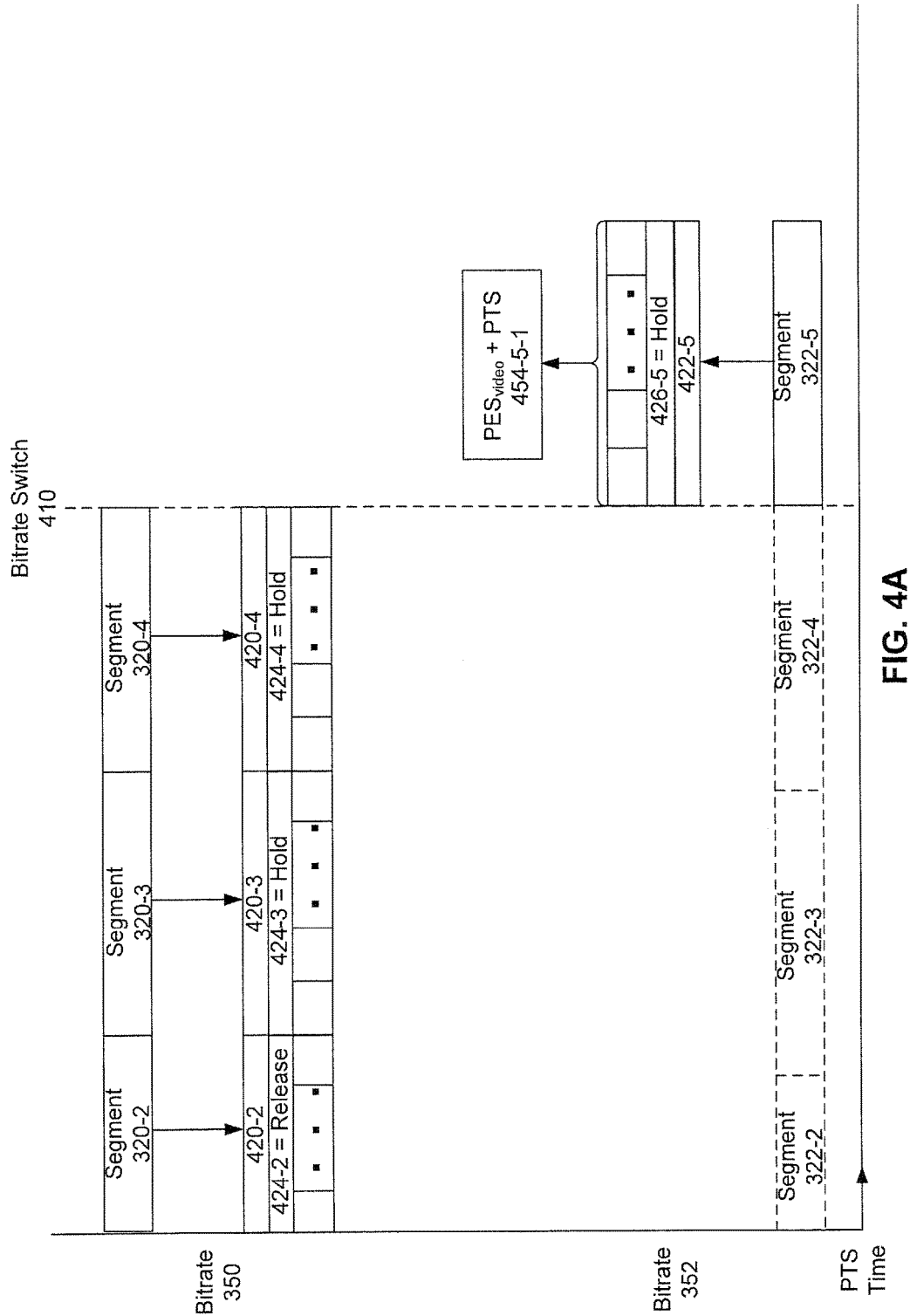
FIGS. 4A-4D illustrate a set of interactions for determining alignment between two different bitrate variant streams according to an example embodiment.
Figure 4B:
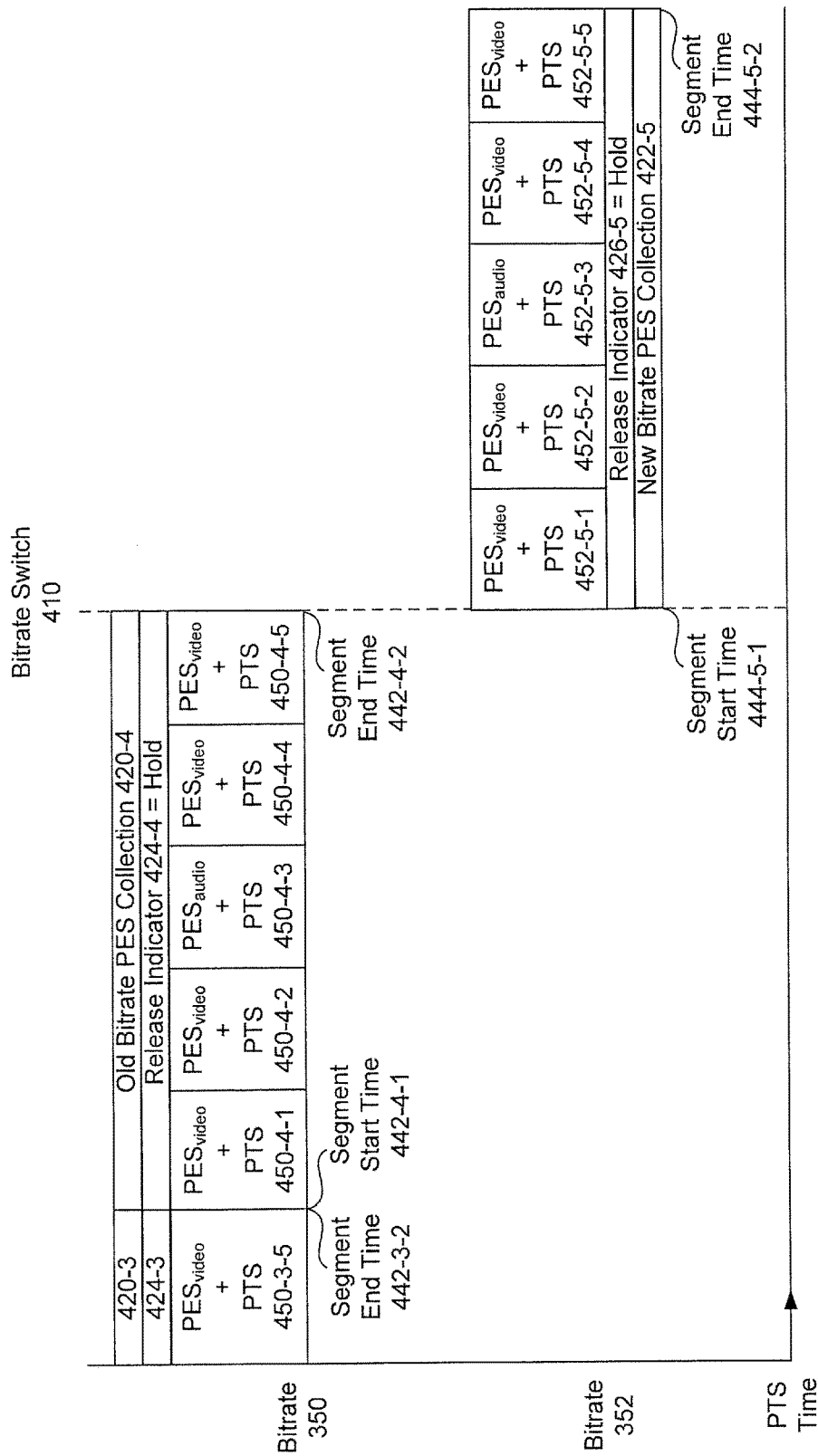
Figure 4C:
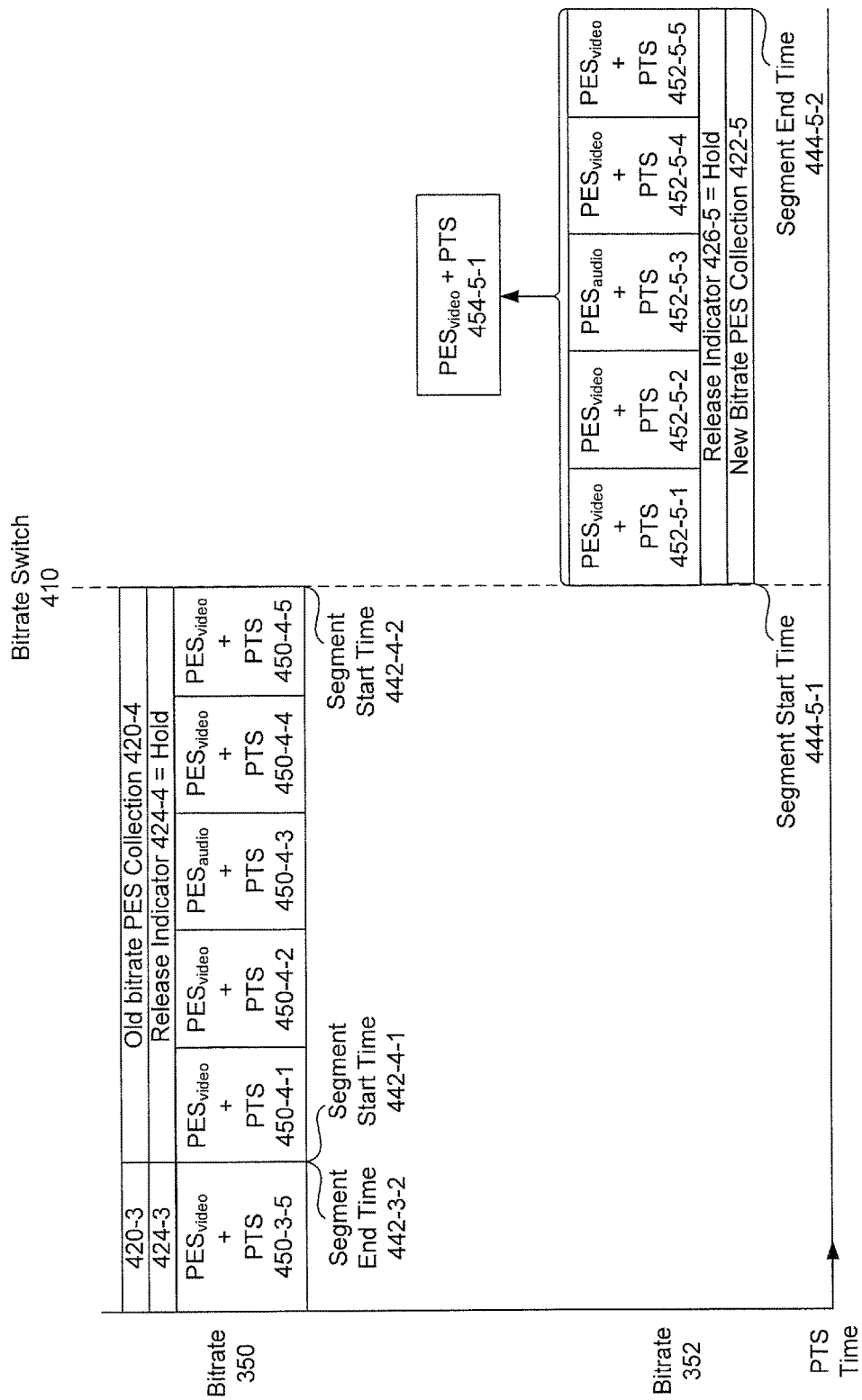
Figure 4D:
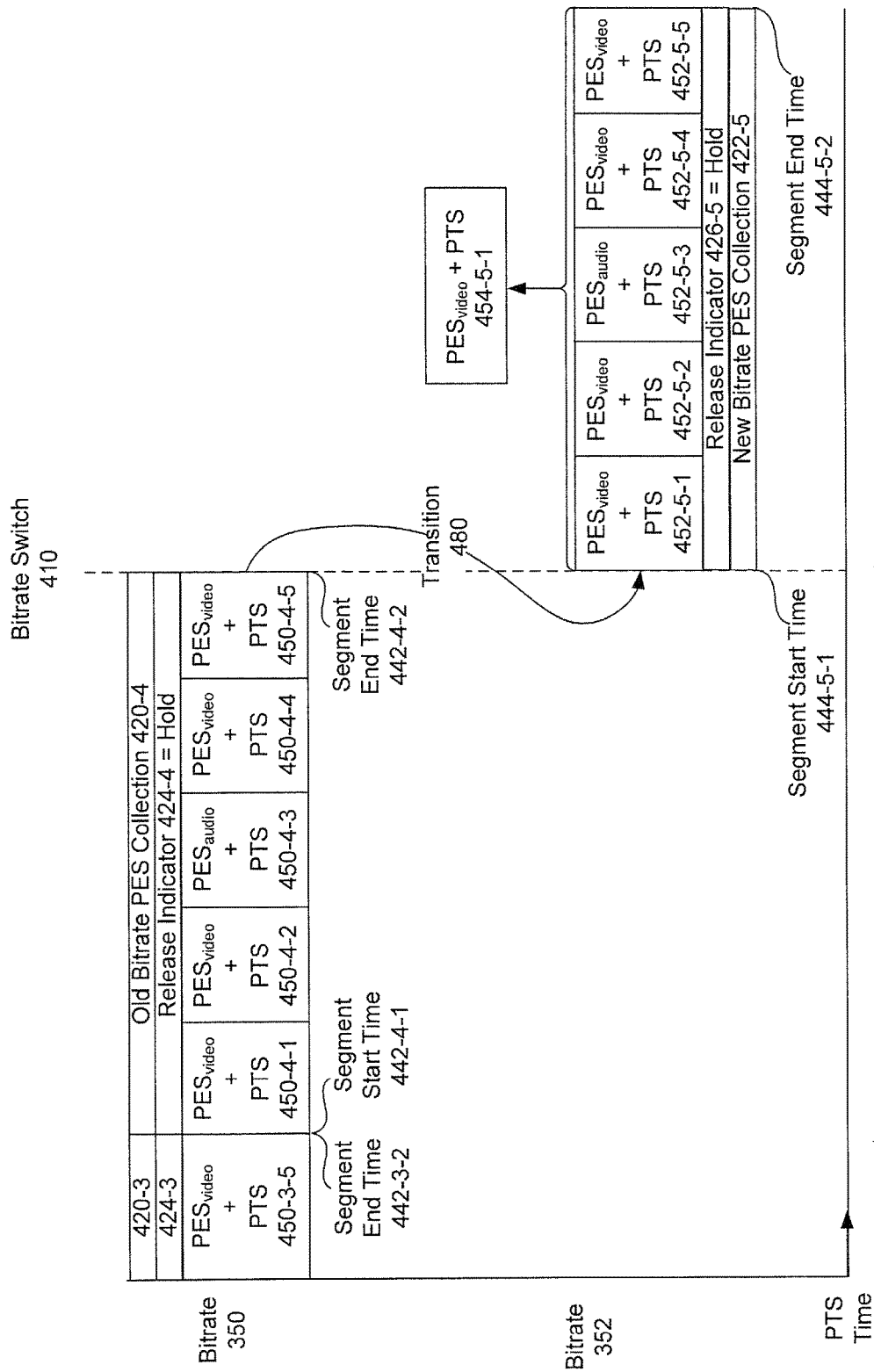

FIGS. 4A-4D illustrate a set of interactions for determining alignment between two different bitrate variant streams according to an example embodiment. Moreover, FIG. 4A illustrates an overview of the set of interactions for determining whether PES collections having different bitrates are aligned in order to provide a smooth and seamless playback when a media device switches between variant stream having different bitrates. FIGS. 4B-4D further illustrate the set of interactions for determining whether PES collections of different bitrates are aligned in the context HLS communications protocol with MPEG-4/H.264 and AAC encodings, when a media device (e.g., media device 114-1) switches from receiving a first variant stream having a first bitrate (i.e., old bitrate) to a second variant stream having a second bitrate (i.e., new bitrate) different than the first bitrate.

It may be appreciated that a bitrate switch may occur in response to a user or consumer request to switch to a different bitrate and/or automatically determined by the adaptive component of the media device (e.g., adaptive component 242 of media device 114-1) based at least partially on available network bandwidth and content description information associated with an user or a consumer selected or requested content.

As illustrated in FIG. 4A, a media device (e.g., media device 114-1) may receive one or more variant segments having an old bitrate 350 (e.g., old bitrate variant segment 320-2, 320-3, and 320-4). Subsequently, a bitrate switch 410 may occur where the media device (e.g., media device 114-1) may then receive a variant segment having a new bitrate 352 (e.g., new bitrate variant segment 322-5). The new bitrate variant segment 322-5 may be temporally subsequent and/or adjacent to the last old bitrate variant segment 320-4

In an embodiment, the new bitrate variant segment 322-5 may be temporally subsequent to the last old bitrate variant segment 320-4, when the new bitrate variant segment 322-5 include one or more video frames, audio frames, and/or other frames that are to be presented to a viewer (e.g., an user or a consumer watching streamed content) after a last frame in the old bitrate variant segment 320-4 have already been presented. This may occur when a PTS of one or more frames of the new bitrate variant segment 322-5 temporally subsequent to a last PTS of the last frame the old bitrate variant segment 320-4.

In an embodiment, the new bitrate variant segment 322-5 may also be temporally adjacent when a segment end time associated with the last old bitrate variant segment 320-4 substantially matches a segment start time associated with new bitrate variant segment 322-5. The segment end time may substantially match the segment start time, when: (1) the segment end time is equal to the segment start time; or (2) the time difference between segment end time and segment start time is within a maximum tolerance offset (e.g., one frame duration, etc.) for a given frame rate. The given frame rate may be identified by the parameter information associated with variant stream 322 or variant stream 320. It may be appreciated that because the maximum tolerance offset may be measured in frame durations (e.g., one frame duration, two frames duration, etc.) rather than units of time (e.g., seconds, milliseconds, etc.), the maximum tolerance offset may vary based on a given frame rate associated with the variant stream.

As one or more variant segments are received, the segment processing component (e.g., segment processing component 244 of media device 114-1, etc.) may analyze and preprocess each received variant segment to generate a corresponding PES collection for each variant segment. For example, the segment processing component may generate old bitrate PES collections 420-2, 420-3, and 420-4 corresponding to old bitrate variant segments 320-2, 320-3, and 320-4, respectively. Similarly, the segment processing component may also generate new bitrate PES collection 422-5 corresponding to new bitrate variant segment to 322-5.

Each PES collection may also include or be associated with a release indicator, which may be initially set to hold, for indicating that the associated PES collection and/or corresponding variant segment is held in a processing buffer for segment processing by segment processing component (e.g., segment processing component 244 of media device 114-1, etc.). The release indicator of each PES collection may be later updated to release for indicating that the associated PES collection may be released to the decoder component (e.g., decoder component 248 of media device 114-1) for de-multiplexing, decoding, and playback. Each PES collection may further include one or more PES collection elements further discussed with respect to FIGS. 4B-4D.

Depending on implementation, the release indicator, may be implemented as a flag that indicates the PES collection is either held for processing or released to the decoder component. In addition to or alternative to the flag implementation, a shared pointer or reference (e.g., a reference counting smart pointer, etc.) may also be used to hold and/or release one or more PES collections in a processing buffer for further processing by the segment processing component. In implementations where the flag implementation and/or the shared pointer implementation is used, the release indicator may indicate whether the PES collection is held and available for processing, i.e., still properly referenced by the shared pointer or is otherwise released, i.e., no longer referenced by the shared pointer (e.g., a null pointer or null reference).

As previously discussed, the segment processing component (e.g., segment processing component (e.g., segment processing component 244 of media device 114-1, etc.) may be configured in low latency segment processing configuration or in extended selection segment processing configuration. In extended selection segment processing configuration, which is illustrated in FIG. 4A the segment processing component may be configured to continuously: (1) buffer and/or hold at least three PES collections (e.g., old bitrate PES collections 420-3 and 420-4, and new bitrate PES collection 422-5) generated based on requested and received variant segments (e.g., old bitrate variant segment 320-3 and 320-4, and new bitrate PES collection 322-5); (2) perform appropriate segment processing (e.g., splicing, alignment, etc.) on the buffered and/or held PES collections based at least partially on whether a bitrate switch (e.g., bitrate switch 410) has occurred; and (3) release one or more of the at least three buffered and/or held PES collections (or portion thereof) based on ordering of the PES collections in the processing buffer, where steps (1), (2), and (3) may be repeated until all variant segments are requested and received or the process is otherwise interrupted.

It may be appreciated that while FIG. 4A illustrates the segment processing component configured in extended selection segment processing configuration, the segment processing component may also be configured in low latency segment processing configuration. In low latency segment processing configuration, the segment processing component may be configured to continuously: (1) buffer and/or hold at least two PES collections (e.g., old bitrate PES collection 420-4 and new bitrate PES collection 422-5 but not old bitrate PES collection 420-3 as illustrated FIG. 4A) generated based on requested and received variant segments (e.g., old bitrate variant segment 320-4 and new bitrate variant segment 322-5); (2) perform appropriate segment processing (e.g., splicing, alignment, etc.) on the buffered and/or held PES collections based at least partially on whether a bitrate switch (e.g., bitrate switch 410) has occurred; and (3) release one or more of the at least two buffered and/or held PES collections (or portion thereof) (e.g., old bitrate PES collection 420-4) based on the ordering in the processing buffer, where steps (1), (2), and (3) may be repeated until all variant segments are requested and received or the process is otherwise interrupted.

In an embodiment, because variant segments may be multiplexed to include both encoded audio information and encoded video information, Each PES collection element of a PES collection may also include a PES packet of having a particular PES type. Thus, a PES collections element may include a $PES_{video}$ packet for encapsulating encoded video information. Additionally, or alternatively, a PES collection element may include a $PES_{audio}$ packet encapsulating encoded audio information. Each PES collection element may further include associated PTS. It may be appreciated that while PES packets having other PES types as known in the art (e.g., $PES_{subtitle}$ packet for encapsulating subtitle information), for purposes of clarification, discussions and illustrations may be limited to PES collection elements that include only $PES_{audio}$ packets and/or $PES_{video}$ packets. However, the one or more PES collection elements may also include PES packets having other PES types as known in the art.

In an embodiment, each PES collection may also be associated with a segment start time and segment end time, which may be determined based at least partially on the PTS associated with a PES packet that is first in time to be presented to a viewer (e.g., the user or consumer watching the display device 112-1 operatively coupled to the media device 114-1) in a PES collection and a PES packet that is last in time to be presented to a viewer. Additionally or alternatively, the segment start time and the segment end time associated with each variant segment may also be determined based at least partially on playback duration information associated with each variant segment.

To determine whether variant segments and their corresponding PES collections are aligned, the segment processing component (e.g., segment processing component 244 of the media device 114-1) may find and extract a video frame element 454-5-1 from the new bitrate PES collection 422-5. The extracted video frame element 454-5-1 may include a $PES_{video}$ packet that encapsulates a video frame that is first in time, among other video frames in the new bitrate PES collection 422-5, to be presented to a viewer based on PTS associated with that video frame. The segment processing component may further determine: (1) whether that video frame of the $PES_{video}$ packet is a key video frame ("key frame") and the $PES_{video}$ packet further includes associated parameter information; and (2) whether the segment start time of the new bitrate variant segment 322-5 matches the segment end time of the old bitrate variant segment 320-4.

In an embodiment, the key frame may be a complete coded picture, so that the decoder component (e.g., decoder component 248 of media device 114-1) may decode the key frame without reference to any other video frame. In the context of MPEG-2/H.222/H.262, this key frame may be known in the art as an intra-frame or I-Frame. In contrast to key frames, non-key frames or inter-frames may require the decoder component to reference prior and/or subsequent video frames for proper decoding. In the context of MPEG-2/H.222/H.262, non-key frames or inter-frames may include bi-directional predicted video frames also known in the art as B-Frames and predicted video frames also known in the art as P-Frames.

In addition to the above embodiment, the key frame may further mark all previous video frames or coded pictures released for decoding to be unused for reference, so that any video frames provided to the decoder component prior to the key frame may not be referenced by any video frames provided after the key frame. In the context of MPEG-4/H.264, this key frame may also be known in the art as an Instantaneous Decoder Refresh (IDR) Frame.

In an embodiment, the parameter information may include video resolution information for indicating resolution of the video for playback, aspect ratio information for indicating the aspect ratio information of the video, the frame rate information for indicating the frame rate of the video, or any other information necessary to properly decode the key frame and subsequent video frames. In the context of MPEG-4/H.264, the parameter information may also be known in the art as a Sequence Parameter Set (SPS) and a Picture Parameter Set (PPS).

In an embodiment, the segment processing component may further determine that variant segments and their corresponding PES collections are aligned, when: (1) the extracted video frame to be decoded first in the new bitrate PES collection 422-5 is a key frame (e.g., in the context of MPEG-4/H.264, an IDR Frame) having associated parameter information; and (2) the segment start time of the new bitrate variant segment 322-5 substantially matches the segment end time of the old bitrate variant segment 320-4. Otherwise, splicing and/or alignment may be required which is further discussed with respect to FIGS. 5A-5D, 6, 7, and 8A-8G.

As illustrated in FIG. 4B, each generated old bitrate PES collection 420-3, 420-4, and 422-5 may include one or more PES collection elements and a release indicator. For example, old bitrate PES collection 420-4 may include PES collection elements 450-4-1, 450-4-2, 450-4-3, 450-4-4, and 450-4-5 and a release indicator 424-4. Similarly, the new bitrate PES collection may include PES collection elements 452-4-1, 452-4-2, 452-4-3, 452-4-4, and 452-4-5 and a release indicator 426-5.

The PES collection elements 450-4-1, 450-4-2, 450-4-4, and 450-4-5 may each include a $PES_{video}$ packet and its associated PTS. The $PES_{video}$ packet may include encoded video information representative of a video frame such as an IDR Frame, a P-Frame, or a B-Frame. Optionally, one or more PES collection elements 450-4-1, 450-4-2, 450-4-4, and/or 450-4-5 may also include associated parameter information such as SPS and PPS. Similarly, new bitrate PES collection elements 452-5-1, 452-5-2, 452-5-4, and 452-5-5, may each include a $PES_{video}$ packet and its associated PTS. Optionally, one or more PES collection elements 452-5-1, 452-5-2, 452-5-4, and/or 452-5-5 may also include associated parameter information such as SPS and PPS.

Because variant segments may also include multiplexed encoded audio and video information, the PES collection element 450-4-3 may include a $PES_{audio}$ packet and associated PTS, where the $PES_{audio}$ packet may include encoded audio information representative of an audio frame (e.g., an AAC Frame). Similarly, the PES collection element 452-5-3 may also include a $PES_{audio}$ packet and associated PTS, where the $PES_{audio}$ packet may include encoded audio information representative of an audio frame (e.g., an AAC Frame).

The old bitrate PES collection 420-4 may also be associated with a segment start time 442-4-1 and a segment end time 442-4-2 which may be determined based at least partially on the PTS in the PES collection element 450-4-1 and the PTS in the PES collection element 450-4-5, respectively. Similarly, the new bitrate PES collection 422-5 may also be associated with a segment start time 444-5-1 and a segment end time 444-5-2 which may be determined based at least partially on the PTS in the PES collection element 452-5-1 and the PTS in the PES collection element 452-5-5, respectively. It may be appreciated that while only a limited number of $PES_{video}$ packets and $PES_{audio}$ packets and permutations of their arrangements are illustrated, the example is not limited in this context.

As illustrated in FIG. 4C, to determine whether the old bitrate PES collection 420-4 and the new bitrate PES collection 422-5 are aligned, the segment processing component 244 may find and extract a video frame element 454-5-1 from the new bitrate PES collection 422-5 that includes $PES_{video}$ packet. where the $PES_{video}$ packet may include a video frame that is first in time to be presented to a viewer (e.g., the user or consumer watching the display device 112-1) by the output component (e.g., output component 236 of media device 114-1 operatively coupled to the display device 112-1), among other video frames, in the new bitrate PES collection 422-5. The video frame element 454-5-1 may be found by, for example, searching the new bitrate PES collection 422-5 for a PES collection element that has the earliest PTS (e.g., PES collection element 452-5-1) among all PES collection elements (e.g., PES collection elements 452-5-1, 452-5-2, 452-5-3, 452-5-4, 452-5-5) in the new bitrate PES collection 422-5.

The segment processing component 244 may further analyze the video frame element 454-5-1 and determine: (1) whether the video frame encapsulated in the $PES_{video}$ packet of the video frame element 454-5-1 is an IDR Frame and if the video frame is an IDR Frame, whether the $PES_{video}$ packet also includes associated SPS and PPS; and (2) whether the segment start time 444-5-1 of the new bitrate variant segment 322-5 matches the segment end time 442-4-2 of the old bitrate variant segment 320-4.

As illustrated in FIG. 4D, the segment processing component 244 may further determine that old bitrate PES collection 420-4 is aligned with new bitrate PES collection 422-5 for a smooth and seamless bitrate transition 480, when: (1) the $PES_{video}$ packet of the extracted video frame element 454-5-1 includes an IDR Frame having associated SPS and PPS; and (2) the segment start time 444-5-1 of the variant segment 322-5 matches the segment end time 442-4-2 of the prior variant segment 320-4. Additionally, because PES collection 420-4 is aligned with PES collection 422-5 and assuming that the segment processing component 244 is configured in extended selection segment processing configuration, the release indicator 424-3 for PES collection 420-3 may be updated to release, so that the PES collection 420-3 may be provided to the decoder component 248 for decoding. Otherwise, the segment processing component 244 may determine that splicing and/or alignment may be required, which is further discussed with respect to FIGS. 5A-5D, 6, 7, and 8A-8G.

It may be appreciated that in extended selection segment processing configuration, the release indicators 424-4 and 426-5 for PES collections 420-4 and 422-5, respectively, may not be updated from hold to release (i.e., remain as hold) at this time, because the PES collections 420-4 and 422-5 may require processing (e.g., splicing, alignment, etc.), when another bitrate switch occurs right after new bitrate PES collection 422-5 (e.g., a bitrate switch occurs between the segment start time and segment end time of a new bitrate PES collection 422-6 (not shown) that may be temporally subsequent and adjacent to the new bitrate PES collection 422-5, etc.). Alternatively, when the segment processing component 244 is configured in low latency segment processing configuration, the release indicator 424-3 for PES collection 420-3 may have been previously updated from hold to release and the release indicator 424-4 for PES collection 420-4 may be updated from hold to release while the release indicators 426-5 for PES collection 422-5 will remain as hold.

Figure 5A:
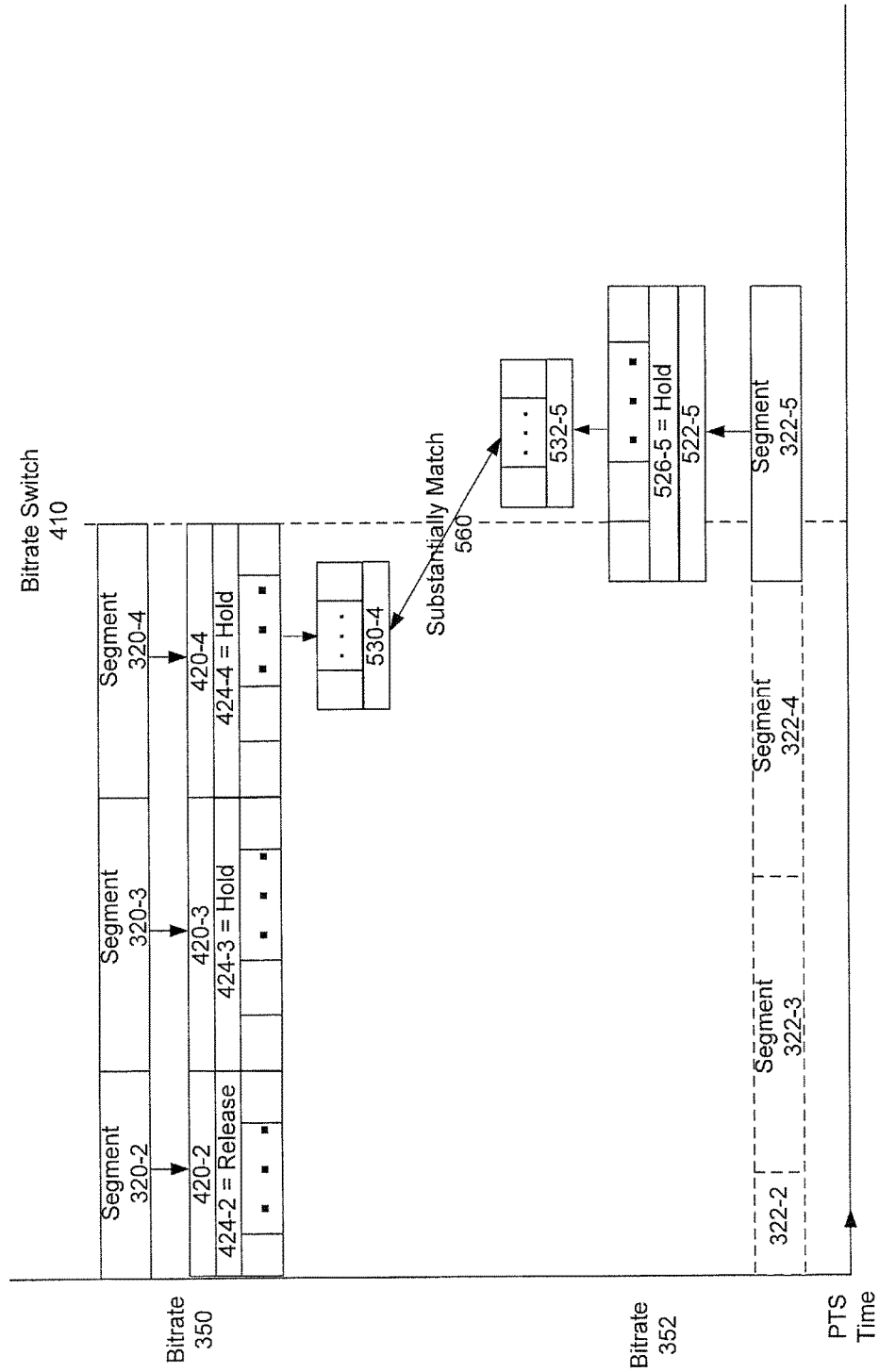
FIGS. 5A-5D illustrates a set of interactions for determining a first in-tolerance splicing location between two different bitrate variant streams according to an example embodiment.
Figure 5B:
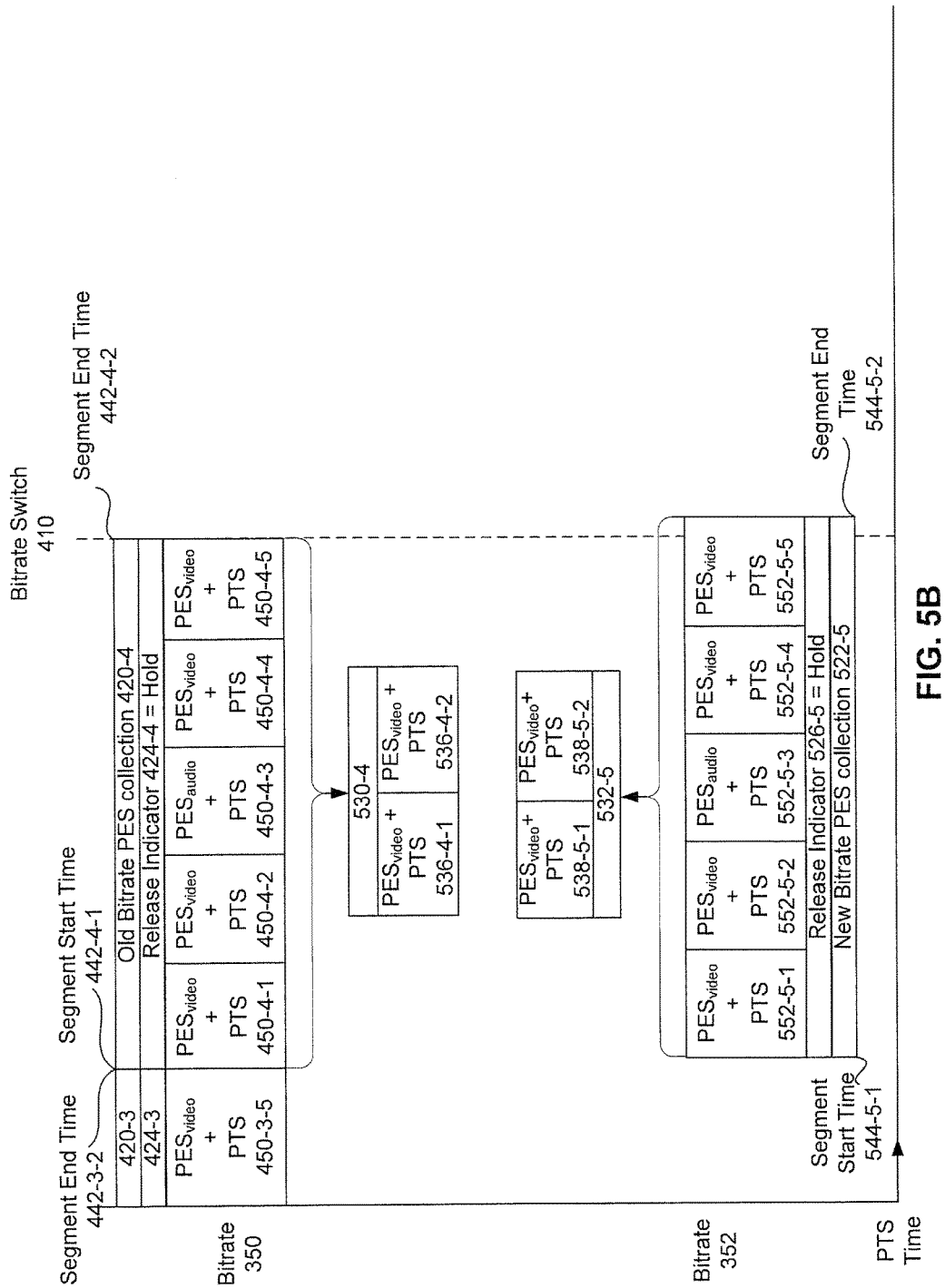
Figure 5C:
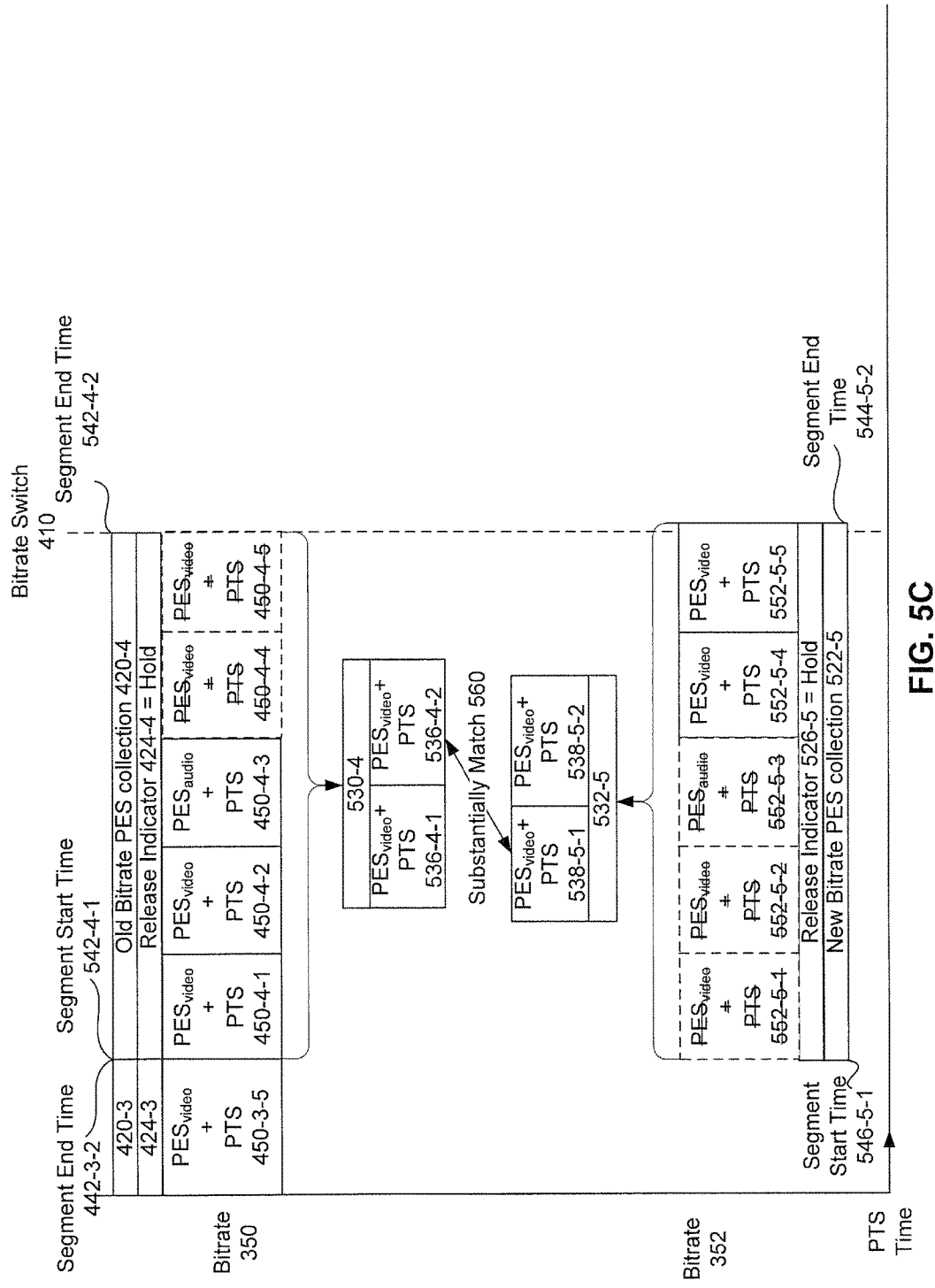
Figure 5D:
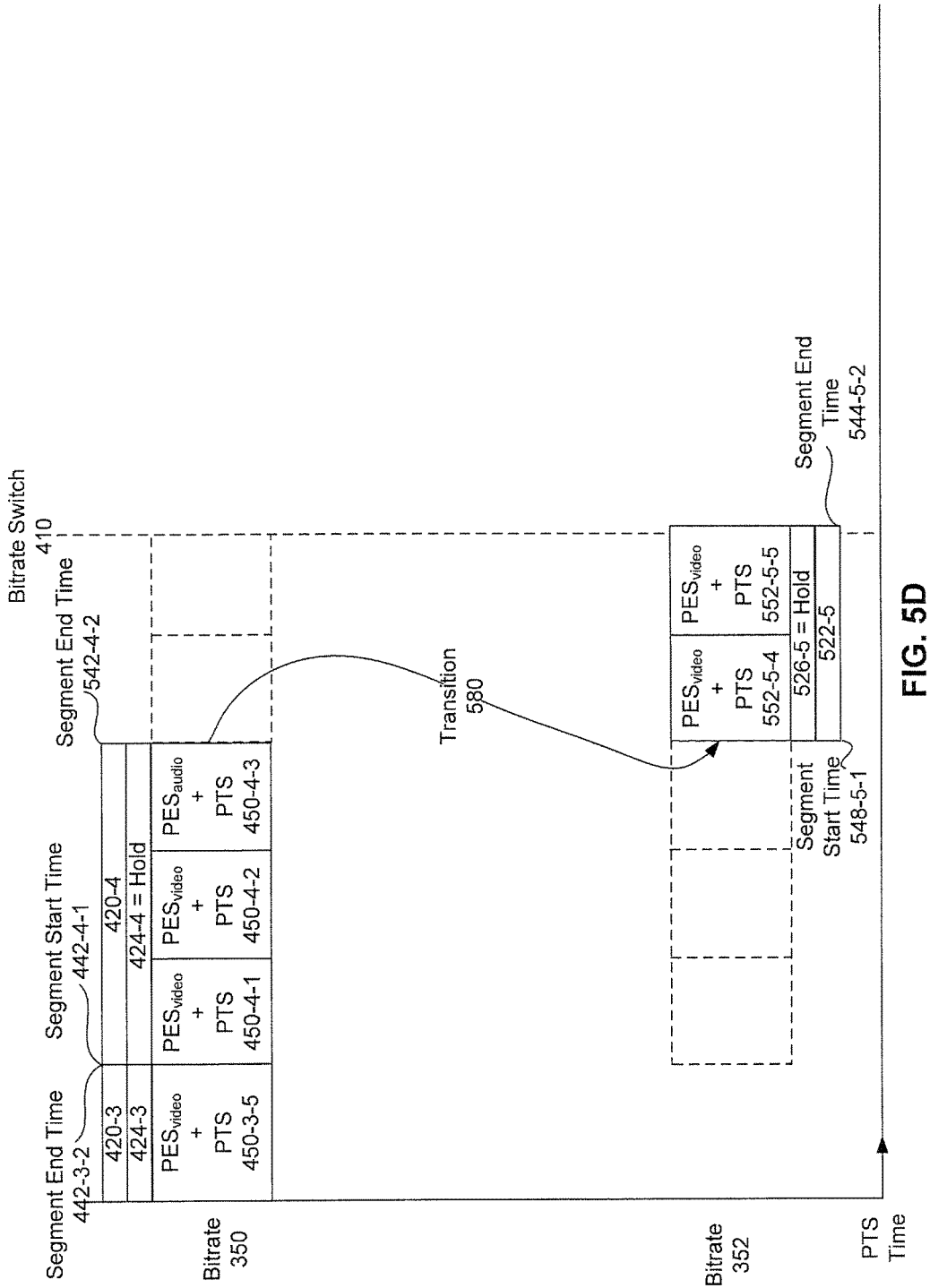

FIGS. 5A-5D illustrates a set of interactions for determining a first in-tolerance splicing location between two different bitrate variant streams according to an example embodiment. Moreover, FIG. 5A illustrates an overview of the set of interactions for determining an in-tolerance splicing location between two PES collections having different bitrates, when splicing is required to provide a smooth and seamless playback during a bitrate switch 410. FIGS. 5B-5D further illustrate the set of interactions for determining the in-tolerance splicing location between two different PES collections having different bitrates, when a media device (e.g., media device 114-1) switches from receiving a first variant stream having an old bitrate (i.e., old bitrate variant stream 320) to a second variant stream having a new bitrate (i.e., new bitrate variant stream 322) and the old bitrate variant segment is not aligned with the new bitrate variant segment.

As illustrated in FIG. 5A and similarly discussed and illustrated with respect to FIG. 4A, a media device may receive one or more variant segments having an old bitrate 350 (e.g., old bitrate variant segments 320-2, 320-3, and 320-4). Subsequently, a bitrate switch 410 may occur where the media device may then receive a variant segment having a new bitrate 352 (e.g., new bitrate variant segment 322-5). The new bitrate variant segment may be partially temporally subsequent to the last variant segment received in the old bitrate 350 (e.g., old bitrate variant segment 340-4). Additionally, as the variant segments are received, the segment processing component may analyze and preprocess the received variant segments to generate a corresponding PES collection for each variant segment.

Also illustrated in FIG. 5A and similarly discussed and illustrated with respect to FIG. 4A, the segment processing component (e.g., segment processing component 244 of media device 114-1, etc.) may also be configured in extended selection segment processing configuration.

However, unlike FIG. 4A, the new bitrate variant segment (e.g., new bitrate variant segment 322-5) may not be aligned and may even temporally overlap with the old bitrate variant segment (e.g., old bitrate variant segment 320-4). Stated differently, unlike FIG. 4A, the new bitrate variant segment (e.g., new bitrate variant segment 322-5) may include one or more frames with associated PTS that are temporally prior to the last PTS of the last video frame of the old bitrate variant segment (e.g., old bitrate variant segment 320-4). Thus, in order to ensure a smooth and seamless transition as a result of the bitrate switch 410, splicing between old bitrate PES collection 420-4 and the new bitrate PES collection 522-5 corresponding to old bitrate variant segment 320-4 and new bitrate variant segment 322-5 may be required.

To determine a first in-tolerance splicing location for splicing the PES collections, segment processing component (e.g., segment processing component 244 of media device 114-1) may generate key frames collections 530-4 and 532-5 based on the old bitrate PES collection (e.g., old bitrate PES collection 420-4) and new bitrate PES collection (e.g., new bitrate PES collection 522-5), respectively. The generated key frames collections 530-4 and 532-5 may include all key frames in the old bitrate PES collection 420-4 and the new bitrate PES collection 522-5, respectively. Thus, each key frames collection may include one or more key frames collection elements. Furthermore, each key frames collection element of the one or more key frames collection elements may include: (1) a $PES_{video}$ packet that encapsulates a key frame; and (2) an associated PTS.

The segment processing component may further determine whether a PTS of the key frames collection 530-4 substantially matches a PTS of the key frames collection 532-5. The segment processing component may determine a first in-tolerance splicing location, when the PTS of the key frames collection 530-4 substantially match 560 the PTS of the key frames collection 532-5. The first in-tolerance splicing location may include an old bitrate PTS and a reference to an old bitrate PES collection. The first in-tolerance splicing location may also include a new bitrate PTS and a reference to a new bitrate PES collection. Otherwise, the segment processing component may determine a first out-of-tolerance splicing location and an associated first out-of-tolerance offset.

Based on the old bitrate PTS and the reference to the old bitrate PES collection, the segment processing component may further: (1) identify one or more old bitrate PES collection elements that includes a PTS that matches or is temporally subsequent to the old bitrate PTS (e.g., PES collection element 450-4-4 and PES collection element 450-4-5) from the referenced old bitrate PES collection (e.g., old bitrate PES collection 420-4); and (2) remove the one or more identified old bitrate PES collection elements (e.g., PES collection element 450-4-4 and PES collection element 450-4-5) from the referenced old bitrate PES collection (e.g., old bitrate PES collection 420-4). Similarly, based on the new bitrate PTS and the reference to the new bitrate PES collection, the segment processing component may further: (1) identify all new bitrate PES collection elements temporally prior to the new bitrate PTS (e.g., PES collection elements 552-5-1, 552-5-2, and 552-5-3) from the referenced new bitrate PES collection (e.g., new bitrate PES collection 522-5); and (2) remove the one or more identified new bitrate PES collection elements from the referenced new bitrate PES collection (e.g., new bitrate PES collection 522-5).

As illustrated in FIG. 5B, old bitrate PES collection 420-4 may include similar PES collection elements as those illustrated and discussed with respect to FIG. 4B. The new bitrate PES collection 522-5 may include PES collection elements 552-5-1, 552-5-2, 552-5-3, 552-5-4, and 552-5-5. The PES collection 522-5 may be associated with a segment start time 544-5-1 and a segment end time 544-5-2 which may be determined based at least partially on the PTS in the PES collection element 552-5-1 and the PTS in the PES collection element 552-5-5, respectively. However, because old bitrate PES collection 420-4 and the new bitrate PES collection 522-5 are not aligned, segment end time 442-4-2 of old bitrate PES collection 420-4 may not match segment start time 544-5-1 of new bitrate PES collection 522-5. Moreover, the segment end time 442-4-2 of old bitrate PES collection 420-4 may be temporally subsequent to the segment start time 544-5-1 of new bitrate PES collection 522-5, which indicates an overlap between old bitrate PES collection 420-4 and new bitrate PES collection 522-5.

To determine a splicing location for aligning old bitrate PES collection 420-4 and new bitrate PES collection 522-5 and to ensure a smooth and seamless content playback when transitioning between variant streams of different bitrates, the segment processing component 244 may generate key frames collection 530-4 for the last old bitrate variant segment 320-4 based on the old bitrate PES collection 420-4 and key frames collection 532-5 for the new bitrate variant segment 322-5 based on new bitrate PES collection 522-5. The key frames collections 530-4 and 532-5 may include all key frames in the old bitrate PES collection 420-4 and the new bitrate PES collection 522-5, respectively.

In an embodiment, the key frames collection 530-4 may include key frames collection element 536-4-1 and 536-4-2 and the key frames collection 532-5 may include key frames collection element 538-5-1 and 538-5-2. Assuming that PES collection elements 450-4-1, 450-4-4, 452-5-1, and 452-5-4 include the IDR Frames of their respective PES collections 420-4 and 522-5, each of the key frames collection elements 536-4-1, 536-4-2, 538-5-1, and 538-5-2 may include an IDR Frame and associated SPS and PPS encapsulated in a $PES_{video}$ packet and associated PTS. Additionally, each of the key frames collection elements 536-4-1, 536-4-2, 538-5-1, and 538-5-2 may also correspond to PES collection elements 450-4-1, 450-4-4, 452-5-1, and 452-5-4, respectively. The embodiment is not limited in this context.

As illustrated in FIG. 5C, the segment processing component 244 may further determine whether a key frame element in the key frames collection 530-4 includes a PTS that substantially match 560 a PTS of a key frame element of the key frames collection 532-5. The segment processing component may determine that a PTS of key frames collection element 536-4-2 may substantially match 560 a PTS of the key frames collection element 538-5-1, when the PTS of the key frames collection element 536-4-2 is the same as the PTS of the key frames collection element 538-5-1. Additionally or alternatively, the segment processing component 244 may also determine that the PTS of key frames collection element 536-4-2 substantially match 560 the PTS of the key frames collection element 538-5-1, when the PTS of the key frames collection element 536-4-2 is within a maximum tolerance offset of the PTS of the key frames collection element 538-5-1.

In an embodiment, the segment processing component 244 may determine whether the PTS of the key frames collection element 536-4-2 is within the maximum tolerance offset of the PTS of the key frames collection element 538-5-1 by: (1) calculating a difference in time (i.e., calculated time difference) between the PTS of the key frames collection element 536-4-2 and the PTS of the key frames collection element 538-5-1; and (2) determining whether the calculated time difference is within the maximum tolerance offset for a given frame rate (e.g., 24 frames per second, 29.97 frames per second, 60 frames per second, etc.). The given frame rate may be identified by the parameter information associated with a variant stream. It may be appreciated that because the maximum tolerance offset may be measured in frame durations (e.g., one frame duration, two frames duration, etc.) rather than units of time (e.g., seconds, milliseconds, etc.), the maximum tolerance offset may vary based on a given frame rate associated with the variant stream.

The segment processing component 244 may further determine a first in-tolerance splicing location, when the PTS of the key frames collection 530-4 substantially match 560 the PTS of the key frames collection 532-5. For example, the segment processing component 244 may further determine a first in-tolerance splicing location, when the PTS of the PES key frames element 536-4-2, which corresponds to PES collection element 450-4-4, substantially match 560, within one frame duration, the PTS of the PES key frames element 538-5-1, which corresponds to PES collection element 552-5-4. Thus, assuming that the PTS of the PES key frames element 538-5-1, which again corresponds to PES collection element 552-5-4, actually has a PTS that is equal to PTS of the PES collection element 552-5-2. Assuming that the PES collection element 552-5-2 encodes a frame (e.g., a P-Frame, B-Frame, etc.) that is one frame in duration prior to the frame (e.g., IDR Frame) encoded in PES collection element 552-5-4, then a substantial match 560 with in a maximum tolerance offset of plus or minus one frame may still occur, because the PTS of the PES key frames element 536-4-2 would be one frame in duration in advance of the PTS of the PES key frames element 538-5-1.

Assuming that the PTS of the key frames collection element 536-4-2 substantially matches the PTS of the key frames collection element 538-5-1, the first in-tolerance splicing location may include the PTS of the key frame element 536-4-2 as an old bitrate PTS and a reference to old bitrate PES collection that corresponds to the key frames collection 530-4, i.e., old bitrate PES collection 420-4. Similarly, the first in-tolerance splicing location may also include the PTS of the key frame element 538-5-1 as a new bitrate PTS and a reference to new bitrate PES collection that corresponds to the key frames collection 532-5, i.e., new bitrate PES collection 522-5.

Based on the old bitrate PTS and reference to the old bitrate PES collection 420-4, the segment processing component 244 may: (1) identify PES collection elements 450-4-4 and 450-4-5 from the referenced old bitrate PES collection 420-4 as having PTSes that match or are temporally subsequent to the old bitrate PTS; and (2) remove the identified PES collection elements 450-4-4 and 450-4-5 from the referenced old bitrate PES collection 420-4.

Based on the new bitrate PTS and reference to the new bitrate PES collection 522-5, the segment processing component 244 may also: (1) identify PES collection elements 552-5-1, 552-5-2, and 552-5-3 from the referenced new bitrate PES collection 522-5 as having PTSes that are temporally prior to the new bitrate PTS; and (2) remove the identified PES collection elements 552-5-1, 552-5-2, and 552-3 from the referenced new bitrate PES collection 522-5. It may be appreciated that the segment processing component 244 may not identify or remove PES collection element 552-5-4, even though the PTS of the PES collection element 552-5-4 may match the new bitrate PTS.

Alternatively, the segment processing component 244 may determine a first out-of-tolerance splicing location with an associated first out-of-tolerance offset, when a PTS of the key frames collection 530-4 substantially matching a PTS of the key frames collection 532-5 within the maximum tolerance offset cannot be identified. In such circumstances, the first out-of-tolerance splicing location may include an old bitrate PTS and a reference to an old bitrate PES collection. The first out-of-tolerance splicing location may also include a new bitrate PTS and a reference to a new bitrate PES collection, where the included old bitrate PTS and the included new bitrate PTS may have the lowest calculated time difference among all calculated time differences between old bitrate PTSes within the old bitrate PES collection and new bitrate PTSes within the new bitrate PES collection. The segment processing component 244 may also determine the first out-of-tolerance offset as the lowest calculated time difference between the old bitrate PTSes and the new bitrate PTSes.

It may be appreciated that when a PTS of the key frames collection 530-4 substantially matching a PTS of the key frames collection 532-5 cannot be identified, the segment processing component 244 may further request additional variant segments having the new bitrate 352 and determine in-tolerance splicing locations based on the requested additional variant segments. These operations are further discussed and illustrated with respect to FIGS. 6 and 7.

As illustrated in FIG. 5D, after removing the respective PES collection elements, a seamless or near seamless bitrate transition 580 may exist between the respective remaining portions of the old bitrate PES collection 420-4 and the new bitrate PES collection 522-5. The segment processing component 244 may also update the segment end time 442-4-2 to segment end time 542-4-2 based at least partially on PTS of the PES collection element 450-4-3. Similarly, the segment processing component 244 may update the segment start time 546-5-1 to segment start time 458-5-1 based at least partially on PTS of the PES collection element 552-5-4. Additionally, assuming that the segment processing component is configured in extended selection segment processing configuration, because old bitrate PES collections 420-4 and the new bitrate PES collections 522-5 have been spliced, the release indicator 424-3 for the old bitrate PES collection 420-3 may be updated from hold to release, so that the PES collection 420-3 may be provided to the decoder component 248 for de-multiplexing, decoding, and playback.

It may be appreciated that in extended selection segment processing configuration, the release indicators 424-4 and 526-5 for PES collections 420-4 and 522-5, respectively, may not be updated from hold to release (i.e., remain as hold) at this time, because the PES collections 420-4 and 522-5 may require processing (e.g., splicing, alignment, etc.), when another bitrate switch occurs right after new bitrate PES collection 522-5 (e.g., a bitrate switch occurs between the segment start time and segment end time of a new bitrate PES collection 522-6 (not shown) that may be temporally subsequent and adjacent to the new bitrate PES collection 522-5, etc.). Alternatively, when the segment processing component 244 is configured in low latency segment processing configuration, the release indicator 424-3 for PES collection 420-3 may have been previously updated from hold to release, and the release indicator 424-4 for PES collection 420-4 may be updated from hold to release while the release indicators 526-5 for PES collection 522-5 will remain as hold.

Figure 6:
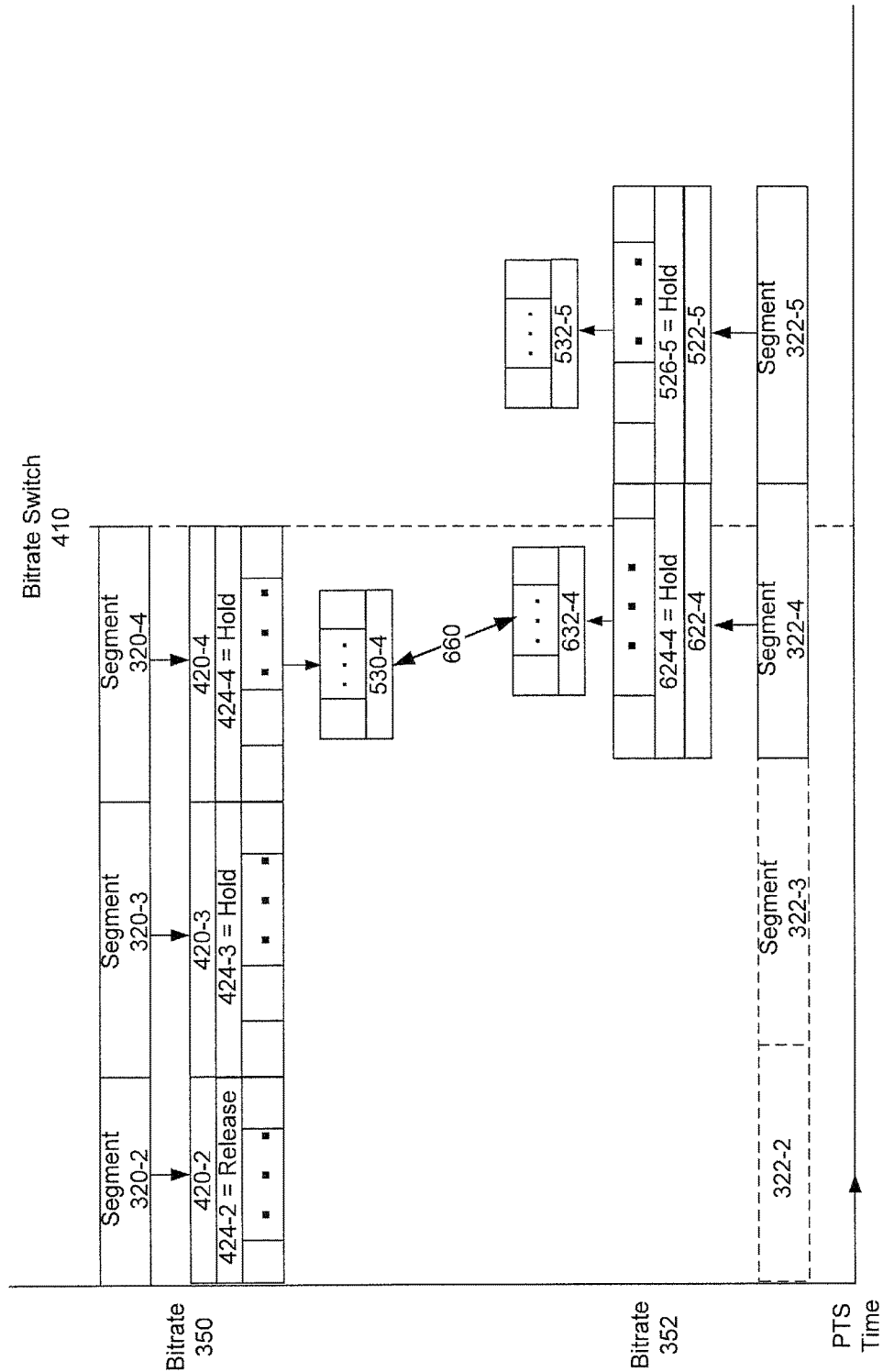
FIG. 6 illustrates a set of interactions for determining a second in-tolerance splicing location between two different bitrate variant streams according to an example embodiment.

FIG. 6 illustrates a set of interactions for determining a second in-tolerance splicing location between two different bitrate variant streams according to an example embodiment.

As illustrated in FIG. 6 and similarly discussed and illustrated with respect to FIG. 5A, a media device may receive one or more variant segments, e.g., variant segment 320-2, 320-3, and 320-4 having a old bitrate 350. Subsequently, a bitrate switch 410 may occur where the media device may then receive a variant segment having a new bitrate 352 (i.e., new bitrate variant segment 322-5) that may be partially temporally subsequent to the last variant segment received in the old bitrate 350 (i.e., old bitrate variant segment 320-4). Thus, the new bitrate variant segment may not be aligned with the last old bitrate variant segment. Additionally, the segment processing component may analyze and preprocess the received variant segments to generate a corresponding PES collection for each variant segment. To ensure a smooth and seamless transition as a result of the bitrate switch 410, the segment processing component may further generate key frames collections 530-4 and 532-5 and determine a first in-tolerance splicing location.

As illustrated in FIG. 6 and similarly discussed and illustrated with respect to FIG. 5A, the segment processing component (e.g., segment processing component 244 of media device 114-1, etc.) may also be configured in extended selection segment processing configuration. Alternatively, the segment processing component (e.g., segment processing component 244 of media device 114-1, etc.) may be configured in low latency segment processing configuration.

However, unlike FIG. 5A, the PTS of the key frames collection 530-4 may not substantially match 560 the PTS of the key frames collection 532-5. Accordingly, the segment processing component may then generate a first out-of-tolerance splicing location with an associated tolerance offset using a similar set of operations as discussed with respect to FIGS. 5A and 5C.

To ensure that a smooth and seamless bitrate transition may still occur between variant streams having different bitrates when the substantial match 560 was not found, the segment processing component may further request, via the streaming component (e.g., stream component 240 of media device 114-1), a first prior new bitrate variant segment having the new bitrate 352. The first prior new bitrate variant segment may also be temporally prior and adjacent to the new bitrate variant segment 322-5.

After requesting the first prior new bitrate variant segment, the streaming component may receive the requested first prior new bitrate variant segment. The segment processing component may then analyze and preprocess the first prior new bitrate variant segment to generate a corresponding first prior new bitrate PES collection 622-4 and buffer the first prior new bitrate PES collection 622-4 in the processing buffer. To determine a splicing location between the first prior new bitrate PES collection 622-4 and old bitrate PES collection 420-4, the segment processing component may generate first prior new bitrate key frames collection 632-4 and determine whether a PTS of the previously generated key frames collection 530-4 substantially matches a PTS of the first prior new bitrate key frames collection 632-4.

The segment processing component may further determine a second in-tolerance splicing location using similar set of operations discussed with respect to FIGS. 5A and 5C, when a PTS of the old bitrate key frames collection 530-4 substantially match 660 the PT'S of the first prior new bitrate key frames collection 632-4. Otherwise, the segment processing component may determine a second out-of-tolerance splicing location with an associated second out-of-tolerance offset between a PTS of the old bitrate key frames collection 530-4 and a PTS of the first prior new bitrate key frames collection 632-4, also using similar set of operations discussed and illustrated with respect to FIGS. 5A and 5C.

After determining the second out-of-tolerance splicing location, the segment processing component may determine whether the prior old bitrate PES collection (e.g., prior old bitrate PES collection 420-3) is still available for further processing, i.e., still held in a processing buffer based on whether the release indicator (e.g., release indicator 424-3) indicates that the prior old bitrate PES collection (e.g., prior old bitrate PES collection 420-3) is still being held or is otherwise released.

Assuming that prior old bitrate PES collection (e.g., prior old bitrate PES collection 420-3) has been released or is otherwise not available for processing, then the segment processing component may select a out-of-tolerance splicing location (i.e., a first selected out of tolerance splicing location) among the previously determined first and second out-of-tolerance splicing locations that has the lowest tolerance offset among their corresponding first and second out-of-tolerance offsets. This may ensure that when a substantial match cannot be found at this time and the prior old bitrate PES collection (e.g., prior old bitrate PES collection 420-3) is no longer held or available, a closest out-of-tolerance splicing location may be used to provide a near seamless transition. Additionally, while using an out-of-tolerance splicing location may result in a brief pause or freeze during playback, substantially noticeable and undesirable visual artifacts, such as, for example, macro-blocking artifacts, may be prevented.

Based on an old bitrate PTS and a reference to an old bitrate PES collection (e.g., old bitrate PES collection 420-4) of the second in-tolerance splicing location or the first selected out-of-tolerance splicing location, the segment processing component may, using similar set of operations discussed and illustrated with respect to FIGS. 5A and 5C: (1) identify one or more old bitrate PES collection elements that includes a PTS that matches or is temporally subsequent to the old bitrate PTS from the referenced old bitrate PES collection (e.g., old bitrate PES collection 420-4); and (2) remove the one or more identified PES collection elements from the referenced old bitrate PES collection (e.g., old bitrate PES collection 420-4).

Similarly, a new bitrate PTS and a reference to a new bitrate PES collection (e.g., first prior new bitrate PES collection 622-4 or new bitrate PES collection 522-5) of the second in-tolerance splicing location or the first selected out-of-tolerance splicing location, the segment processing component may, using similar set of operations discussed and illustrated with respect to FIGS. 5A and 5C: (1) identify one or more new bitrate PES collection elements that includes a PTS that is temporally prior to the new bitrate PTS from the referenced new bitrate PES collection (e.g., first prior new bitrate PES collection 622-4, or new bitrate PES collection 522-5); and (2) remove the one or more identified PES collection elements temporally prior to the new bitrate PTS from the referenced new bitrate PES collection (e.g., first prior new bitrate PES collection 622-4 or new bitrate PES collection 522-5).

Figure 7:
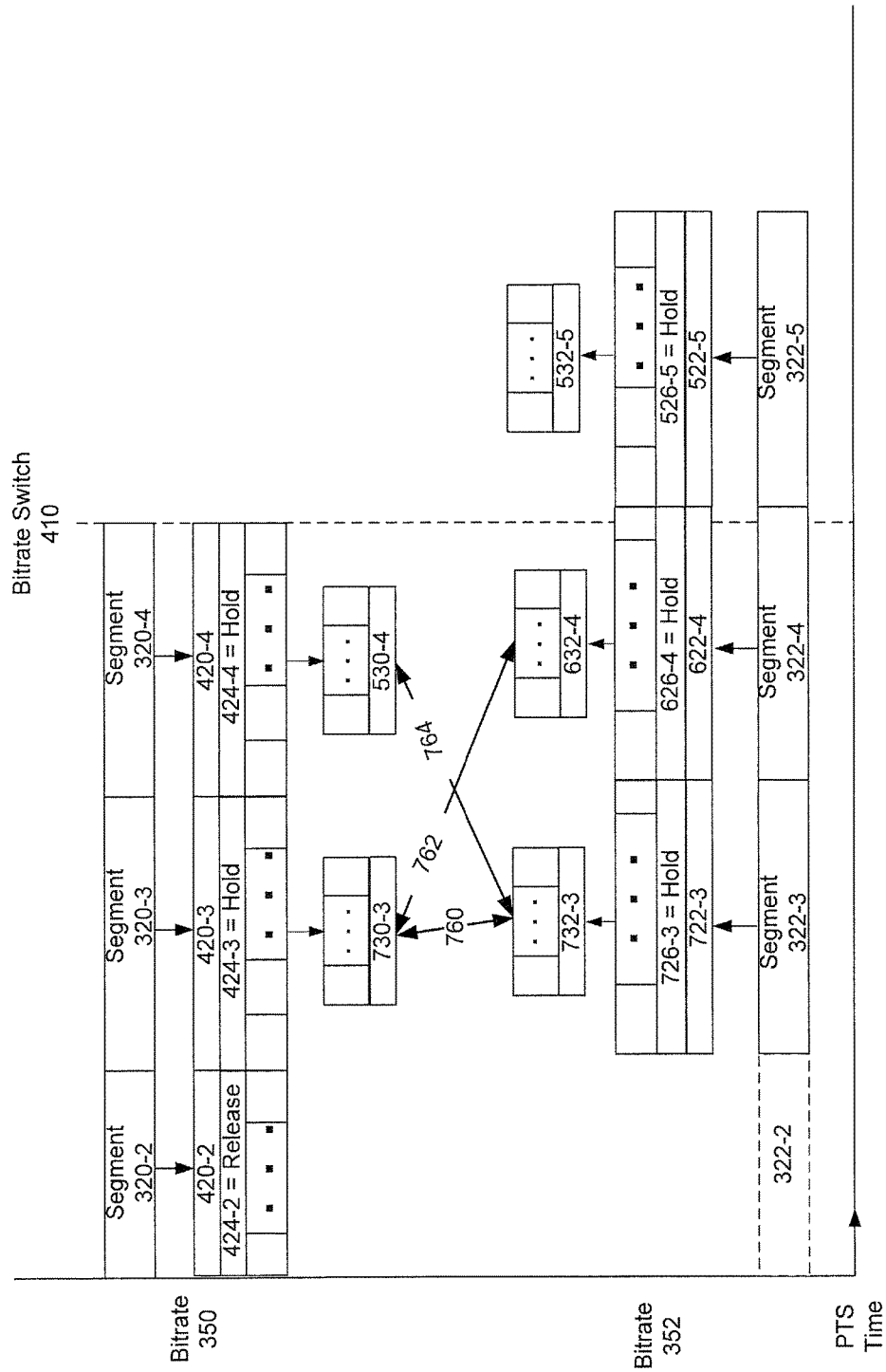
FIG. 7 illustrates a set of interactions for determining a third in-tolerance splicing location between two different bitrate variant streams according to an example embodiment.

FIG. 7 illustrates a set of interactions for determining a third in-tolerance splicing location between two different bitrate variant streams according to an example embodiment.

As illustrated in FIG. 7 and similarly discussed and illustrated with respect to FIGS. 6 and 5A, a media device may receive one or more variant segments (e.g., old bitrate variant segment 320-2, 320-3, and 320-4) having an old bitrate 350. Subsequently, a bitrate switch 410 may occur where the media device may then receive a variant segment (e.g., new bitrate variant segment 322-5) having a new bitrate 352 that is temporally subsequent and adjacent to the last variant segment received in the old bitrate 350 (e.g., old bitrate variant segment 340-4). The variant segment (e.g., new bitrate variant segment 322-5) may not be aligned with the old bitrate variant segment (e.g., old bitrate variant segment 320-4). Additionally, the processing component may analyze and preprocess the received variant segments to generate a corresponding PES collection for each variant segment. To ensure a smooth and seamless transition as a result of the bitrate switch 410, the segment processing component may further generate key frames collections 530-4 and 532-5 and determine a first in-tolerance splicing location.

As similarly discussed and illustrated with respect to FIG. 6, a substantial match 560 between the PTS of the key frames collection 530-4 and the PTS of the key frames collection 532-5 may not exist or may not be found. The segment processing component may then generate a first out-of-tolerance splicing location with an associated first out-of-tolerance offset. To ensure that a smooth and seamless bitrate transition may still occur between variant streams having different bitrates when the substantial match was not found, the segment processing component may further request the first prior new bitrate variant segment (e.g., first prior new bitrate variant segment 322-4).

After receiving the requested first prior new bitrate variant segment, the segment processing component may determine the second in-tolerance splicing location between the first prior new bitrate PES collection (e.g., first prior new bitrate PES collection 622-4) and old bitrate PES collection (e.g., old bitrate PES collection 420-4), the segment processing component may generate first prior new bitrate key frames collection (e.g., first prior new bitrate key frames collection 632-4) and determine whether a PTS of the previously generated old bitrate key frames collection (e.g., old bitrate key frames collection 530-4) substantially matches 660 a PTS of the first prior new bitrate key frames collection (e.g., first prior new bitrate key frames collection 632-4).

As illustrated in FIG. 7 and similarly discussed and illustrated with respect to FIG. 6, the segment processing component (e.g., segment processing component 244 of media device 114-1, etc.) may also be configured in extended selection segment processing configuration.

However, unlike FIG. 6, the segment processing component may determine that a substantial match 660 between the PTS of the old bitrate key frames collection (e.g., old bitrate key frames collection 530-4) and the PTS of the first prior new bitrate key frames collection (e.g., first prior new bitrate key frames collection 632-4) was not found. Thus, segment processing component may determine a second out-of-tolerance splicing location with an associated second out-of-tolerance offset between a PTS of the old bitrate key frames collection (e.g., old bitrate key frames collection 530-4) and a PTS of the first prior new bitrate key frames collection (e.g., first prior new bitrate key frames collection 632-4), using similar set of operations discussed and illustrated with respect to FIGS. 5A and 5C.

To further ensure that a smooth and seamless bitrate transition may still occur between variant streams having different bitrates when the substantial match 660 was not found, the segment processing component may further request, via the streaming component (e.g., stream component 240 of media device 114-1), a second prior variant segment having the new bitrate 352 (e.g., second prior new bitrate variant segment 322-3) that is temporally prior and adjacent to the first prior new bitrate variant segment (e.g., first prior new bitrate variant segment 322-4).

After requesting the second prior new bitrate variant segment, the streaming component may receive the requested second prior new bitrate variant segment. The segment processing component may then analyze and pre-process the second prior segment to generate a corresponding second prior new bitrate PES collection 722-3 and buffer the second prior new bitrate PES collection 722-3 in the processing buffer. To determine a third in-tolerance splicing location, the segment processing component may generate a second prior new bitrate key frames collection 732-3 and a prior old bitrate key frames collection 720-3.

The segment processing component may further determine the third in-tolerance splicing location when: (1) a PTS of the prior old bitrate key frames collection 730-3 substantially match 760 a PTS of the second prior new bitrate key frames collection 732-3; (2) a PTS of the prior old bitrate key frames collection 730-3 substantially match 762 a PTS of the first prior new bitrate key frames collection 632-4; or (3) a PTS of the old bitrate key frames collection 530-4 substantially match 764 a PTS of the second prior new bitrate key frames collection 732-3 using similar set of operations discussed and illustrated with respect to FIGS. 5A and 5C.

In circumstances when a third in-tolerance splicing location cannot be determined, the segment processing component may generate: (1) a third out-of-tolerance splicing location with an associated third out-of-tolerance offset between a PTS of the prior old bitrate key frames collection 730-3 and a PTS of the second prior new bitrate key frames collection 732-3; (2) a fourth out-of-tolerance splicing location with an associated fourth out-of-tolerance offset between a PTS of the prior old bitrate key frames collection 730-3 and a PTS of the first prior new bitrate key frames collection 632-4; and (3) a fifth out-of-tolerance splicing location with an associated fifth out-of-tolerance offset between a PTS of the old bitrate key frames collection 530-4 and a PTS of the second prior new bitrate key frames collection 732-3, all using similar set of operations discussed and illustrated with respect to FIGS. 5A and 5C.

After determining the third, fourth, and fifth out-of-tolerance splicing locations, the segment processing component may select an out-of-tolerance splicing location (i.e., a second selected out-of-tolerance splicing location) among the previously determined first, second, third, fourth, and fifth out-of-tolerance splicing locations that has the lowest tolerance offset among their corresponding first, second, third, fourth, and fifth out-of-tolerance offsets. This may ensure that even when a substantial match cannot be found, a closest out-of-tolerance splicing location may be used to provide a near seamless transition. Additionally, while using an out-of-tolerance splicing location may result in a brief pause or freeze during playback, substantially noticeable and undesirable visual artifacts, such as, for example, macro-blocking artifacts, may be prevented.

Based on an old bitrate PTS and a reference to an old bitrate PES collection (e.g., old bitrate PES collection 420-4 or prior old bitrate PES collection 420-3) of the third in-tolerance splicing location, the segment processing component may, using similar set of operations discussed and illustrated with respect to FIGS. 5A and 5C: (1) identify one or more old bitrate PES collection elements that includes a PTS that matches or is temporally subsequent to the old bitrate PTS from the referenced old bitrate PES collection (e.g., old bitrate PES collection 420-4 or old bitrate PES collection 420-3); and (2) remove the identified one or more old bitrate PES collection elements from the referenced old bitrate PES collection (e.g., old bitrate PES collection 420-4 or prior old bitrate PES collection 420-3).

Similarly, based on a new bitrate PTS and a reference to a new bitrate PES collection (e.g., first prior new bitrate PES collection 622-4 or second prior new bitrate PES collection 722-3) of the third in-tolerance splicing location, the segment processing component may, using similar set of operations discussed and illustrated with respect to FIGS. 5A and 5C: (1) identify one or more new bitrate PES collection elements temporally prior to the new bitrate PTS from the new bitrate PES collection (e.g., first prior new bitrate PES collection 622-4 or second prior new bitrate PES collection 722-3); and (2) remove the identified one or more new bitrate PES collection elements from the referenced new bitrate PES collection (e.g., first prior new bitrate PES collection 622-4 or second prior new bitrate PES collection 722-3).

Additionally or alternatively, based on an old bitrate PTS and a reference to an old bitrate PES collection of the second selected out-of-tolerance splicing location, the segment processing component may, using similar set of operations discussed and illustrated with respect to FIGS. 5A and 5C: (1) identify one or more old bitrate PES collection elements that includes a PTS that matches or is temporally subsequent to the old bitrate PTS from the referenced old bitrate PES collection (e.g., old bitrate PES collection 420-4 or old bitrate PES collection 420-3); and (2) remove the identified one or more old bitrate PES collection elements from the referenced old bitrate PES collection (e.g., old bitrate PES collection 420-4 or prior old bitrate PES collection 420-3).

Similarly, based on a new bitrate PTS and a reference to a new bitrate PES collection of the second selected out-of-tolerance splicing location, the segment processing component may, using similar set of operations discussed and illustrated with respect to FIGS. 5A and 5C: (1) identify one or more new bitrate PES collection elements temporally prior to the new bitrate PTS from the new bitrate PES collection (e.g., first prior new bitrate PES collection 622-4, second prior new bitrate PES collection 722-3, or new bitrate PES collection 522-5); and (2) remove the identified one or more new bitrate PES collection elements from the referenced new bitrate PES collection (e.g., first prior new bitrate PES collection 622-4, second prior new bitrate PES collection 722-3, or new bitrate PES collection 522-5).

FIGS. 8A-8G illustrate a set of interactions for realigning a processing buffer according to an example embodiment. Moreover, as variant segments are received, analyzed, and/or preprocessed to generate corresponding PES collections, the segment processing component (e.g., segment processing component 244 of media device 114-1) may store the generated PES collections in a processing buffer 810 allocated in memory (e.g., memory 224 of media device 114-1).

As illustrated in FIGS. 8A-8G, the processing buffer 810 may be implemented as a first in first out (FIFO) queue, where the segment processing component may store the generated PES collections into the processing buffer (i.e., enqueue) via input 852. To provide PES collections to the decoder component 248 for decoding and playback, the segment processing component may remove queued PES collections from the processing buffer 810 (i.e. dequeue) via output 850 in the order that the PES collection was enqueued into the processing buffer 810.

However, in some circumstances, the set of operations discussed and illustrated in FIGS. 4A-4D, 5A-5D, 6 and/or 7, may cause the segment processing component to generate and store one or more PES collections (e.g., first prior new bitrate PES collection 622-4, first prior new bitrate PES collection 722-3, etc.) out of order for decoding and playback. Thus, to ensure proper ordering of the processing buffer 810 so that PES collections may be decoded and played back in the proper order, an alignment component (e.g., alignment component 248 of media device 114-1) may re-align the processing buffer 810 based at least partially on PTS of one or more PES collection elements in the one or more PES collections queued in the processing buffer 810 and transitions between an old bitrate PES collection and a new bitrate PES collection.

In an embodiment, the alignment component may remove the one or more PES collections in the processing buffer 810 based on bitrate transitions between an old bitrate PES collection and a new bitrate PES collection. In an embodiment, the alignment component may also order the one or more PES collections in the processing buffer 810 in increasing PTS order (e.g., left to right as illustrated in FIGS. 8A-8G), so that the PES collection having PES collection elements with the earliest PTS may be first to be dequeued while PES collection having PES collection elements with the latest PTS may be the last to be dequeued.

Figure 8C:
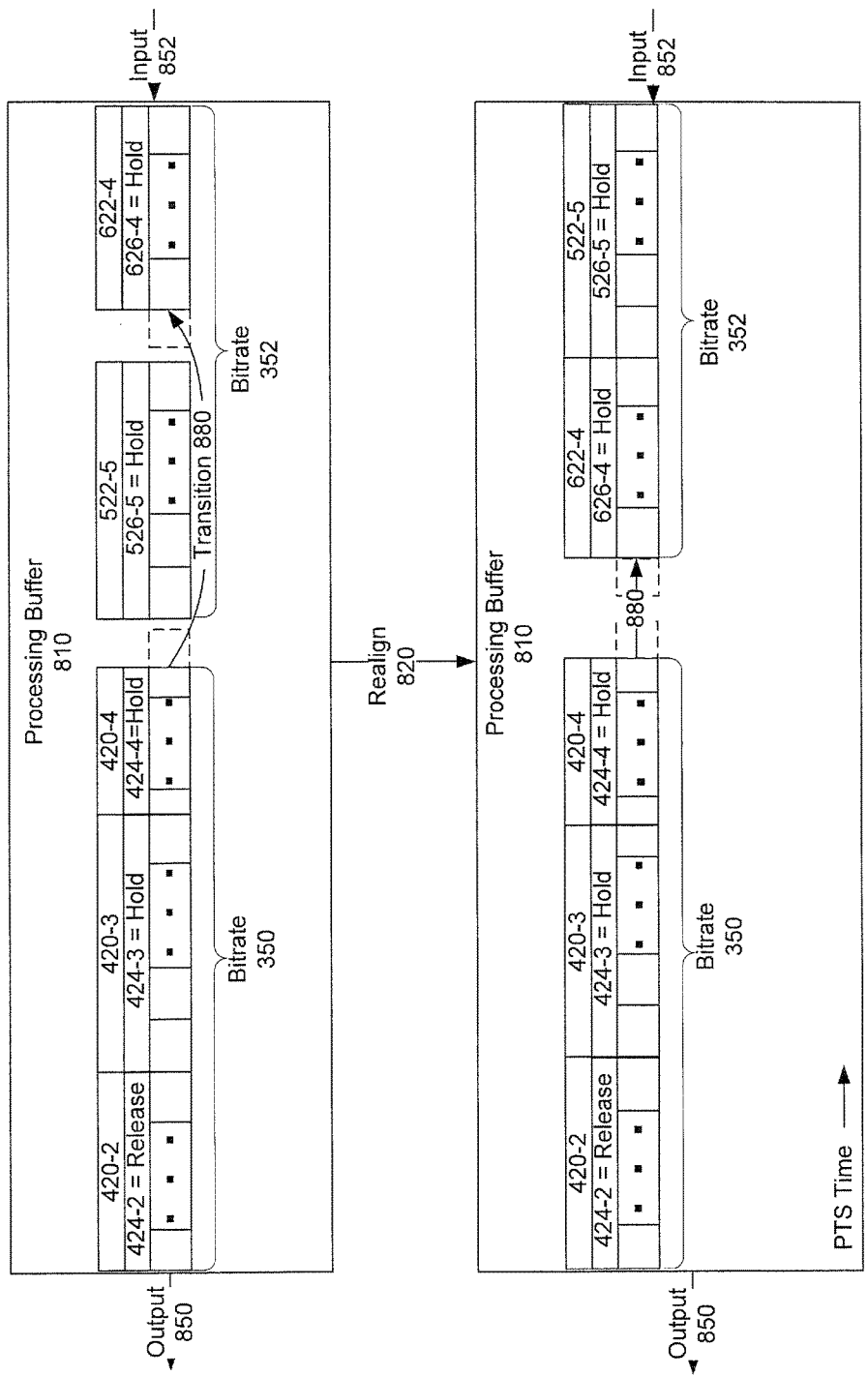
Figure 9A:
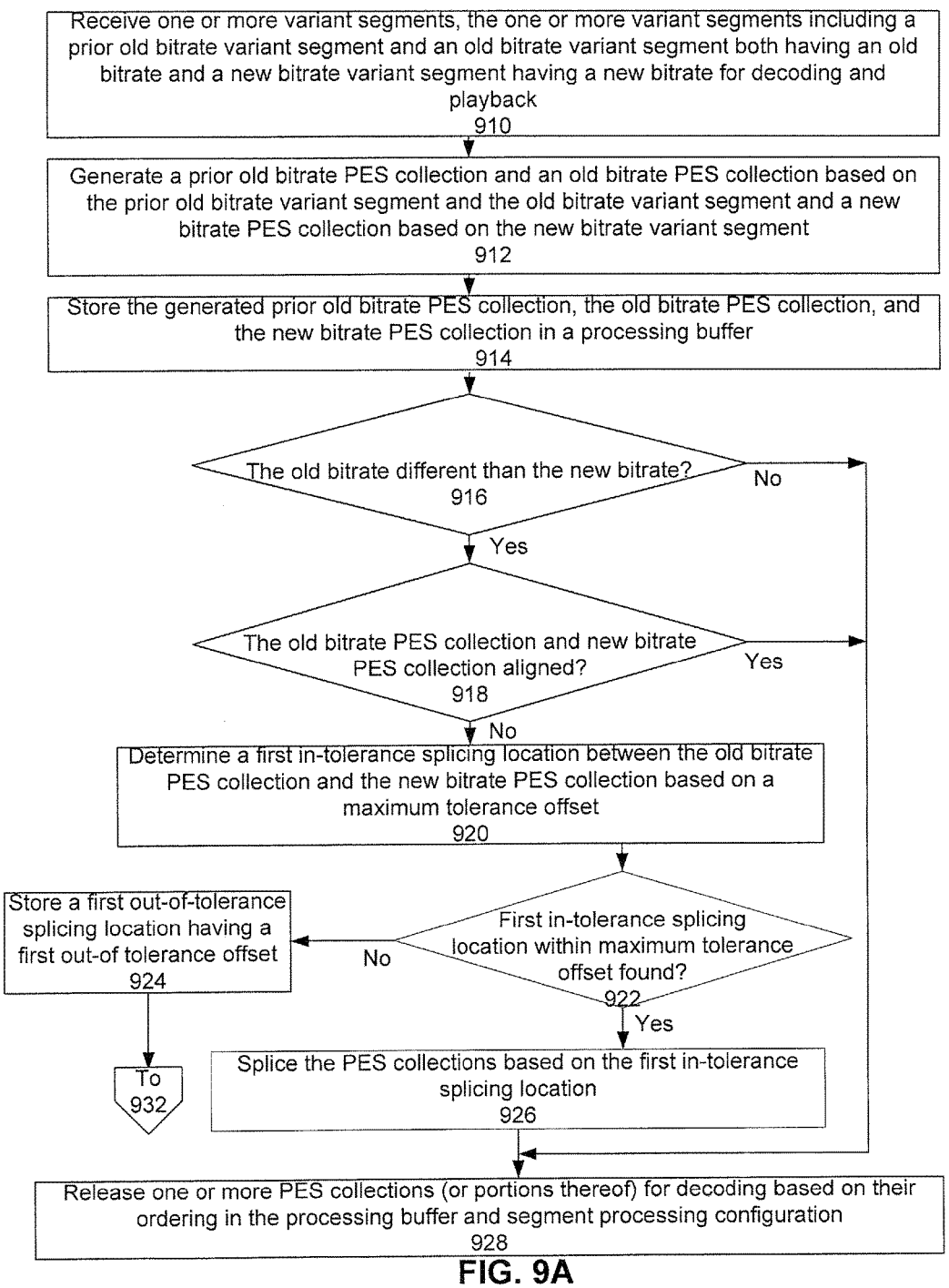
FIGS. 9A-9C illustrate processing operations that may be performed by the media device to PES collections of variant streams for a bitrate transition according to an example embodiment.

FIG. 8A illustrates the processing buffer 810 after the set of operations discussed and illustrated with respect to FIGS. 4A-4D and/or steps 910-918 of FIG. 9A has been performed. While not illustrated in FIG. 8A, a seamless bitrate transition 480 may occur between the old bitrate PES collection 420-4 and new bitrate PES collection 422-5. Additionally, because the PES collection elements are already ordered in increasing PTS order, the alignment component 248 may not perform any realignment of the processing buffer 810.

FIG. 8B illustrates the processing buffer 810 after the set of operations discussed and illustrated with respect to FIGS. 5A-5D and steps 910-926 of FIG. 9A has been performed. As illustrated in FIG. 8B, a splicing location (e.g., a first in-tolerance splicing location, a first selected out-of-tolerance splicing location, or a second selected out-of-tolerance splicing location) has been identified and processed to enable a seamless or near seamless bitrate transition 580 to exist between the old bitrate PES collection 420-4 and the new bitrate PES collection 522-5. Additionally, because the PES collection elements are already ordered in increasing PTS order, the alignment component 248 may not perform any realignment of the processing buffer 810.

Figure 9B:
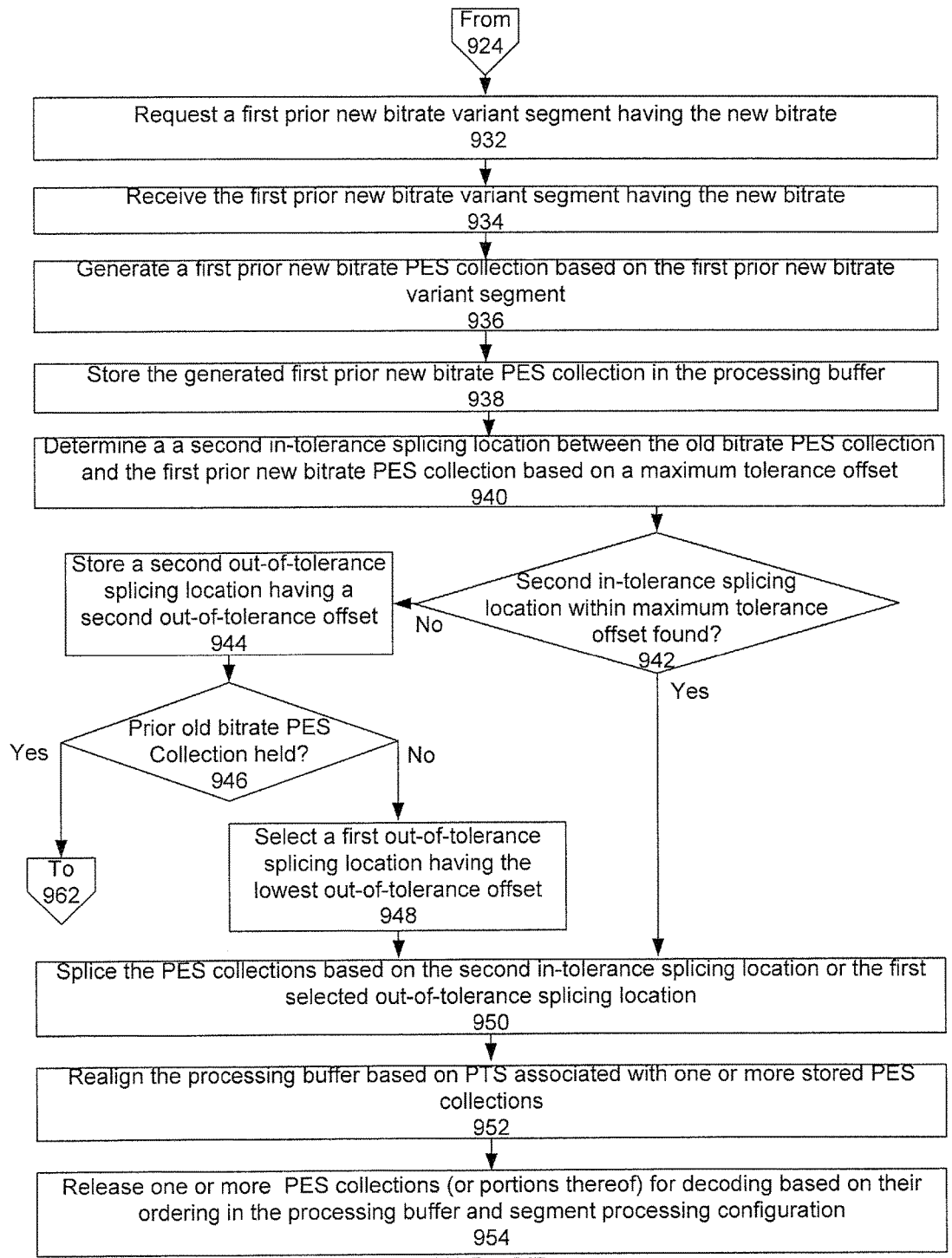

FIG. 8C illustrates the processing buffer 810 after the set of operations discussed and illustrated in FIG. 6 and/or steps 932-942 and 950-952 of FIG. 9B has been performed. As illustrated in FIG. 8C, the processing buffer 810 may include PES collections that are out of order, because the first prior new bitrate PES collection 622-4 may be queued after the new bitrate PES collection 522-5 has been queued in the processing buffer 810. Additionally, as illustrated in FIG. 8C a splicing location (e.g., a second in-tolerance splicing location, first selected out-of-tolerance splicing location, or a second selected out-of-tolerance splicing location) has been identified and processed to enable a seamless or near seamless bitrate transition 880 to exist between the old bitrate PES collection 420-4 and the first prior new bitrate PES collection 622-4.

However, because the PES collection are not initially ordered in increasing PTS order in the processing buffer 810, the alignment component 248 may realign 820 the processing buffer 810, so that the first prior new bitrate PES collection 622-4 (or a portion thereof) may be temporally subsequent and adjacent to the old bitrate PES collection 420-4 (or a portion thereof) and the new bitrate PES collection 522-5 may be temporally subsequent and adjacent to the first prior new bitrate PES collection 622-4. For example, to realign 820 the processing buffer 810, the alignment component 248 may move the first prior new bitrate PES collection 622-4 to a location in the processing buffer 810 that is between the new bitrate PES collection 522-5 and the old bitrate PES collection 420-4.

Figure 8D:
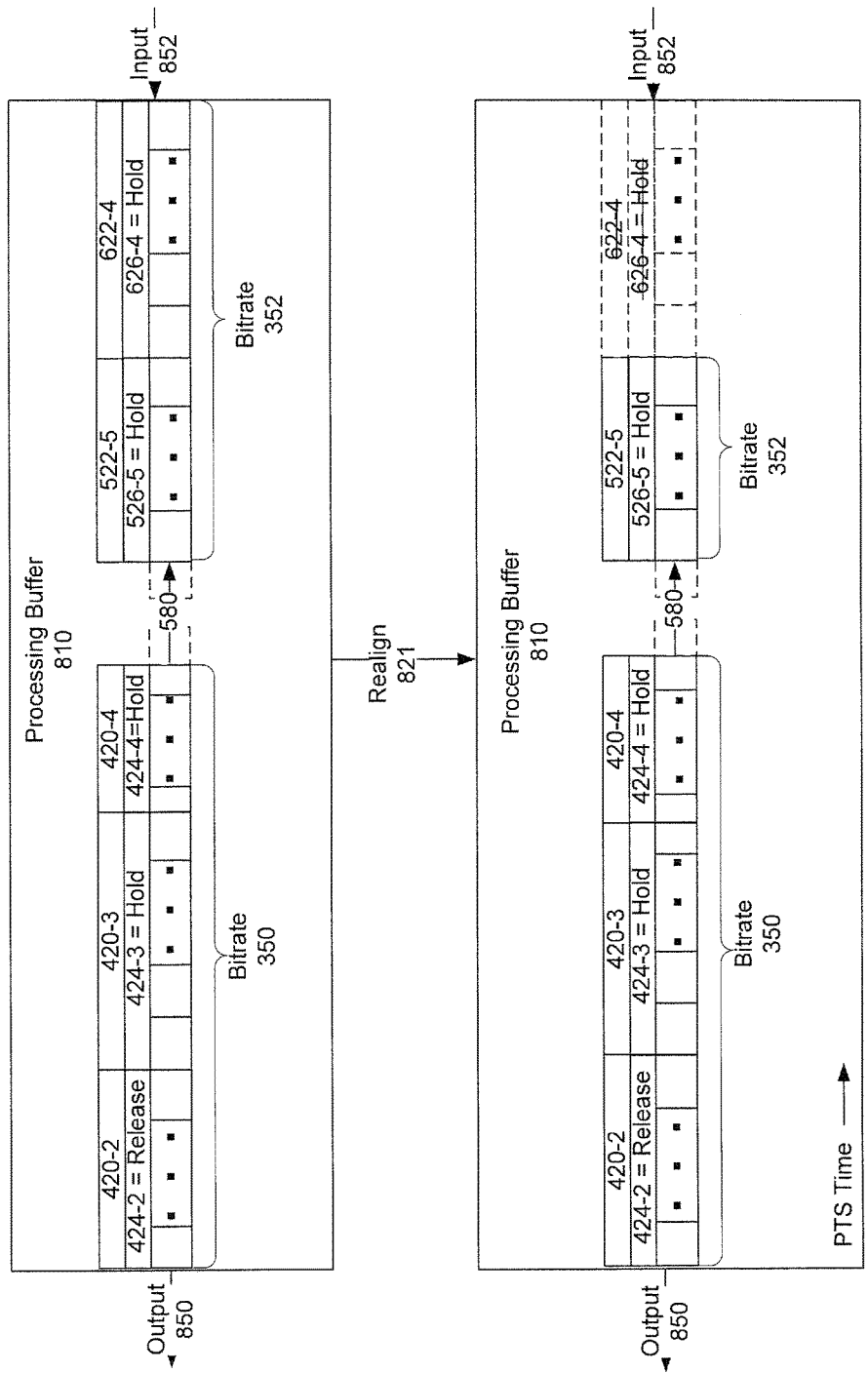

FIG. 8D illustrates the processing buffer 810 after the set of operations discussed and illustrated in FIG. 6 and/or steps 932-952 of FIG. 9B has been performed. As illustrated in FIG. 8D, the processing buffer 810 may include PES collections that are out of order, because the first prior new bitrate PES collection 622-4 may be queued after the new bitrate PES collection 522-5 has been queued in the processing buffer 810. Additionally, as illustrated in FIG. 8D a splicing location (e.g., a second in-tolerance splicing location, a first selected out-of-tolerance splicing location, or a second selected out-of-tolerance splicing location) has been identified and processed to enable a seamless or near seamless bitrate transition 580 to exist between the old bitrate PES collection 420-4 and the new bitrate PES collection 522-5.

However, because one or more PES collections may not be aligned and may no longer be needed in the processing buffer 810, the alignment component 248 may realign 821 the processing buffer 810, so that the prior new bitrate PES collection 522-5 (or a portion thereof) may be temporally subsequent and adjacent to the old bitrate PES collection 420-4 (or a portion thereof) as needed. Additionally, the alignment component 248 may also remove prior new bitrate PES collection 622-4 from the processing buffer 622-4 because the bitrate transition 580 may occur at a later PTS (e.g., occurring at new bitrate PES collection 522-5), such that the prior new bitrate PES collection 622-4 is no longer needed.

Figure 8E:
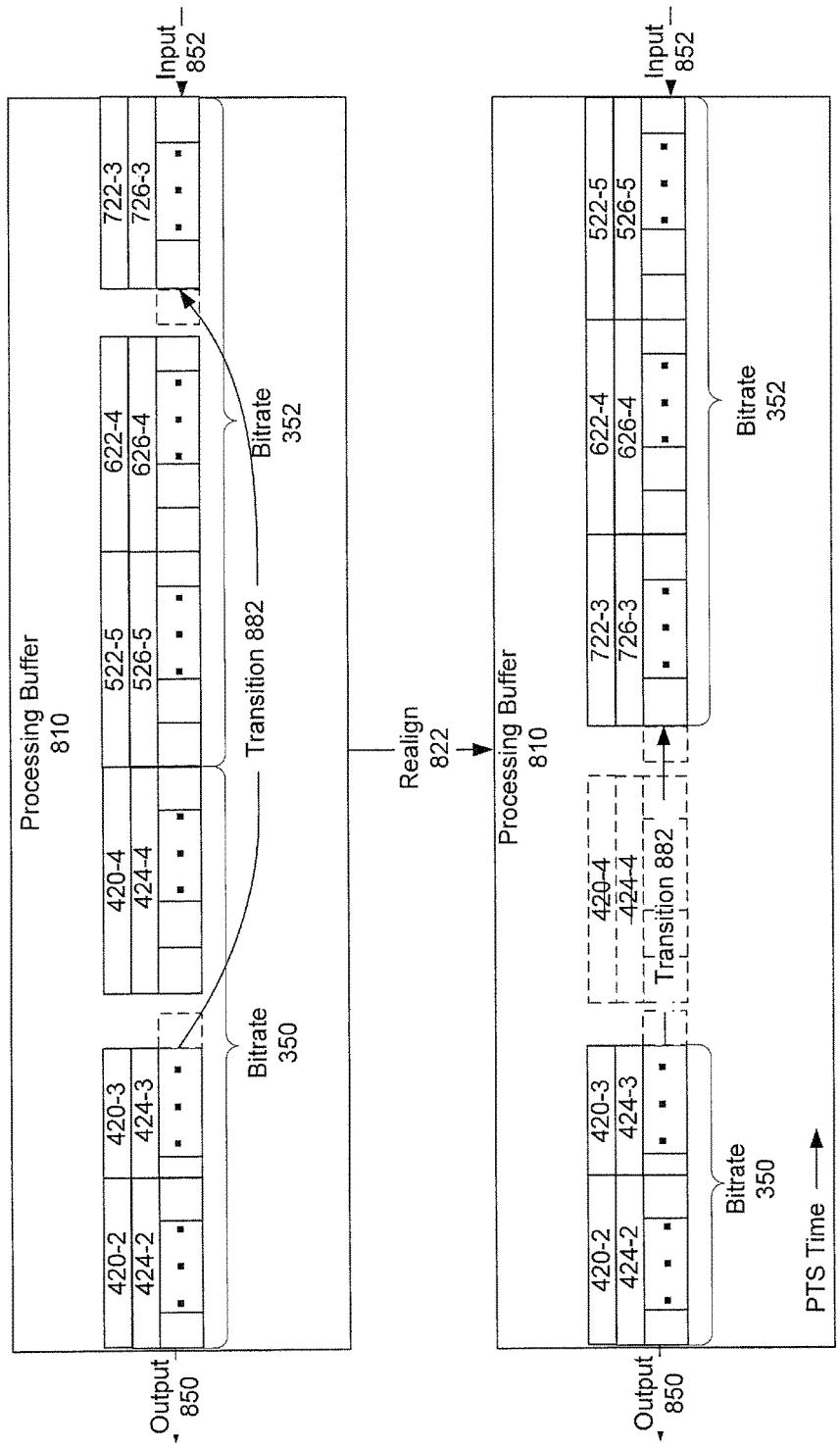
Figure 9C:
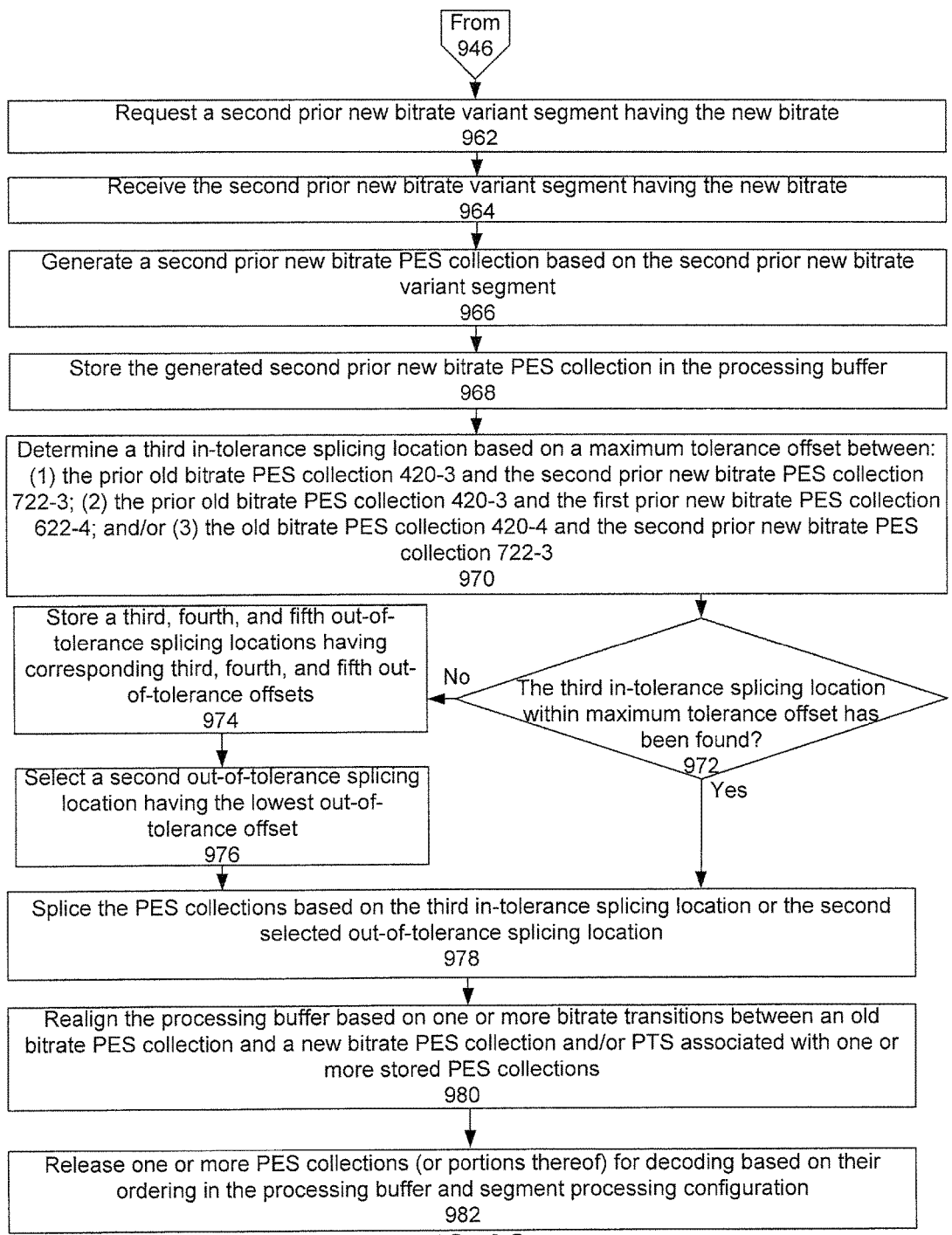

FIG. 8E illustrates the processing buffer 810 after the set of operations discussed and illustrated in FIG. 7 and/or steps 962-980 of FIG. 9C has been performed. Moreover, FIG. 8E may illustrate the processing buffer 810 after a splicing location (e.g., a third in-tolerance splicing location or a second selected out-of tolerance splicing location) is determined between a prior old bitrate PES collection 420-3 and a second prior new bitrate PES collection 722-3.

As illustrated in FIG. 8E, the processing buffer 810 may include PES collections that are out of order, because the second prior new bitrate PES collection 722-3 may be queued after the old bitrate PES collection 420-4, the new bitrate PES collection 522-5, and the first prior new bitrate PES collection 622-4 have been queued in the processing buffer 810. Additionally, as illustrated in FIG. 8E, a splicing location (e.g., a third in-tolerance splicing location or a second selected out-of-tolerance splicing location) has been identified and processed to enable a seamless or near seamless bitrate transition 882 to exist between the prior old bitrate PES collection 420-3 and the second prior new bitrate PES collection 722-3.

However, because the PES collection are not initially ordered in increasing PTS order in the processing buffer 810, the alignment component 248 may realign 822 the processing buffer 810, so that the second prior new bitrate PES collection 722-3 (or portion thereof) may be temporally subsequent and adjacent to the prior old bitrate PES collection 420-3 (or portion thereof), the first new bitrate PES collection 622-4 may be temporally subsequent and adjacent to the second prior new bitrate PES collection 722-3, and the new bitrate PES collection 522-5 may be temporally subsequent and adjacent to the first new bitrate PES collection 622-4.

Additionally, the alignment component 248 may remove old bitrate PES collection 420-4 from the processing buffer 810 because the bitrate transition 882 may occur at an earlier PTS (e.g., occurring at prior old bitrate PES collection 420-3). For example, to realign 822 the processing buffer 810, the alignment component 248 may (I) remove old bitrate PES collection 420-4; (2) replace the removed old bitrate PES collection 420-4 with first prior new bitrate PES collection 622-4; and (3) move the second prior new bitrate PES collection 722-3 (or portion thereof) between the prior old bitrate PES collection 420-3 (or portion thereof) and the first prior new bitrate PES collection 622-4.

Figure 8F:
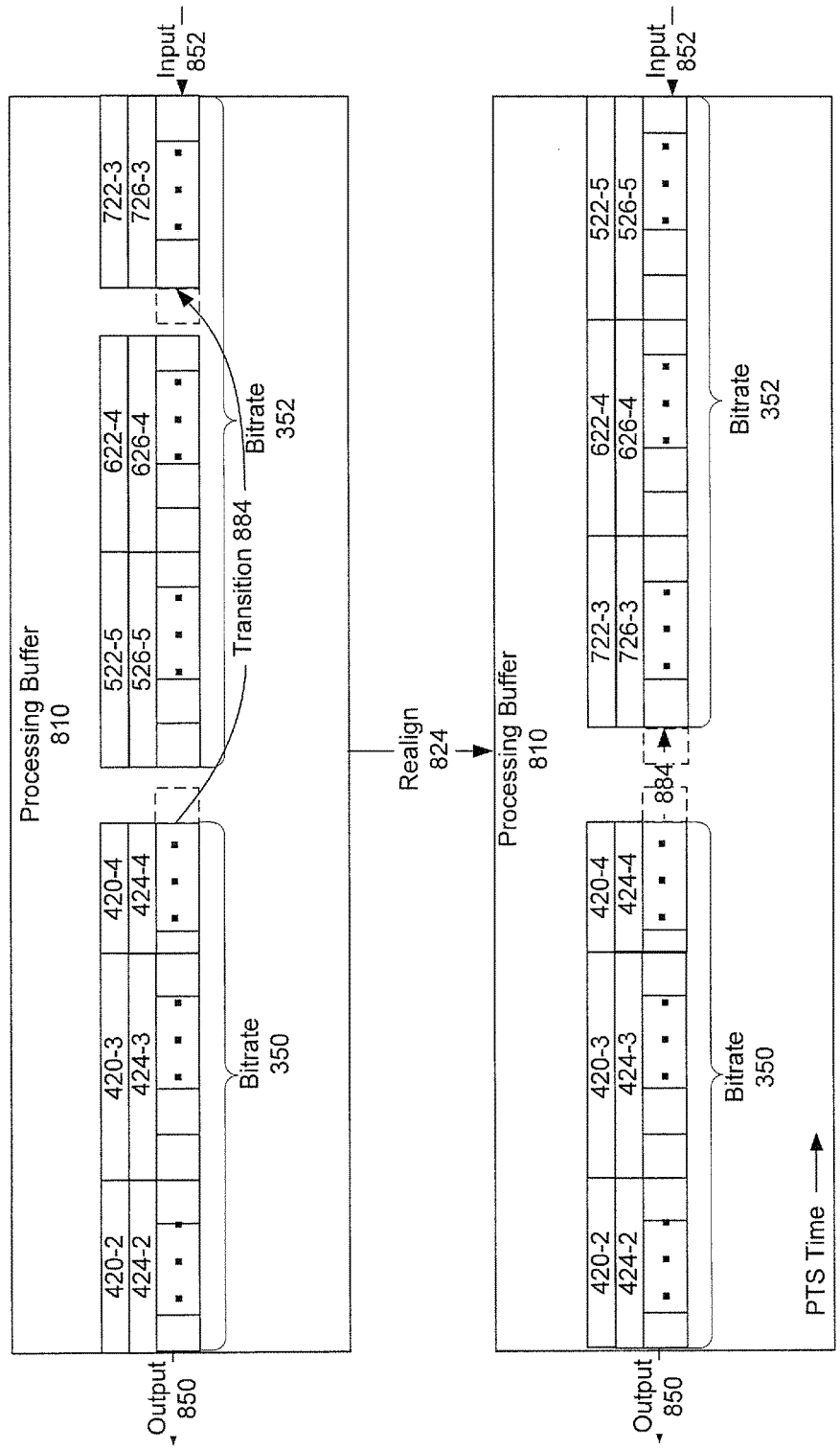

FIG. 8F illustrates the processing buffer 810 after the set of operations discussed and illustrated in FIG. 7 and/or steps 962-980 of FIG. 9C has been performed. Moreover, FIG. 8F may illustrate the processing buffer 810 after a splicing location (e.g., a third in-tolerance splicing location or a second selected out-of tolerance splicing location) is determined between an old bitrate PES collection 420-4 and a second prior new bitrate PES collection 722-3.

As illustrated in FIG. 8F, the processing buffer 810 may include PES collections that are out of order, because the second prior new bitrate PES collection 722-3 may be queued after new bitrate PES collection 522-5 and first prior new bitrate PES collection 622-4 have been queued in the processing buffer 810. Additionally, as illustrated in FIG. 8F a splicing location (e.g., a third in-tolerance splicing location or a second selected out-of tolerance splicing location) has been identified and processed to enable a seamless or near seamless bitrate transition 884 to exist between the old bitrate PES collection 420-4 and a second prior new bitrate PES collection 722-3.

However, because the PES collection are not initially ordered in increasing PTS order in the processing buffer 810, the alignment component 248 may realign 824 the processing buffer 810, so that the second prior new bitrate PES collection 722-3 (or portion thereof) may be temporally subsequent and adjacent to the old bitrate PES collection 420-4 (or portion thereof), the first new bitrate PES collection 622-4 may be temporally subsequent and adjacent to the second prior new bitrate PES collection 722-3, and the new bitrate PES collection 522-5 may be temporally subsequent and adjacent to the first new bitrate PES collection 622-4.

Figure 8G:
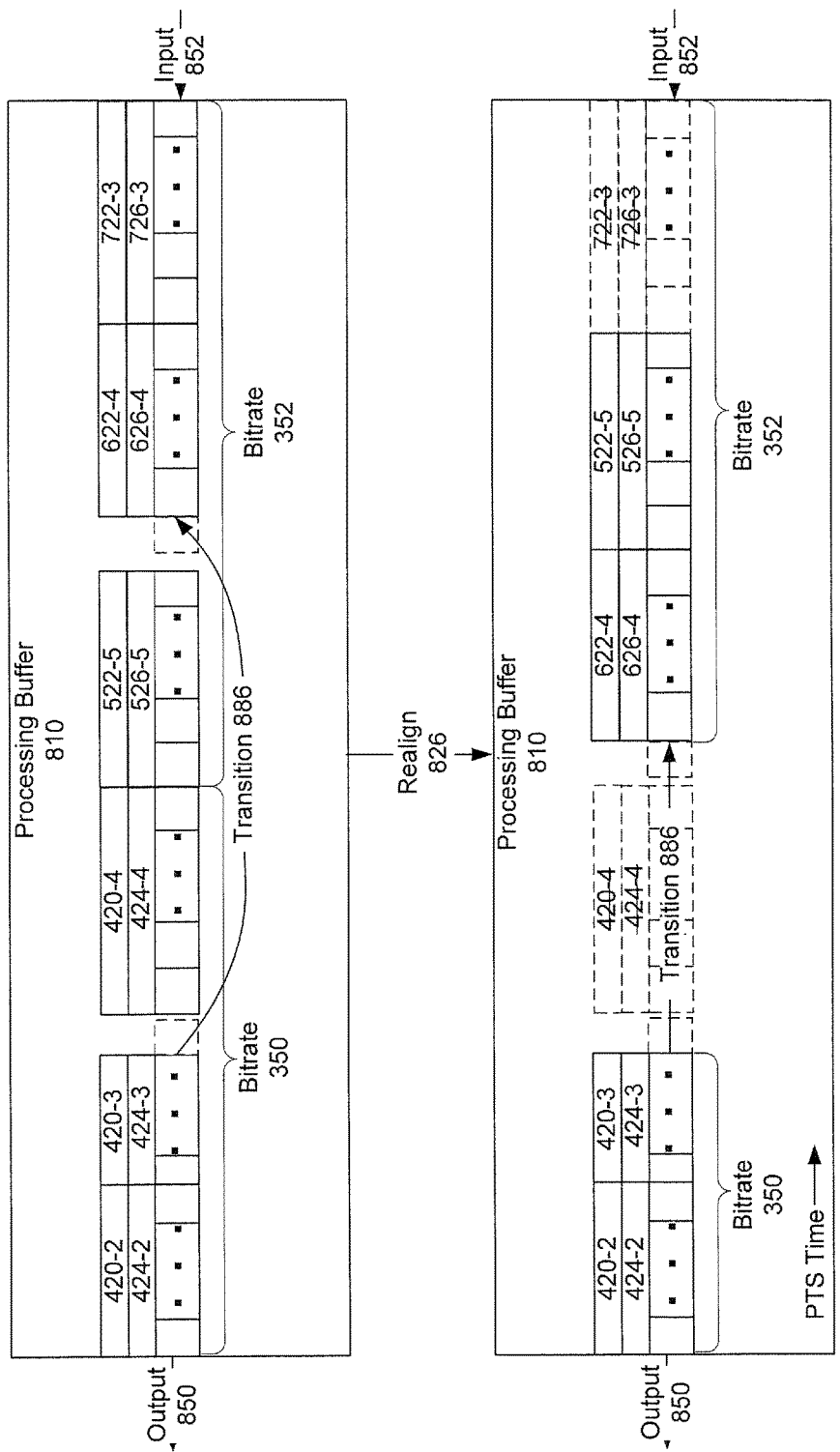

FIG. 8G illustrates the processing buffer 810 after the set of operations discussed and illustrated in FIG. 7 and/or steps 962-980 of FIG. 9C has been performed. Moreover, FIG. 8G may illustrate the processing buffer 810 after a splicing location (e.g., a third in-tolerance splicing location or a second selected out-of-tolerance splicing location) is determined between a prior old bitrate PES collection 420-3 and a first prior new bitrate PES collection 622-4.

As illustrated in FIG. 8G, the processing buffer 810 may include PES collections that are out of order, because the first prior new bitrate PES collection 622-4 may be queued after old bitrate PES collection 420-4 and new bitrate PES collection 522-5 have been queued in the processing buffer 810. Additionally, as illustrated in FIG. 8G a splicing location (e.g., a third in-tolerance splicing location or a second selected out-of-tolerance splicing location) has been identified and processed to enable a seamless or near seamless bitrate transition 886 to exist between the prior old bitrate PES collection 420-3 and a first prior new bitrate PES collection 622-4.

However, because the PES collection elements are not initially ordered in increasing PTS order in the processing buffer 810, the alignment component 248 may reorder 826 the processing buffer 810, so that the first prior new bitrate PES collection 622-4 (or portion thereof) may be temporally subsequent and adjacent to the prior old bitrate PES collection 420-3 (or portion thereof) and the new bitrate PES collection 522-5 may be temporally subsequent and adjacent to the first prior new bitrate PES collection 622-4.

Additionally, the alignment component 248 may remove second prior new bitrate PES collection 722-3 from the processing buffer 810 because the bitrate transition 886 may occur at a later PTS (e.g., occurring at first prior new bitrate PES collection 622-4).

FIGS. 9A-9C illustrate processing operations that may be performed by a media device to PES collections for a bitrate transition according to an example embodiment.

As illustrated in FIG. 9A, at step 910, the media device may receive one or more variant segments, the one or more variant segments including a prior old bitrate variant segment and an old bitrate variant segment both having an old bitrate and a new bitrate variant segment having a new bitrate for decoding and playback. For example, at step 910, the stream component 240 of the media device 114-1 may receive one or more variant segments, the one or more variant segments including prior old bitrate variant segment 320-3 and old bitrate variant segment 320-4 both having an old bitrate 350 and a new bitrate variant segment 322-5 having a new bitrate 352 for decoding and playback.

At step 912, the media device may generate a prior old bitrate PES collection and an old bitrate PES collection based on the prior old bitrate variant segment and the old bitrate variant segment and a new bitrate PES collection based on the new bitrate variant segment. For example, at step 912, the segment processing component 244 of the media device 114-1 may generate a prior old bitrate PES collection 420-3 and an old bitrate PES collection 420-4 both having the old bitrate 350. The segment processing component 244 may generate the prior old bitrate PES collection 420-3 and old bitrate PES collection 420-4 based on the prior old bitrate variant segment 320-3 and the old bitrate variant segment 320-4, respectively. Additionally, at step 912, the segment processing component 244 may also generate a new bitrate PES collection 422-5 or new bitrate PES collection 522-5 having the new bitrate 352 based on the new bitrate variant segment 322-5.

At step 914, the media device may store the generated prior old bitrate PES collection, the old bitrate PES collection, and the new bitrate PES collection in a processing buffer. For example, at step 914, the segment processing component 244 of the media device 114-1 may store the generated prior old bitrate PES collection 420-3, and the old bitrate PES collection 420-4 in a processing buffer 810. Additionally, at step 912 the segment processing component 244 may also store the new bitrate PES collection 422-5 or the new bitrate PES collection 522-5 in a processing buffer 810.

At step 916, the media device may determine whether the old bitrate is different than the new bitrate. For example, at step 916, the segment processing component 244 of the media device 114-1 may determine whether the old bitrate 350 is different than the new bitrate 352.

At step 918, the media device may determine whether old bitrate PES collection is aligned with the new bitrate PES collection, when the old bitrate 350 is different than the new bitrate 352 (step 916—Yes). For example, at step 918, when the old bitrate 350 is different than the new bitrate 352 (step 916—Yes), the segment processing component 244 of the media device 114-1 may determine whether old bitrate PES collection 420-4 is aligned with the new bitrate PES collection 422-5 or new bitrate PES collection 522-5. The segment processing component 244 may determine the alignment by finding and extracting a video frame element 454-5-1 from the new bitrate PES collection 422-5 that includes a video frame that is first to be presented to a viewer among other video frames in the new bitrate PES collection 422-5. The segment processing component 244 may further determine: (1) whether the video frame of the video frame element 454-5-1 is an IDR Frame and whether video frame element 454-5-1 also includes associated SPS and PPS; and (2) whether segment start time 444-5-1 of the new bitrate variant segment 322-5 matches segment end time 442-4-2 of the old bitrate variant segment 320-4. Additional examples are further discussed with respect to FIGS. 4A-4D.

At step 920, the media device may determine a first in-tolerance splicing location between the old bitrate PES collection and the new bitrate PES collection based on a maximum tolerance offset, when old bitrate PES collection is not aligned with the new bitrate PES collection (step 918—No). For example, at step 920, when old bitrate PES collection 420-4 is not aligned with the new bitrate PES collection 522-5 (e.g., new bitrate PES collection 522-5 of FIGS. 5A-5D) (step 918—No), segment processing component 244 of media device 114 may determine a first in-tolerance splicing location between the old bitrate PES collection 420-4 and the new bitrate PES collection 522-5 based on a maximum tolerance offset of plus or minus one frame by generating a first splicing location request. The generated first splicing location request may include the old bitrate PES collection 420-4 as the input old bitrate PES collection and the new bitrate PES collection 522-5 as the input new bitrate PBS collection. The segment processing component 244 may further perform a set of operations further discussed and illustrated with respect to FIG. 10 based on the generated splicing location request.

At step 922, the media device may determine whether a first in-tolerance splicing location within maximum tolerance offset has been found. For example, at step 922, segment processing component 244 of the media device 114-1 may determine a first in-tolerance splicing location within maximum tolerance offset of plus or minus one frame has been found, when a first in-tolerance splicing location has been generated by performing the set of operations further discussed and illustrated with respect to FIG. 10. Additionally or alternatively, at step 922, the segment processing component 244 of the media device 114-1 may determine a first in-tolerance splicing location within maximum tolerance offset of plus or minus one frame has not been found, when a first out-of-tolerance splicing location with a first out-of-tolerance offset has been generated by performing the set of operations also further discussed and illustrated with respect to FIG. 10.

At step 924, the media device may store a first out-of-tolerance splicing location having a first out-of-tolerance offset and continue to step 932 of FIG. 9B, when a first in-tolerance splicing location within maximum tolerance offset has not been found (step 922—No). For example, at step 924, when a first in-tolerance splicing location within maximum tolerance offset has not been found (step 922—No), the segment processing component 244 of the media device 114-1 may store the first out-of-tolerance splicing location having a first out-of-tolerance offset in memory 224 of the media device 114-1 and continue to step 932 of FIG. 9B.

At step 926, the media device may splice the PES collections based on the first in-tolerance splicing location, when the first in-tolerance splicing location within maximum tolerance offset has been found (step 922—Yes). For example, at step 926, when the first in-tolerance splicing location within maximum tolerance offset has been found (step 922—Yes), segment processing component 244 of media device 114-1 may splice old bitrate PES collection 422-4 and the new bitrate PES collection 522-5 based on the first in-tolerance splicing location by performing a set of operations further discussed and illustrated with respect to FIG. 11.

At step 928, the media device may release one or more PES collections (or portions thereof) for decoding based on their ordering in the processing buffer and segment processing configuration: (1) when the old bitrate 350 is not different than the new bitrate 352 (step 916—No); (2) when the old bitrate PES collection 420-4 is aligned with the new bitrate PES collection 422-5 (e.g., new bitrate PES collection 422-5 of FIGS. 4A-4D) (step 918—Yes); or (3) after splicing the PES collections (e.g., old bitrate PES collection 422-4 and new bitrate PES collection 522-5) based on the first in-tolerance splicing location (step 926).

For example, at step 928, (1) when the old bitrate 350 is not different than, i.e., the same as the new bitrate 352 indicating that no bitrate switch has occurred between the old bitrate PES collection 420-4 and the new bitrate PES collection 422-5 of FIGS. 4A-4D (step 916—No); (2) when the old bitrate PES collection 420-4 is aligned with the new bitrate PES collection 422-5 of FIGS. 4A-4D (step 918—Yes); or (3) after splicing the old bitrate PES collection 422-4 and new bitrate PES collection 522-5 of FIGS. 5A-5D based on the first in-tolerance splicing location (step 926), the segment processing component 244 of the media device 114-1 having an extended selection segment processing configuration may update release indicator 424-3 of old bitrate PES collection 420-3 (or portion thereof), which may be the earliest PES collection with respect to PTS in the processing buffer 810 further discussed and illustrated with respect to FIGS. 8A-8B, from hold to release. Additionally, when the segment processing component 244 is configured in extended selection segment processing configuration, the release indicator 424-4 for old bitrate PES collection 420-4 and release indicators 426-5 and 526-5 for PES collections 422-5 and 522-5, respectively, may not be updated from hold to release at this time.

As illustrated in FIG. 9B, at step 932, the media device may request a first prior new bitrate variant segment having the new bitrate. For example, at step 932, the segment processing component 244 of media device 114-1 may request, via the stream component 240 of the media device 114-1, a first prior new bitrate variant segment 322-4 having the new bitrate 352.

At step 934, the media device may receive the first prior new bitrate variant segment having the new bitrate. For example, at step 934, the stream component 240 of the media device 114-1, may receive the first prior new bitrate variant segment 322-4 having the new bitrate 352.

At step 936, the media device may generate a first prior new bitrate PES collection based on the first prior new bitrate variant segment. For example, at step 936, the segment processing component 244 of media device 114-1 may generate a first prior new bitrate PES collection 622-4 based on the first prior new bitrate variant segment 322-4.

At step 938, the media device may store the generated first prior new bitrate PES collection in the processing buffer. For example, at step 938, the segment processing component 244 of media device 114-1 may store the generated first prior new bitrate PES collection 622-4 in the processing buffer 810.

At step 940, the media device may determine a second in-tolerance splicing location between the old bitrate PES collection and the first prior new bitrate PES collection based on a maximum tolerance offset. For example, at step 940, the segment processing component 244 of media device 114 may determine a second in-tolerance splicing location between the old bitrate PES collection 422-4 and the first prior new bitrate PES collection 622-4 based on a maximum tolerance offset of plus or minus one frame by generating a second splicing location request. The generated second splicing location request may include the old bitrate PES collection 420-4 as the input old bitrate PES collection and the first prior new bitrate PES collection 622-4 as the input new bitrate PES collection. The segment processing component 244 may further perform the set of operations further discussed and illustrated with respect to FIG. 10 based on the generated second splicing location request.

At step 942, the media device may determine whether the second in-tolerance splicing location within maximum tolerance offset has been found. For example, at step 942, segment processing component 244 of the media device 114-1 may determine a second in-tolerance splicing location within maximum tolerance offset of plus or minus one frame has been found, when a second in-tolerance splicing location has been generated by performing the set of operations further discussed and illustrated with respect to FIG. 10. Additionally or alternatively, at step 942, the segment processing component 244 of the media device 114-1 may determine a second in-tolerance splicing location within maximum tolerance offset of plus or minus one frame has not been found, when a second out-of-tolerance splicing location with a second out-of-tolerance offset has been generated by performing the set of operations also further discussed and illustrated with respect to FIG. 10.

At step 944, the media device may store a second out-of-tolerance splicing location having a second out-of-tolerance offset, when the second in-tolerance splicing location within maximum tolerance offset of plus or minus one frame has not been found (step 942—No). For example, at step 944, when a second in-tolerance splicing location within maximum tolerance offset has not been found (step 942—No), the segment processing component 244 of the media device 114-1 may store the second out-of-tolerance splicing location having a second out-of-tolerance offset in memory 224 of the media device 114-1 and continue to step 962 of FIG. 9C.

At step 946, the media device may determine whether prior old bitrate PES collection is held and proceed to step 962 of FIG. 9C, when prior old bitrate PES collection is held (step 946—Yes). For example, at step 946, the segment processing component 244 of the media device 114-1 may determine whether the prior old bitrate PES collection 420-3 is still available for further processing, i.e., still held in the processing buffer 810 based on whether the release indicator 424-3 indicates that the prior old bitrate PES collection 420-3 is still being held or is otherwise released. Additionally, at step 946, the process may proceed to 962, when the release indicator 424-3 indicates that the prior old bitrate PES collection 420-3 is still being held (step 946—Yes).

As previously discussed, in extended selection segment processing configuration, the prior old bitrate PES collection 420-3 is generally held for processing at this time. In low latency segment processing configuration, the prior old bitrate PES collection 420-3 may already be released for decoding, de-multiplexing, and/or playback. However, it may be appreciated that in the low latency segment processing configuration, in some implementations, a shared pointer or reference may still reference prior old bitrate PES collection 420-3 and thus, the bitrate PES collection 420-3 may still be available for processing and accordingly, proceeding to step 962.

At step 948, the media device may select an out-of-tolerance splicing location having the lowest out-of-tolerance offset, when the prior old bitrate PES collection is no longer held (step 946—No). For example, at step 948, when the prior old bitrate PES collection is no longer held (step 946—No), the segment processing component 244 of the media device 114-1 may select an out-of-tolerance splicing location among the first and second out-of-tolerance splicing locations having the lowest out-of-tolerance offset among the corresponding first and second out-of-tolerance offsets.

At step 950, the media device may splice the PES collections based on the second in-tolerance splicing location, when the second in-tolerance splicing location within maximum tolerance offset has been found (step 942—Yes) or based on a first selected out-of-tolerance splicing location. For example, at step 950, when the second in-tolerance splicing location within maximum tolerance offset of plus or minus one frame has been found (step 942—Yes), segment processing component 244 of media device 114-1 may splice the old bitrate PES collection 422-4 and the new bitrate PES collection 622-4 based on the second in-tolerance splicing location by performing a set of operations further discussed and illustrated with respect to FIG. 11.

Figure 11:
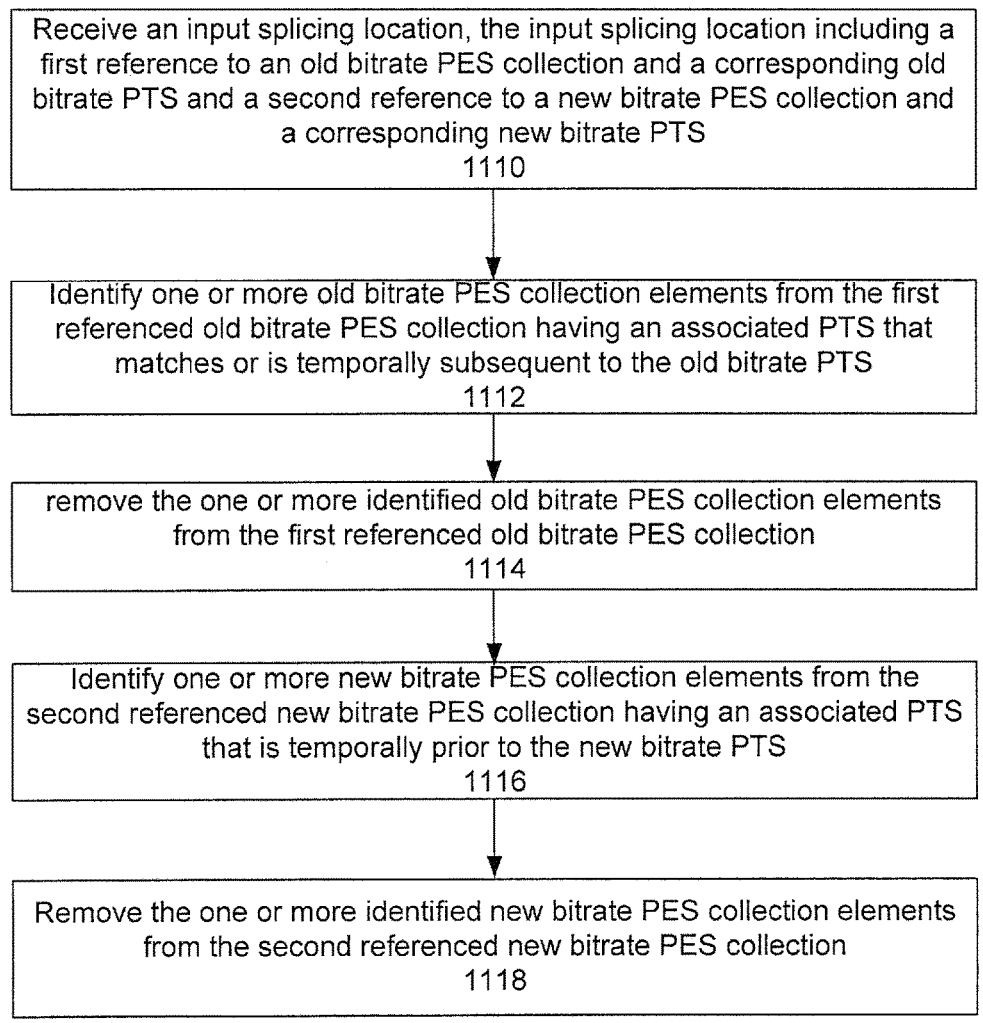
FIG. 11 illustrates processing operations that may be performed by the media device to splice an old bitrate PES collection and a new bitrate PES collection according to an example embodiment.

Additionally or alternatively, at step 950, the segment processing component 244 of media device 114-1 may splice the old bitrate and new bitrate PES collections based on the first selected out-of-tolerance splicing location (e.g., splice the old bitrate PES collection 420-4 and the new bitrate PES collection 522-5 or splice the old bitrate PES collection 420-4 and first prior new bitrate PES collection 622-5) by performing a set of operations also further discussed and illustrated with respect to FIG. 11.

At step 952, the media device may realign the processing buffer based on PTS associated with one or more stored PES collections. For example, at step 952, the alignment component 246 of media device 114-1 may realign the processing buffer based on PTS associated with old bitrate PES collection 420-4, new bitrate PES collection 522-5, and/or first prior new bitrate PES collection 622-4. Additional examples are further discussed with respect to FIGS. 8C-8D.

At step 954, the media device may release PES collections (or portions thereof) for decoding based on their ordering in the processing buffer and segment processing configuration. For example, at step 954, the segment processing component 244 of media device 114-1 having an extend selection segment processing configuration may update release indicator 424-3 of prior old bitrate PES collection 420-4 and release indicator 424-4 of old bitrate PES collection 420-4, of FIG. 6 to release for decoding based on their ordering in the processing buffer 810 as illustrated in FIGS. 8C-8D. Additionally, when the segment processing component 244 is configured in extended selection segment processing configuration, the release indicator 624-4 for first prior new bitrate PES collection 624-4 and release indicator 526-5 for new bitrate PES collections 522-5 may not be updated from hold to release at this time.

As illustrated in FIG. 9C, at step 962, the media device may request a second prior new bitrate variant segment having the new bitrate. For example, at step 962, the segment processing component 244 of media device 114-1 may request, via the stream component 240 of the media device 114-1, a second prior new bitrate variant segment 322-3 having the new bitrate 352.

At step 964, the media device may receive the second prior new bitrate variant segment having the new bitrate. For example, at step 964, the stream component 240 of the media device 114-1, may receive the second prior new bitrate variant segment 322-3 having the new bitrate 352.

At step 966, the media device may generate a second prior new bitrate PES collection based on the second prior new bitrate variant segment. For example, at step 966, the segment processing component 244 of media device 114-1 may generate a second prior new bitrate PES collection 722-3 based on the second prior new bitrate variant segment 322-3.

At step 968, the media device may store the generated second prior new bitrate PES collection in the processing buffer. For example, at step 968, the segment processing component 244 of media device 114-1 may store the generated second prior new bitrate PES collection 722-3 in the processing buffer 810.

At step 970, the media device may determine a third in-tolerance splicing location based on a maximum tolerance offset between: (1) the prior old bitrate PES collection 420-3 and the second prior new bitrate PES collection 722-3; (2) the prior old bitrate PES collection 420-3 and the first prior new bitrate PES collection 622-4; and/or (3) the old bitrate PES collection 420-4 and the second prior new bitrate PES collection 722-3.

For example, at step 970, the segment processing component 244 of media device 114 may determine a third in-tolerance splicing location within a maximum tolerance offset of plus or minus one frame between: (1) the prior old bitrate PES collection 420-3 and the second prior new bitrate PES collection 722-3; (2) the prior old bitrate PES collection 420-3 and the first prior new bitrate PES collection 622-4; and/or (3) the old bitrate PES collection 420-4 and the second prior new bitrate PES collection 722-3. The segment processing component 244 may determine a third in-tolerance splicing location by: (1) generating one or more splicing location requests; and (2) performing the set of operations further discussed and illustrated with respect to FIG. 10 based on the one or more generated splicing location request, until an in-tolerance splicing location (i.e., the third in-tolerance splicing location) is found or all of the above pairs of PES collections have been searched.

Thus, continuing with the above example, the segment processing component 244 may determine a third in-tolerance splicing location by: (1) generating a third splicing location request which may include the prior old bitrate PES collection 420-3 as the input old bitrate PES collection and the second prior new bitrate PES collection 722-3 as the input new bitrate PES collection; and (2) performing the set of operations further discussed and illustrated with respect to FIG. 10 based on the third splicing location request. If an in-tolerance splicing location was not generated and instead, an out-of-tolerance splicing location and associated out-of-tolerance offset was generated, then the segment processing component may: (1) generate a fourth splicing location request which may include the prior old bitrate PES collection 420-3 as the input old bitrate PES collection and the first prior new bitrate PES collection 622-4 as the input new bitrate PES collection, and (2) performing the set of operations further discussed and illustrated with respect to FIG. 10 based on the fourth splicing location request, and so forth.

At step 972, the media device may determine whether the third in-tolerance splicing location within maximum tolerance offset has been found. For example, at step 972, segment processing component 244 of the media device 114-1 may determine the third in-tolerance splicing location within maximum tolerance offset of plus or minus one frame has been found, when the third in-tolerance splicing location has been generated by performing the set of operations further discussed and illustrated with respect to FIG. 10.

Figure 10:
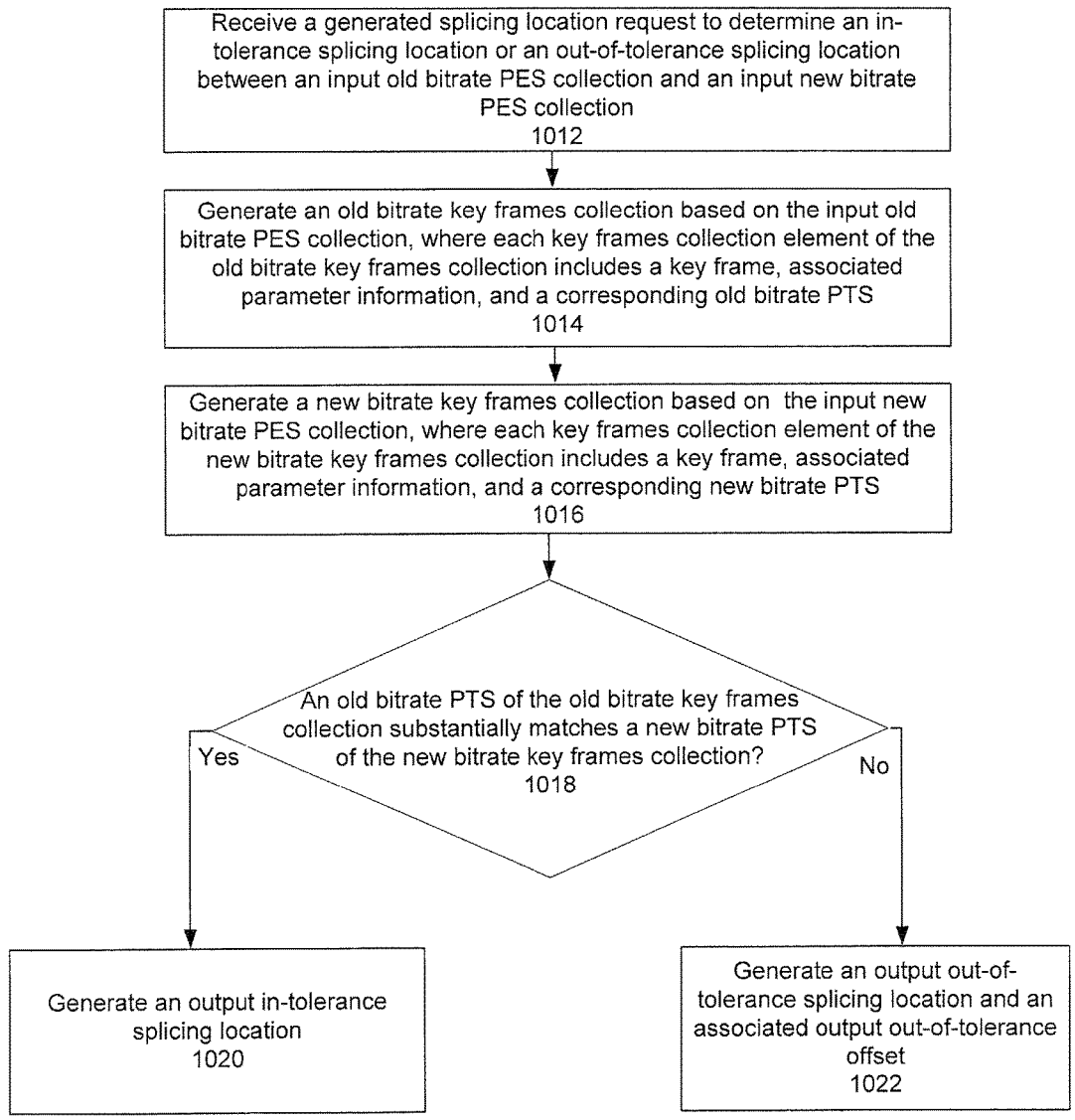
FIG. 10 illustrates processing operations that may be performed by the media device to determine an in-tolerance splicing location or an out-of-tolerance splicing location according to an example embodiment.

Additionally or alternatively, at step 972, the segment processing component 244 of the media device 114-1 may determine the third in-tolerance splicing location within maximum tolerance offset of plus or minus one frame has not been found, when a third, fourth, and fifth out-of-tolerance splicing locations with a corresponding third, fourth, and fifth out-of-tolerance offsets have been generated by performing the set of operations also further discussed and illustrated with respect to FIG. 10.

At step 974, the media device may store a third, fourth, and fifth out-of-tolerance splicing location having corresponding third, fourth, and fifth out-of-tolerance offset, when the third in-tolerance splicing location within maximum tolerance offset has not been found (step 972—No). For example, at step 974, when a third in-tolerance splicing location within maximum tolerance offset has not been found (step 972—No), the segment processing component 244 of the media device 114-1 may store a third, fourth, and fifth out-of-tolerance splicing locations having corresponding third, fourth, and fifth out-of-tolerance offsets in memory 224 of the media device 114-1.

At step 976, the media device may select an out-of-tolerance splicing location having the lowest out-of-tolerance offset. For example, at step 976, the segment processing component 244 of the media device 114-1 may select an out-of-tolerance splicing location (i.e., a second selected out-of-tolerance splicing location) among the first, second, third, fourth, and fifth out-of-tolerance splicing locations having the lowest out-of-tolerance offset among the corresponding first, second, third, fourth, and fifth out-of-tolerance offsets.

At step 978, the media device may splice the PES collections based on the third in-tolerance splicing location, when the third in-tolerance splicing location within maximum tolerance offset has been found (step 922—Yes) or based on a second selected out-of-tolerance splicing location. For example, at step 978, when the third in-tolerance splicing location within maximum tolerance offset has been found (step 978—Yes), segment processing component 244 of media device 114-1 may splice the old bitrate and new bitrate PES collections (e.g., splice the prior old bitrate PES collection 420-3 and the second prior new bitrate PES collection 722-3, splice the prior old bitrate PES collection 420-3 and the first prior new bitrate PES collection 622-4, or splice the old bitrate PES collection 420-4 and the second prior new bitrate PES collection 722-3) based on the third in-tolerance splicing location by performing a set of operations further discussed and illustrated with respect to FIG. 11.

Additionally or alternatively, at step 978, the segment processing component 244 of media device 114-1 may splice the old bitrate and new bitrate PES collections based on the second selected out-of-tolerance splicing location (e.g., splice the old bitrate PES collection 420-4 and the new bitrate PES collection 522-5, splice the old bitrate PES collection 420-4 and first prior new bitrate PES collection 622-5, splice the prior old bitrate PES collection 420-3 and the second prior new bitrate PES collection 722-3, splice the prior old bitrate PES collection 420-3 and the first prior new bitrate PES collection 622-4, or splice the old bitrate PES collection 420-4 and the second prior new bitrate PES collection 722-3) by performing a set of operations also further discussed and illustrated with respect to FIG. 11.

At step 980, the media device may realign the processing buffer based on one or more bitrate transitions between an old bitrate PES collection and a new bitrate PES collection and/or PTS associated with one or more stored PES collections. For example, at step 980, the alignment component 246 of media device 114-1 may reorder the processing buffer 810 based on one or more bitrate transitions 580, 880, 882, 884, and/or 886 between an old bitrate PES collection and a new bitrate PES collection and/or PTS associated with one or more stored PES collections. Additional examples are further discussed with respect to FIGS. 8A-8G.

At step 982, the media device may release one or more PES collections (or portions thereof) for decoding based on their ordering in the processing buffer and segment processing configuration. For example, at step 982, the segment processing component 244 of media device 114-1 having an extended selection segment processing configuration may update release indicators 424-3 and 726-3 for prior old bitrate PES collection 420-3 (or portion thereof) and second prior new bitrate PES collection 722-3 (or portion thereof), respectively, from hold to release, when the processing buffer 810 is ordered in accordance with FIG. 8E. In another example, at step 982, the segment processing component 244 of media device 114-1 having an extended selection segment processing configuration may update release indicators 424-3, 424-4, and 726-3 for prior old bitrate PES collection 420-3, old bitrate PES collection 420-4 (or portion thereof) and second prior new bitrate PES collection 722-3 (or portion thereof), respectively, from hold to release, when the processing buffer 810 is ordered in accordance with FIG. 8F. In a further example, at step 982, the segment processing component 244 of media device 114-1 having an extended selection segment processing configuration may update release indicator 424-3 for prior old bitrate PES collection 420-3 from hold to release, when the processing buffer 810 is ordered in accordance with FIG. 8G. It may be appreciated that by releasing one or more PES collections illustrated above, the segment processing component 244 may ensure that the processing buffer 810 continues to buffer and/or hold at least three PES collections, before one of the PES collections is released and a new PES collection is generated and buffered based on newly received variant segments.

FIG. 10 illustrates processing operations that may be performed by the media device to determine an in-tolerance splicing location or an out-of-tolerance splicing location according to an example embodiment.

At step 1012, the media device may receive a generated splicing location request to determine an in-tolerance splicing location or an out-of-tolerance splicing location between an input old bitrate PES collection and an input new bitrate PES collection. For example, at step 1012, the segment processing component 244 of the media device 114-1 may receive a generated splicing location request to determine an in-tolerance splicing location or an out-of-tolerance splicing location with an associated out-of-tolerance offset between an input old bitrate PES collection (e.g., old bitrate PES collection 420-4, etc.) and an input new bitrate PES collection (e.g., new bitrate PES collection 522-5, etc.).

At step 1014, the media device may generate an old bitrate key frames collection based on the input old bitrate PES collection, where each key frames collection element of the old bitrate key frames collection includes a key frame, associated parameter information, and a corresponding old bitrate PTS. For example, at step 1014, the segment processing component 244 of the media device 114-1 may generate an old bitrate key frames collection (e.g., old bitrate key frames collection 530-4, etc.) based on the input old bitrate PES collection (e.g., old bitrate PES collection 420-4), where each key frames collection element (e.g., key frames collection element 536-4-1, 536-4-2, etc.) of the old bitrate key frames collection includes an IDR Frame, a SPS and a PPS, and a corresponding old bitrate PTS.

At step 1016, the media device may generate a new bitrate key frames collection based on the input new bitrate PES collection, where each key frames collection element of the new bitrate key frames collection includes a key frame, associated parameter information, and a corresponding new bitrate PTS. For example, at step 1016, the segment processing component 244 of the media device 114-1 may generate a new bitrate key frames collection (e.g., new bitrate key frames collection 532-5, etc.) based on the input new bitrate PES collection (e.g., new bitrate PES collection 522-5, etc.), where each key frames collection element (e.g., key frames collection element 538-5-1, 538-5-2, etc.) of the new bitrate key frames collection includes an IDR Frame, a SPS and a PPS, and corresponding new bitrate PTS.

At step 1018, the media device may determine whether an old bitrate PTS of the old bitrate key frames collection substantially matches a new bitrate PTS of the new bitrate key frames collection. For example, at step 1018, the segment processing component 244 of the media device 114-1 may determine whether an old bitrate PTS of the old bitrate key frames collection (e.g., old bitrate PTS of old bitrate key frames collection 536-4-2, etc.) substantially matches a new bitrate PTS of the new bitrate key frames collection (e.g., new bitrate PTS of new bitrate key frames collection 538-5-1, etc.).

At step 1020, the media device may generate an output in-tolerance splicing location, when an old bitrate PTS of the old bitrate key frames collection substantially match a new bitrate PTS of the new bitrate key frames collection (step 1018—Yes). For example, at step 1020, when an old bitrate PTS of the old bitrate key frames collection (e.g., old bitrate PTS of old bitrate key frames collection 536-4-2, etc.) substantially match a new bitrate PTS of the new bitrate key frames collection (e.g., new bitrate PTS of new bitrate key frames collection 538-5-1, etc.) (step 1018—Yes), the segment processing component 244 of the media device 114-1 may generate an output in-tolerance splicing location (e.g., a first in-tolerance splicing location, etc.). The output in-tolerance splicing location may include the substantially matching old bitrate PTS and a reference to an old bitrate PES collection that corresponds to the old bitrate key frames collection. The output in-tolerance splicing location may also include the substantially matching new bitrate PTS and a reference to a new bitrate PES collection corresponds to the new bitrate key frames collection.

At step 1022, the media device may generate an output out-of-tolerance splicing location and an associated output out-of-tolerance offset, when a PTS of the old bitrate key frames collection substantially match a PTS of the new bitrate key frames collection cannot be identified (step 1018—No). For example, at step 1022, when a PTS of the old bitrate key frames collection substantially matching a PTS of the new bitrate key frames collection cannot be found or identified (step 1018—No), the media device may generate an output out-of-tolerance splicing location (e.g., first out-of-tolerance splicing location, etc.) and an associated output out-of-tolerance offset (e.g., first out-of-tolerance offset, etc.). The output out-of-tolerance splicing location may include an old bitrate PTS and a reference to an old bitrate PES collection that corresponds to the old bitrate key frames collection. The output out-of-tolerance splicing location may also include a new bitrate PTS and a reference to a new bitrate PES collection, where the included old bitrate PTS and the included new bitrate PTS may have the lowest calculated time difference among all old bitrate PTS and new bitrate PTS pairs within the old bitrate PES collection and the new bitrate PES collection. The associated output out-of-tolerance offset may be the lowest calculated time difference between the old bitrate PTS and new bitrate PTS.

FIG. 11 illustrates processing operations that may be performed by the media device to splice an old bitrate PES collection and a new bitrate PES collection according to an example embodiment.

At step 1110, the media device may receive an input splicing location, the input splicing location including a first reference to an old bitrate PES collection and a corresponding old bitrate PTS and a second reference to a new bitrate PES collection and a corresponding new bitrate PTS. For example, at step 1110, the segment processing component 244 of media device 114-1 may receive an input splicing location (e.g., an in-tolerance or an out-of-tolerance splicing location), the input splicing location may include a first reference to an old bitrate PES collection (e.g., a first reference to an old bitrate PES collection 420-4, etc.) and a corresponding old bitrate PTS (e.g., old bitrate PTS that equals PTS of the key frames collection element 536-4-2, etc.) and a second reference to a new bitrate PES collection (e.g., a second reference to a new bitrate PES collection 522-5, etc.) and a corresponding new bitrate PTS (e.g., new bitrate PTS that equals PTS of the key frames collection element 538-5-1, etc.).

At step 1112, the media device may identify one or more old bitrate PES collection elements from the first referenced old bitrate PES collection having an associated PTS that matches or is temporally subsequent to the old bitrate PTS. For example, at step 1112, the segment processing component 244 of media device 114-1 may identify one or more old bitrate PES collection elements from the first referenced old bitrate PES collection having an associated PTS that matches or is subsequent to the old bitrate PTS (e.g., old bitrate PES collection elements 450-4-4 and 450-4-5 of the old bitrate PES collection 420-4, etc.).

At step 1114, the media device may remove the one or more identified old bitrate PES collection elements from the first referenced old bitrate PES collection. For example, at step 1114, the segment processing component 244 of media device 114-1 may remove the one or more identified old bitrate PES collection elements from the first referenced old bitrate PES collection.

At step 1116, the media device may identify one or more new bitrate PES collection elements from the second referenced new bitrate PES collection having an associated PTS that is temporally prior to the new bitrate PTS. For example, at step 1116, the segment processing component 244 of media device 114-1 may identify one or more new bitrate PES collection elements from the new bitrate PES collection having an associated PTS that is temporally prior to the new bitrate PTS (e.g., new bitrate PES collection elements 552-5-1, 552-5-2, and 552-5-3 of the new bitrate PES collection 522-5, etc.).

At step 1118, the media device may remove the one or more identified new bitrate PES collection elements from the second referenced new bitrate PES collection. For example, at step 1118, the segment processing component 244 of media device 114-1 may remove the one or more identified new bitrate PES collection elements from the second referenced new bitrate PES collection.

Example Computer System

Various embodiments and components therein can be implemented, for example, using one or more well-known computer systems, such as, for example, platform server device(s) 120, client devices **110-*n*, display devices 112-*n*, and/or server devices 132-*n* shown in FIG. 1. Computer system 1200** can be any well-known computer capable of performing the functions described herein.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1212 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1212, and removable storage units 1218 and 1222, as well as tangible articles of manufacture embodying any combination of the foregoing. Such control logic, when executed by one or more data processing devices (such as computer system 1200), causes such data processing devices to operate as described herein.

Figure 12:
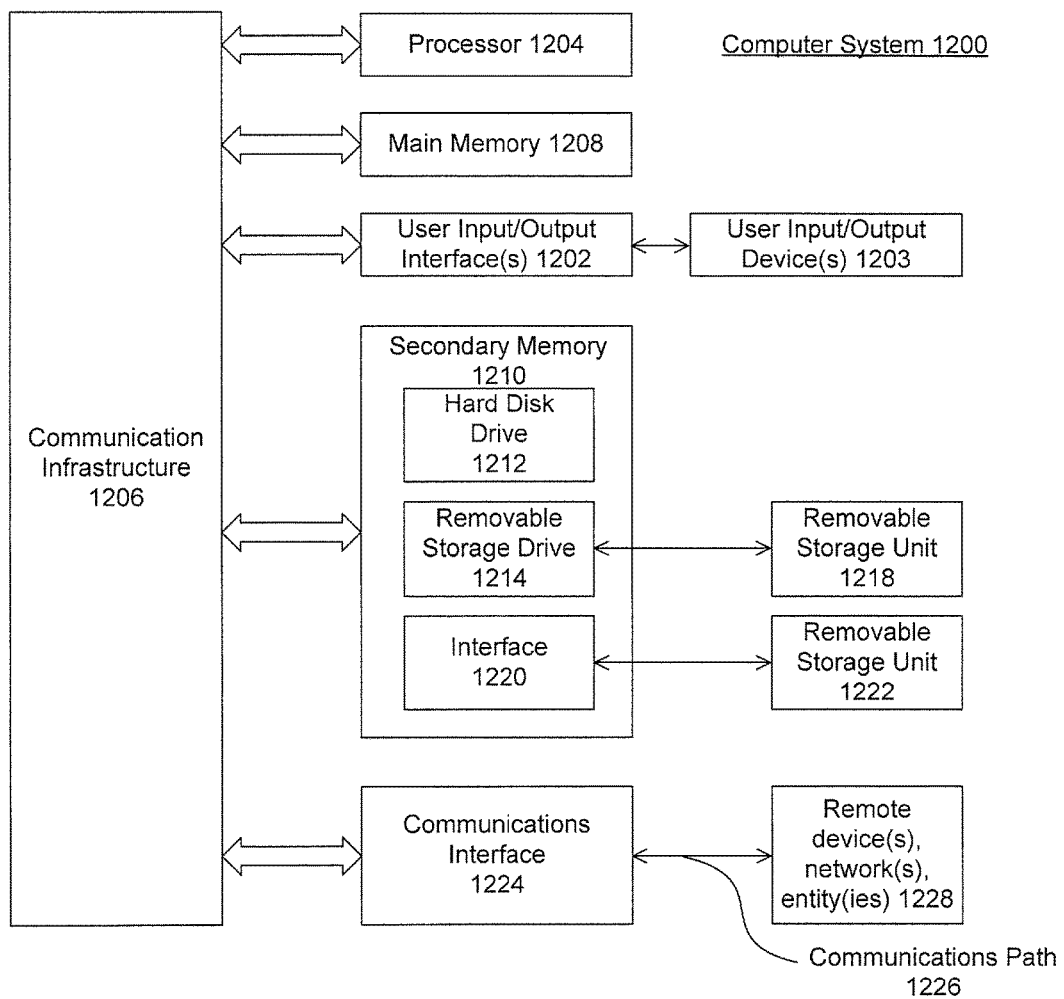
FIG. 12 illustrates an example computer system useful for implementing various embodiments.

Based on the teachings contained in this disclosure, it will be apparent to persons skilled in the relevant art(s) how to make and use embodiments of the invention using data processing devices, computer systems and/or computer architectures other than that shown in FIG. 12. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. An apparatus comprising:
   at least one processor; and
   a memory operatively coupled to the at least one processor, the processor configured to:
      receive one or more variant segments for decoding and playback, the one or more variant segments including first and second variant segments having a first bitrate and a third variant segment having a second bitrate,
      generate corresponding first, second, and third packetized elementary stream (PES) collections based on at least the first, second, and third variant segments,
      store the generated first, second, and third PES collections in a processing buffer,
      determine, based on at least a tolerance offset, a first out-of-tolerance splicing location and an associated first out-of-tolerance offset between the second PES collection and the third PES collection,
      generate a corresponding fourth PES collection based on at least a received fourth variant segment having the second bitrate, and
      determine, based on at least the tolerance offset, a second out-of-tolerance splicing location and an associated second out-of-tolerance offset between the second PES collection and the fourth PES collection.

2. The apparatus of claim 1, wherein the first variant segment is temporally prior and adjacent to the second variant segment, the fourth variant segment is temporally prior and adjacent to the third variant segment, and the first bitrate is different than the second bitrate.

3. The apparatus of claim 2, wherein the at least one processor is further configured to:
   request a fifth variant segment having the second bitrate, in response to the determination of the second out-of-tolerance splicing location,
   receive the fifth variant segment, wherein the fifth variant segment is temporally prior and adjacent to the fourth variant segment,
   generate a corresponding fifth PES collection based on at least the fifth variant segment, and
   store the fifth PES collection in the processing buffer.

4. The apparatus of claim 3, wherein the at least one processor is further configured to:
   determine, based on at least the tolerance offset, a third in-tolerance splicing location between the first and the fifth PES collections, the first and the fourth PES collections, and/or the second and the fifth PES collections, and
   splice the first and the fifth PES collections, the first and the fourth PES collections, or the second and the fifth PES collections based on at least the third in-tolerance splicing location.

5. The apparatus of claim 4, wherein the at least one processor is further configured to:
   realign the processing buffer based on at least a presentation timestamp (PTS) associated with one or more PES collections stored in the processing buffer, wherein the processing buffer is configured as a first-in-first-out (FIFO) queue.

6. The apparatus of claim 5, wherein to realign the processing buffer, the at least one processor is further configured to:
   move the one or more PES collections stored in the processing buffer, such that the PES collections stored in the processing buffer are ordered in increasing PTS order, and
   remove the second PES collection stored in the processing buffer based on at least a bitrate transition associated with the third in-tolerance splicing location.

7. The apparatus of claim 1, wherein the tolerance offset is plus or minus one frame for a given frame rate determined based on at least parameter information associated with a key frame.

8. A computer implemented method, comprising:
   receiving one or more variant segments for decoding and playback, the one or more variant segments including first and second variant segments having a first bitrate and a third variant segment having a second bitrate;
   generating corresponding first, second, and third packetized elementary stream (PES) collections based on at least the first, second, and third variant segments;
   storing the generated first, second, and third PES collections in a processing buffer;
   determining, based on at least a tolerance offset, a first out-of-tolerance splicing location and an associated first out-of-tolerance offset between the second PES collection and the third PES collection;

generating a corresponding fourth PES collection based on at least a received fourth variant segment having the second bitrate; and determining, based on at least the tolerance offset, a second out-of-tolerance splicing location and an associated second out-of-tolerance offset between the second PES collection and the fourth PES collection.

9. The computer implemented method of claim 8, wherein the first variant segment is temporally prior and adjacent to the second variant segment, the fourth variant segment is temporally prior and adjacent to the third variant segment, and the first bitrate is different than the second bitrate.

10. The computer implemented method of claim 9, further comprising:

requesting a fifth variant segment having the second bitrate, in response to the determination of the second out-of-tolerance splicing location;

receiving the fifth variant segment, wherein the fifth variant segment is temporally prior and adjacent to the fourth variant segment;

generating a corresponding fifth PES collection based on at least the fifth variant segment; and storing the fifth PES collection in the processing buffer.

11. The computer implemented method of claim 10, further comprising:

determining, based on at least the tolerance offset, a third in-tolerance splicing location between the first and the fifth PES collections, the first and the fourth PES collections, and/or the second and the fifth PES collections; and splicing the first and the fifth PES collections, the first and the fourth PES collections, or the second and the fifth PES collections based on at least the third in-tolerance splicing location.

12. The computer implemented method of claim 11, wherein the determining the third in-tolerance splicing location further comprises:

generating a first key frames collection based on at least the first PES collection, wherein each key frames collection element of the first key frames collection includes a key frame, associated parameter information, and a corresponding presentation timestamp (PTS);

generating a fifth key frames collection based on at least the fifth PES collection, wherein each key frames collection element of the fifth key frames collection includes a key frame, associated parameter information, and a corresponding PTS;

determining whether a PTS of the first key frames collection substantially matches a PTS of the fifth key frames collection; and generating the third in-tolerance splicing location, in response to determining that the PTS of the first key frames collection substantially matches the PTS of the fifth key frames collection.

13. The computer implemented method of claim 11, wherein the determining the third in-tolerance splicing location further comprises:

generating a first key frames collection based on at least the first PES collection, wherein each key frames collection element of the first key frames collection includes a key frame, associated parameter information, and a corresponding presentation timestamp (PTS);

generating a fourth key frames collection based on at least the fourth PES collection, wherein each key frames collection element of the fourth key frames collection includes a key frame, associated parameter information, and a corresponding PTS;

determining whether a PTS of the first key frames collection substantially matches a PTS of the fourth key frames collection; and generating the third in-tolerance splicing location, in response to determining that the PTS of the first key frames collection substantially matches the PTS of the fourth key frames collection.

14. The computer implemented method of claim 11, wherein the determining the third in-tolerance splicing location further comprises:

generating a second key frames collection based on at least the second PES collection, wherein each key frames collection element of the second key frames collection includes a key frame, associated parameter information, and a corresponding presentation timestamp (PTS);

generating a fifth key frames collection based on at least the fifth PES collection, wherein each key frames collection element of the fifth key frames collection includes a key frame, associated parameter information, and a corresponding PTS;

determining whether a PTS of the second key frames collection substantially matches a PTS of the fifth key frames collection; and generating the third in-tolerance splicing location, in response to determining that the PTS of the second key frames collection substantially matches the PTS of the fifth key frames collection.

15. A tangible computer-readable device having instructions stored thereon that, when executed by at least one computing device, cause the at least one computing device to perform operations comprising:

receiving one or more variant segments for decoding and playback, the one or more variant segments including first and second variant segments having a first bitrate and a third variant segment having a second bitrate, generating corresponding first, second, and third packetized elementary stream (PES) collections based on at least the first, second, and third variant segments;

storing the generated first, second, and third PES collections in a processing buffer;

determining, based on at least a tolerance offset, a first out-of-tolerance splicing location and an associated first out-of-tolerance offset between the second PES collection and the third PES collection;

generating corresponding fourth PES collection based on at least a received fourth variant segment having the second bitrate; and determining, based on at least the tolerance offset, a second out-of-tolerance splicing location and an associated second out-of-tolerance offset between the second PES collection and the fourth PES collection.

16. The computer-readable device of claim 15, wherein the first variant segment is temporally prior and adjacent to the second variant segment, the fourth variant segment is temporally prior and adjacent to the third variant segment, and the first bitrate is different than the second bitrate.

17. The computer-readable device of claim 16, wherein the operations further comprise:

requesting a fifth variant segment having the second bitrate, in response to the determination of the second out-of-tolerance splicing location;

receiving the fifth variant segment, wherein the fifth variant segment is temporally prior and adjacent to the fourth variant segment;

generating a corresponding fifth PES collection based on at least the fifth variant segment; and storing the fifth PES collection in the processing buffer.

18. The computer-readable device of claim 17, wherein the operations further comprise:

determining, based on at least the tolerance offset, a third, fourth, and fifth out-tolerance splicing locations and associated third, fourth, and fifth out-of-tolerance offsets between the first and the fifth PES collections, the first and the fourth PES collections, and the second and the fifth PES collections, and selecting an out-of-tolerance splicing location among the first, second, third, fourth, and fifth tolerance splicing locations that has a lowest out-of-tolerance offset.

19. The computer-readable device of claim 18, wherein the operations further comprise:

splicing one or more PES collections stored in the processing buffer, based on at least the third out-of-tolerance splicing location or the selected out-of-tolerance splicing location; and realigning the processing buffer based on at least a presentation timestamp (PTS) associated with the one or more stored PES collections, wherein the processing buffer is configured as a first-in-first-out (FIFO) queue.

20. The computer-readable device of claim 19, wherein the operation of splicing the one or more PES collections further comprises:

moving the one or more PES collections stored in the processing buffer, such that the PES collections stored in the processing buffer are ordered in increasing PTS order; and removing the second PES collection stored in the processing buffer based on at least a bitrate transition associated with the third out-of-tolerance splicing location or a bitrate transition associated with the selected out-of-tolerance splicing location.

* * * * *